United States Patent
Cohen et al.

(10) Patent No.: US 12,486,316 B1
(45) Date of Patent: Dec. 2, 2025

(54) ANTIBODIES THAT BIND THE SPIKE PROTEIN OF SARS-CoV-2

(71) Applicant: ASTRAZENECA UK LIMITED, Cambridge (GB)

(72) Inventors: Taylor Cohen, Wilmington, DE (US); Joe Francica, Wilmington, DE (US); Saravan Rajan, Wilmington, DE (US); Gilad Kaplan, Gaithersburg, MD (US); YingYun Cai, Wilmington, DE (US); Andrew Dippel, Gaithersburg, MD (US)

(73) Assignee: AstraZeneca UK Limited, Cambridge (GB)

( * ) Notice: Subject to any disclaimer, the term of this patent is extended or adjusted under 35 U.S.C. 154(b) by 0 days.

(21) Appl. No.: 19/058,780

(22) Filed: Feb. 20, 2025

Related U.S. Application Data

(63) Continuation of application No. 18/861,365, filed as application No. PCT/EP2023/061297 on Apr. 28, 2023.

(60) Provisional application No. 63/371,454, filed on Aug. 15, 2022, provisional application No. 63/336,332, filed on Apr. 29, 2022.

(51) Int. Cl.
C07K 16/10 (2006.01)

(52) U.S. Cl.
CPC ...... *C07K 16/1003* (2023.08); *C07K 2317/33* (2013.01); *C07K 2317/76* (2013.01); *C07K 2317/92* (2013.01)

(58) Field of Classification Search
CPC ............ C07K 16/1003; C07K 2317/33; C07K 2317/76; C07K 2317/92
See application file for complete search history.

(56) References Cited

U.S. PATENT DOCUMENTS

| | | |
|---|---|---|
| 11,345,741 B2 | 5/2022 | Cai et al. |
| 12,030,927 B2 | 7/2024 | Mongkolsapaya et al. |
| 12,216,120 B2 | 2/2025 | Crowe, Jr. et al. |
| 2021/0300999 A1 | 9/2021 | Crowe, Jr. et al. |
| 2023/0242626 A1 | 8/2023 | Schmelzer et al. |
| 2024/0036054 A1 | 2/2024 | Screaton et al. |
| 2024/0043507 A1 | 2/2024 | Screaton et al. |
| 2024/0376178 A1 | 11/2024 | Mongkolsapaya et al. |
| 2025/0011398 A1 | 1/2025 | Sawmynaden |
| 2025/0154231 A1 | 5/2025 | Mongkolsapaya et al. |

FOREIGN PATENT DOCUMENTS

| | | |
|---|---|---|
| WO | WO-2002060919 A2 | 8/2002 |
| WO | WO-2021195418 A1 | 9/2021 |
| WO | WO-2021233834 A1 | 11/2021 |
| WO | WO-2022034044 A1 | 2/2022 |
| WO | WO-2022167815 A1 | 8/2022 |
| WO | WO-2022167816 A2 | 8/2022 |
| WO | WO-2023079086 A1 | 5/2023 |
| WO | WO-2023084055 A1 | 5/2023 |
| WO | WO-2023156636 A1 | 8/2023 |

OTHER PUBLICATIONS

Asdaq, S.M.B., et al., "A Patent Review on the Therapeutic Application of Monoclonal Antibodies in COVID-19," International Journal of Molecular Sciences 22(21):11953, MDPI, Switzerland (Nov. 2021).

Corti, D., et al., "Tackling COVID-19 with neutralizing monoclonal antibodies," Cell 184(12):3086-3108, Cell Press, United States (2021).

Dejnirattisai, W., et al., "SARS-CoV-2 Omicron-B.1.1.529 leads to widespread escape from neutralizing antibody responses," Cell 185(3):467-484.e15, Cell Press, United States (Feb. 2022).

Gershoni, J., et al., "Epitope Mapping—The First Step in Developing Epitope-Based Vaccines," BioDrugs 21(3):145-156, Adis International, New Zealand (2007).

International Search Report and Written Opinion for International Application No. PCT/EP2023/061297, European Patent Office, Netherlands, mailed on Sep. 15, 2023, 27 pages.

Kumar, S., et al., "Current status of therapeutic monoclonal antibodies against SARS-CoV-2," PLoS Pathogens 17(9):e1009885, Public Library of Science, United States (2021).

Liu, C., et al., "The antibody response to SARS-CoV-2 Beta underscores the antigenic distance to other variants," Cell Host & Microbe 30(1):53-68.e12, Cell Press, United States (Jan. 2022).

Nutalai, R., et al., "Potent cross-reactive antibodies following Omicron breakthrough in vaccines," Cell 185(12):2116-2131.e18, Cell Press, United States (Jun. 2022).

Rudikoff, S., et al., "Single amino acid substitution altering antigen-binding specificity," Proceedings of the National Academy of Sciences of the United States of America 79(6):1979-1983, National Academy of Sciences, United States (Mar. 1982).

Saunders, K.O., et al., "Conceptual Approaches to Modulating Antibody Effector Functions and Circulation Half-Life," Frontiers in Immunology 10:1296, Frontiers Research Foundation, Switzerland (2019).

Starr, T.N., et al., "SARS-CoV-2 RBD antibodies that maximize breadth and resistance to escape," Nature 597(7874):97-102, Nature Publishing Group, United Kingdom (Jul. 2021).

Takashita, E., et al., "Efficacy of Antibodies and Antiviral Drugs against Covid- 19 Omicron Variant," New England Journal of Medicine 386(10):995-998, Massachusetts Medical Society, United States (Jan. 2022).

Tuekprakhon, A., et al., "Antibody escape of SARS-CoV-2 Omicron BA.4 and BA.5 from vaccine and BA. 1 serum," Cell 185(14):2422-2433.e13, Cell Press, United States (Jul. 2022).

(Continued)

*Primary Examiner* — Robert S Landsman
(74) *Attorney, Agent, or Firm* — Sterne, Kessler, Goldstein & Fox P.L.L.C.

(57) ABSTRACT

The present disclosure provides antibodies and antigen-binding fragments thereof that specifically bind to the spike protein of SARS-COV-2 and methods of making and using the same. The antibodies can be used, for example, in prophylaxis, post-exposure prophylaxis, or treatment of SARS-COV-2 infection. The antibodies can also be used to detect SARS-COV-2, e.g., an infection in subject.

15 Claims, 6 Drawing Sheets

Specification includes a Sequence Listing.

(56) References Cited

OTHER PUBLICATIONS

Winkler, K., et al., "Changing the antigen binding specificity by single point mutations of an anti-p24 (HIV-1) antibody," Journal of Immunology 165(8):4505-4514, American Association of Immunologists, United States (Oct. 2000).

Co-pending U.S. Appl. No. 18/861,365, inventors Cohen, T., et al., Int'l Filing Date: Apr. 28, 2023 (Not Yet Published).

Fig. 1

Pseudovirus Neutralization

| mAb Name | EC50 (ng/ml) | | | | |
|---|---|---|---|---|---|
| | Omicron (BA.1) | BA1.1 | BA.2 | Delta | D614G |
| RQ33 | 4.5[a] | 3.1[a] | 79.7[b] | 204.8[c] | 190.8[c] |
| RQ40 | 6.4[a] | 4.2[a] | 7.0[a] | 11.2[a] | 9.9[a] |
| RQ41 | 6.2[a] | 3.9[a] | 12.6[a] | 18.2[a] | 11.0[a] |
| RQ43 | 7.8[a] | 6.0[a] | 10.5[a] | 25.9[b] | 15.8[a] |

[a] Highest potency (<20 ng/mL)
[b] Adequate potency (20-100 ng/mL)
[c] Lowest potency (>100 ng/mL)

*TPP threshold is <100 ng/mL across Omicron lineages

*All mAbs tested are in the YTE-TM backbone

Fig. 2

| mAb Name | Pseudovirus Neutralization, EC50 (ng/ml) | | | | |
|---|---|---|---|---|---|
| | BA.1 | BA1.1 | BA.2 | Delta | D614G |
| RQ33 + RQ40 | 5.4[a] | 4.6[a] | 13.0[a] | 28.2[b] | 25.7[b] |
| RQ33 + RQ43 | 5.7[a] | 5.9[a] | 24.7[b] | 59.0[b] | 33.3[b] |
| AZD7442 | 470.4[c] | 772.5[c] | 29.3[b] | 7.2[a] | 8.5[a] |

[a] Highest potency (<20 ng/mL)
[b] Adequate potency (20-100 ng/mL)
[c] Lowest potency (>100 ng/mL)

*TPP threshold is <100 ng/mL across Omicron lineages

*All mAbs tested are in the YTE-TM backbone

ANTIBODIES THAT BIND THE SPIKE PROTEIN OF SARS-CoV-2

1. CROSS-REFERENCE TO RELATED APPLICATIONS

This application claims the priority benefit of U.S. Provisional Application No. 63/336,332, filed on Apr. 29, 2022, and U.S. Provisional Application No. 63/371,454, filed on Aug. 15, 2022, each of which is incorporated herein by reference in its entirety.

2. REFERENCE TO SEQUENCE LISTING SUBMITTED ELECTRONICALLY

The content of the electronically submitted sequence listing in ASCII text file (File name: 2943_218PC02_SequenceListing_ST26; Size: 89,789 bytes; and Date of Creation: Apr. 24, 2023) filed with the application is incorporated herein by reference in its entirety.

3. Field

The present disclosure relates to antibodies and antigen-binding fragments thereof that specifically bind to the spike protein of SARS-COV-2 and methods of using the same.

4. BACKGROUND

A coronavirus 2019 (COVID 19) pandemic caused by severe acute respiratory syndrome coronavirus 2 (SARS-COV-2) has emerged. SARS-COV-2 was first identified in Wuhan, China, in December 2019, and it quickly caused infections worldwide. The virus's mortality rate is currently uncertain, but the number of global cases and the deaths is staggering. The virus is capable of person-to-person spread through small droplets from the nose or mouth, which are expelled when an infected person coughs, sneezes, or speaks. The incubation period (time from exposure to onset of symptoms) ranges from 0 to 24 days, with a mean of 3-5 days, but it may be contagious during this period after recovery. Most people who contract SARS-COV-2 show symptoms within 11.5 days of exposure. Symptoms include fever, coughing and breathing difficulties. The virus has a greater impact on patients of advanced age, with type 2 diabetes, cardiac disease, chronic obstructive pulmonary disease (COPD), and/or obesity. Most patient contracting the virus have mild symptoms, but in some patients, the infection in the lung is severe causing severe respiratory distress or even death.

Several vaccines intended to prevent COVID-19 have been approved, and a combination of antibodies (Evusheld) is available for pre-exposure prophylaxis, but these have less efficacy against variants that have emerged after their development than against older variants. Thus, there is an urgent need for medicaments capable of preventing and treating COVID-19, including those cases caused by new variants of the virus.

5. SUMMARY

Provided herein are antibodies or antigen-binding fragments thereof as well as compositions and combinations thereof that bind to the spike protein of SARS-COV-2. In some aspects, a composition or combination comprises (i) a first antibody or antigen-binding fragment thereof that specifically binds to the spike protein of SARS-COV-2, wherein the first antibody or antigen-binding fragment thereof comprises the VH-CDR1, VH-CDR2, VH-CDR3, VL-CDR1, VL-CDR2, and VL-CDR3 of SEQ ID NOs: 31, 32, 37, 34, 35, and 36, respectively; and (ii) a second antibody or antigen-binding fragment thereof that specifically binds to the spike protein of SARS-COV-2, wherein the second antibody or antigen-binding fragment thereof comprises the VH-CDR1, VH-CDR2, VH-CDR3, VL-CDR1, VL-CDR2, and VL-CDR3 of SEQ ID NOs: 69, 70, 71, 73, 74, and 75, respectively.

In some aspects, a composition or combination comprises (i) a first antibody or antigen-binding fragment thereof that specifically binds to the spike protein of SARS-COV-2, wherein the first antibody or antigen-binding fragment thereof competitively inhibits binding to the spike protein of SARS-COV-2 of an antibody comprising a variable heavy chain (VH) comprising the amino acid sequence of SEQ ID NO:63 and a variable light chain (VL) comprising the amino acid sequence of SEQ ID NO:61 and (ii) a second antibody or antigen-binding fragment thereof that specifically binds to the spike protein of SARS-COV-2, wherein the second antibody or antigen-binding fragment thereof competitively inhibits binding to the spike protein of SARS-COV-2 of an antibody comprising a variable heavy chain (VH) comprising the amino acid sequence of SEQ ID NO: 68 and a variable light chain (VL) comprising the amino acid sequence of SEQ ID NO:72.

In some aspects, a composition or combination comprises (i) a first antibody or antigen-binding fragment thereof that specifically binds to the spike protein of SARS-COV-2, wherein the first antibody or antigen-binding fragment thereof binds to the same epitope of the spike protein of SARS-COV-2 as an antibody comprising a variable heavy chain (VH) comprising the amino acid sequence of SEQ ID NO:63 and a variable light chain (VL) comprising the amino acid sequence of SEQ ID NO:61 and (ii) a second antibody or antigen-binding fragment thereof that specifically binds to the spike protein of SARS-COV-2, wherein the second antibody or antigen-binding fragment thereof binds to the same epitope of the spike protein of SARS-COV-2 as an antibody comprising a variable heavy chain (VH) comprising the amino acid sequence of SEQ ID NO:68 and a variable light chain (VL) comprising the amino acid sequence of SEQ ID NO:72.

In some aspects, the first antibody or antigen-binding fragment thereof comprises the VH-CDR1, VH-CDR2, VH-CDR3, VL-CDR1, VL-CDR2, and VL-CDR3 of SEQ ID NOs: 31, 32, 37, 34, 35, and 36, respectively. In some aspects, the first antibody or antigen-binding fragment thereof comprises a VH comprising the amino acid sequence of SEQ ID NO:63 and a VL comprising the amino acid sequence of SEQ ID NO:61.

In some aspects, the second antibody or antigen-binding fragment thereof comprises the VH-CDR1, VH-CDR2, VH-CDR3, VL-CDR1, VL-CDR2, and VL-CDR3 of SEQ ID NOs: 69, 70, 71, 73, 74, and 74, respectively. In some aspects, the second antibody or antigen-binding fragment thereof comprises a VH comprising the amino acid sequence of SEQ ID NO:68 and a VL comprising the amino acid sequence of SEQ ID NO:72. In some aspects, the second antibody comprises a heavy chain comprising the amino acid sequence of SEQ ID NO:76 and a light chain comprising the amino acid sequence of SEQ ID NO:77.

In some aspects, the first antibody or antigen-binding fragment thereof comprises a VH comprising the amino acid sequence of SEQ ID NO:63 and/or a VL comprising the amino acid sequence of SEQ ID NO:61. In some aspects, the second antibody or antigen-binding fragment thereof comprises a VH comprising the amino acid sequence of SEQ ID NO:68 and/or a VL comprising the amino acid sequence of SEQ ID NO:72. In some aspects, the second antibody comprises a heavy chain comprising the amino acid sequence of SEQ ID NO:76 and/or a light chain comprising the amino acid sequence of SEQ ID NO:77.

In some aspects, the composition or combination neutralizes SARS-COV-2 virus, optionally wherein the composition or combination neutralizes SARS-COV-2 BA.2.12.1 with an IC50 of 25 ng/ml or less or with an IC50 of 20 ng/ml or less. In some aspects, the composition or combination neutralizes SARS-COV-2 D614G, SARS-COV-2 alpha, SARS-COV-2 delta+T51I+T95I, SARS-COV-2 BA.1, SARS-COV-2 BA.1.1, SARS-COV-2 BA.2, SARS-COV-2 BA.2.12.1, and/or SARS-COV-2 BA.5 virus with an IC50 of 75 ng/ml or less or with an IC50 of less than 60 ng/ml or less.

In some aspects, the first antibody or antigen-binding fragment is fully human and/or the second antibody or antigen-binding fragment is fully human. In some aspects, first antibody or antigen-binding fragment comprises a light chain constant region and/or the second antibody or antigen-binding fragment comprises a light chain constant region. In some aspects, the first antibody or antigen-binding fragment comprises a light chain constant region selected from the group consisting of human immunoglobulins IgGκ and IgGλ light chain constant regions, optionally wherein the light chain constant region is a human IgGκ light chain constant region and/or the second antibody or antigen-binding fragment comprises a light chain constant region selected from the group consisting of human immunoglobulins IgGκ and IgGλ light chain constant regions, optionally wherein the light chain constant region is a human IgGκ light chain constant region. In some aspects, the first antibody or antigen-binding fragment comprises a heavy chain constant region and/or the second antibody or antigen-binding fragment comprises a heavy chain constant region. In some aspects, the first antibody or antigen-binding fragment comprises a heavy chain constant region selected from the group consisting of human immunoglobulins IgG1, IgG2, IgG3, IgG4, IgA1, and IgA2 heavy chain constant regions, optionally wherein the heavy chain constant region is a human IgG1 and/or the second antibody or antigen-binding fragment comprises a heavy chain constant region selected from the group consisting of human immunoglobulins IgG1, IgG2, IgG3, IgG4, IgA1, and IgA2 heavy chain constant regions, optionally wherein the heavy chain constant region is a human IgG1 heavy chain constant region. In some aspects, the first antibody or antigen-binding fragment comprises (i) a human IgG1 heavy chain constant region and (ii) a human IgGκ light chain constant region and/or the second antibody or antigen-binding fragment comprises (i) a human IgG1 heavy chain constant region and (ii) a human IgGκ light chain constant region.

In some aspects, the first antibody or antigen-binding fragment comprises a heavy chain constant region comprising a YTE mutation, optionally wherein the heavy chain constant region is a human IgG1 heavy chain constant region, and a light chain constant region, optionally wherein the light chain constant region is a human IgGκ light chain constant region and/or the second antibody or antigen-binding fragment comprises a heavy chain constant region comprising a YTE mutation, optionally wherein the heavy chain constant region is a human IgG1 heavy chain constant region. In some aspects, the first antibody or antigen-binding fragment comprises a heavy chain constant region comprising a TM mutation, optionally wherein the heavy chain constant region is a human IgG1 heavy chain constant region, and a light chain constant region, optionally wherein the light chain constant region is a human IgGκ light chain constant region and/or the second antibody or antigen-binding fragment comprises a heavy chain constant region comprising a TM mutation, optionally wherein the heavy chain constant region is a human IgG1 heavy chain constant region.

In some aspects, the first antibody or antigen-binding fragment comprises a heavy chain constant region comprising the amino acid sequence of SEQ ID NO:66 and/or the second antibody or antigen-binding fragment comprises a heavy chain constant region comprising the amino acid sequence of SEQ ID NO:66.

In some aspects, the first antibody or antigen-binding fragment is a full-length antibody and/or the second antibody or antigen-binding fragment is a full-length antibody.

In some aspects, the first antibody or antigen-binding fragment is an antigen-binding fragment and/or wherein the second antibody or antigen-binding fragment is an antigen-binding fragment. In some aspects, the first antigen-binding fragment comprises a Fab, Fab', F(ab')$_2$, single chain Fv (scFv), disulfide linked Fv, V-NAR domain, IgNar, IgGΔCH2, minibody, F(ab')$_3$, tetrabody, triabody, diabody, single-domain antibody, (scFv)$_2$, or scFv-Fc and/or the second antigen-binding fragment comprises a Fab, Fab', F(ab')$_2$, single chain Fv (scFv), disulfide linked Fv, V-NAR domain, IgNar, IgGΔCH2, minibody, F(ab')$_3$, tetrabody, triabody, diabody, single-domain antibody, (scFv)$_2$, or scFv-Fc.

In some aspects, the first antibody or antigen-binding fragment is isolated and/or the second antibody or antigen-binding fragment is isolated. In some aspects, the first antibody or antigen-binding fragment is monoclonal and/or the second antibody or antigen-binding fragment is monoclonal. In some aspects, the first antibody or antigen-binding fragment is recombinant and/or the second antibody or antigen-binding fragment is recombinant.

In some aspects, a composition or combination comprises (i) a first human IgG1 antibody or antigen-binding fragment thereof that specifically binds to the spike protein of SARS-CoV-2, wherein the first antibody or antigen-binding fragment comprises a variable heavy chain (VH) comprising the amino acid sequence of SEQ ID NO:63, a variable light chain (VL) comprising the amino acid sequence of SEQ ID NO:61, a heavy chain constant region comprising a YTE mutation and a TM mutation, and a light chain constant region; and (ii) a second human IgG1 antibody or antigen-binding fragment thereof that specifically binds to the spike protein of SARS-COV-2, wherein the second antibody or antigen-binding fragment comprises a variable heavy chain (VH) comprising the amino acid sequence of SEQ ID NO:68, a variable light chain (VL) comprising the amino acid sequence of SEQ ID NO:72, a heavy chain constant region comprising a YTE mutation and a TM mutation, and a light chain constant region. In some aspects, the heavy chain constant region of the first human IgG1 antibody or antigen-binding fragment comprises the amino acid sequence of SEQ ID NO:66 and/or the heavy chain constant region of the first human IgG1 antibody or antigen-binding fragment comprises the amino acid sequence of SEQ ID NO:66. In some aspects, the second human IgG1 antibody comprises a heavy chain comprising the amino acid sequence of SEQ ID NO:76 and a light chain comprising the amino acid sequence of SEQ ID NO:77.

In some aspects, the composition is a pharmaceutical composition further comprising a pharmaceutically acceptable carrier.

In some aspects, the first antibody or antigen-binding fragment thereof and the second antibody or antigen-binding fragment thereof are in the same composition, optionally wherein the composition is a pharmaceutical composition. In some aspects, the first antibody or antigen-binding fragment thereof and the second antibody or antigen-binding fragment thereof are in separate compositions, optionally wherein the first antibody or antigen-binding fragment thereof and/or the second antibody or antigen-binding fragment thereof is in a pharmaceutical composition.

In some aspects, an antibody or antigen-binding fragment thereof that specifically binds to the spike protein of SARS-COV-2, comprises the VH-CDR1, VH-CDR2, VH-CDR3, VL-CDR1, VL-CDR2, and VL-CDR3 of: (i) SEQ ID NOs: 31, 32, 37, 34, 35, and 36, respectively; (ii) SEQ ID NOs: 25, 26, 30, 28, 67, and 29, respectively; or (iii) SEQ ID NOs: 13, 14, 19, 16, 17, and 18, respectively.

In some aspects, an antibody or antigen-binding fragment thereof that specifically binds to the spike protein of SARS-COV-2 comprises: (a) a variable heavy chain (VH) comprising the amino acid sequence of SEQ ID NO:40 and/or a variable light chain (VL) comprising the amino acid sequence of SEQ ID NO:41; (b) a variable heavy chain (VH) comprising the amino acid sequence of SEQ ID NO:44 and/or a variable light chain (VL) comprising the amino acid sequence of SEQ ID NO:45; (c) a variable heavy chain (VH) comprising the amino acid sequence of SEQ ID NO: 48 and and/or variable light chain (VL) comprising the amino acid sequence of SEQ ID NO: 47; (d) a variable heavy chain (VH) comprising the amino acid sequence of SEQ ID NO:49 and/or a variable light chain (VL) comprising the amino acid sequence of SEQ ID NO:47; (e) a variable heavy chain (VH) comprising the amino acid sequence of SEQ ID NO:52 and and/or variable light chain (VL) comprising the amino acid sequence of SEQ ID NO:53; (f) a variable heavy chain (VH) comprising the amino acid sequence of SEQ ID NO:56 and and/or variable light chain (VL) comprising the amino acid sequence of SEQ ID NO:57; (g) a variable heavy chain (VH) comprising the amino acid sequence of SEQ ID NO:58 and/or a variable light chain (VL) comprising the amino acid sequence of SEQ ID NO:57; (h) a variable heavy chain (VH) comprising the amino acid sequence of SEQ ID NO:59 and/or a variable light chain (VL) comprising the amino acid sequence of SEQ ID NO:55; (i) a variable heavy chain (VH) comprising the amino acid sequence of SEQ ID NO:62 and and/or variable light chain (VL) comprising the amino acid sequence of SEQ ID NO:61; (j) a variable heavy chain (VH) comprising the amino acid sequence of SEQ ID NO:63 and and/or variable light chain (VL) comprising the amino acid sequence of SEQ ID NO:61; (k) a variable heavy chain (VH) comprising the amino acid sequence of SEQ ID NO:60 and/or a variable light chain (VL) comprising the amino acid sequence of SEQ ID NO: 64; (l) a variable heavy chain (VH) comprising the amino acid sequence of SEQ ID NO:62 and and/or variable light chain (VL) comprising the amino acid sequence of SEQ ID NO:64; or (m) a variable heavy chain (VH) comprising the amino acid sequence of SEQ ID NO:63 and/or a variable light chain (VL) comprising the amino acid sequence of SEQ ID NO:64.

In some aspects, the antibody or antigen-binding fragment neutralizes SARS-COV-2 pseudovirus. In some aspects, the antibody or antigen-binding fragment thereof neutralizes SARS-CoV-2 BA.1, SARS-COV-2 BA1.1, SARS-COV-2 BA.2, SARS-COV-2 Delta, and/or SARS-COV-2 D614G pseudovirus with an EC50 of 100 ng/ml or less.

In some aspects, the antibody or antigen-binding fragment is fully human.

In some aspects, the antibody or antigen-binding fragment comprises a light chain constant region. In some aspects, the light chain constant region is selected from the group consisting of human immunoglobulins IgGκ and IgGλ light chain constant regions, optionally wherein the light chain constant region is a human IgGκ light chain constant region.

In some aspects, the antibody or antigen-binding fragment comprises a heavy chain constant region. In some aspects, the heavy chain constant region is selected from the group consisting of human immunoglobulins IgG1, IgG2, IgG3, IgG4, IgA1, and IgA2 heavy chain constant regions. In some aspects, the heavy chain constant region is a human IgG1 heavy chain constant region.

In some aspects, the antibody or antigen-binding fragment comprises (i) a human IgG1 heavy chain constant region and (ii) a human IgGκ light chain constant region.

In some aspects, the antibody or antigen-binding fragment comprises a heavy chain constant region comprising a YTE mutation, optionally wherein the heavy chain constant region is a human IgG1 heavy chain constant region. In some aspects, the antibody or antigen-binding fragment comprises a heavy chain constant region comprising a TM mutation, optionally wherein the heavy chain constant region is a human IgG1 heavy chain constant region. In some aspects, the antibody or antigen-binding fragment comprises a heavy chain constant region comprising a YTE mutation and a TM mutation, optionally wherein the heavy chain constant region is a human IgG1 heavy chain constant region. In some aspects, the antibody or antigen-binding fragment comprises a heavy chain constant region comprising the amino acid sequence of SEQ ID NO:66.

In some aspects, the antibody or antigen-binding fragment thereof is a full-length antibody. In some aspects, the antibody or antigen-binding fragment thereof is an antigen-binding fragment. In some aspects, the antigen-binding fragment comprises a Fab, Fab', F(ab')$_2$, single chain Fv (scFv), disulfide linked Fv, V-NAR domain, IgNar, IgGΔCH2, minibody, F(ab')$_3$, tetrabody, triabody, diabody, single-domain antibody, (scFv)$_2$, or scFv-Fc.

In some aspects, the antibody or antigen-binding fragment is isolated. In some aspects, the antibody or antigen-binding fragment is monoclonal. In some aspects, the antibody or antigen-binding fragment is recombinant.

In some aspects, the antibody or antigen-binding fragment thereof further comprises a detectable label.

Also provided herein are polynucleotides.

In some aspects, an isolated polynucleotide comprises a nucleic acid molecule encoding the heavy chain variable region and/or a nucleic acid molecule encoding the light chain variable region of an antibody or antigen-binding fragment thereof provided herein.

Vectors are also provided herein. In some aspects, an isolated vector comprises a polynucleotide provided herein.

Host cells are also provided herein. In some aspects, a host cell comprises a polynucleotide provided herein, a vector provided herein, or a first vector comprising a nucleic acid molecule encoding the heavy chain variable region and a second vector comprising a nucleic acid molecule encoding the light chain variable region of an antibody or antigen-binding fragment thereof provided herein.

Methods of producing antibodies and antigen-binding fragments thereof are also provided herein. In some aspects, a method of producing an antibody or antigen-binding fragment thereof that binds to the spike protein of SARS-COV-2 comprises culturing a host cell provided herein so that the nucleic acid molecule is expressed and the antibody or antigen-binding fragment thereof is produced. In some aspects, the method further comprises isolating the antibody or antigen-binding fragment. Also provided herein are antibodies and antigen-binding fragments produced by the methods provided herein.

Compositions are also provided herein. In some aspects, a composition comprises an antibody or antigen-binding fragment thereof provided herein. In some aspects, the composition is a pharmaceutical composition further comprising a pharmaceutically acceptable excipient.

Compositions and combinations are also provided herein. In some aspects, a composition or combination comprises: a first antibody or antigen-binding fragment thereof that specifically binds to the spike protein of SARS-COV-2, wherein the first antibody or antigen-binding fragment thereof competitively inhibits binding to the spike protein of SARS-COV-2 of an antibody comprising a variable heavy chain (VH) comprising the amino acid sequence of SEQ ID NO: 46 and a variable light chain (VL) comprising the amino acid sequence of SEQ ID NO:47; and a second antibody or antigen-binding fragment thereof that specifically binds to the spike protein of SARS-COV-2, wherein the second antibody or antigen-binding fragment thereof competitively inhibits binding to the spike protein of SARS-COV-2 of an antibody comprising (i) a variable heavy chain (VH) comprising the amino acid sequence of SEQ ID NO:63 and a variable light chain (VL) comprising the amino acid sequence of SEQ ID NO:61 or (ii) a variable heavy chain (VH) comprising the amino acid sequence of SEQ ID NO:52 and a variable light chain (VL) comprising the amino acid sequence of SEQ ID NO:53.

In some aspects, a composition or combination comprises: a first antibody or antigen-binding fragment thereof that specifically binds to the spike protein of SARS-COV-2, wherein the first antibody or antigen-binding fragment thereof binds to the same epitope of the spike protein of SARS-COV-2 as an antibody comprising a variable heavy chain (VH) comprising the amino acid sequence of SEQ ID NO:46 and a variable light chain (VL) comprising the amino acid sequence of SEQ ID NO:47; and a second antibody or antigen-binding fragment thereof that specifically binds to the spike protein of SARS-COV-2, wherein the second antibody or antigen-binding fragment thereof binds to the same epitope of the spike protein of SARS-COV-2 as an antibody comprising (i) a variable heavy chain (VH) comprising the amino acid sequence of SEQ ID NO:63 and a variable light chain (VL) comprising the amino acid sequence of SEQ ID NO:61 or (ii) a variable heavy chain (VH) comprising the amino acid sequence of SEQ ID NO:52 and a variable light chain (VL) comprising the amino acid sequence of SEQ ID NO:53.

In some aspects, the first antibody or antigen-binding fragment thereof comprises the VH-CDR1, VH-CDR2, VH-CDR3, VL-CDR1, VL-CDR2, and VL-CDR3 of SEQ ID NOs: 13, 14, 15, 16, 17, and 18, respectively. In some aspects, the first antibody or antigen-binding fragment thereof comprises a VH comprising the amino acid sequence of SEQ ID NO:46 and a VL comprising the amino acid sequence of SEQ ID NO:47.

In some aspects, the second antibody or antigen-binding fragment thereof comprises the VH-CDR1, VH-CDR2, VH-CDR3, VL-CDR1, VL-CDR2, and VL-CDR3 of SEQ ID NOs: 31, 32, 37, 34, 35, and 36, respectively. In some aspects, the second antibody or antigen-binding fragment thereof comprises (i) a VH comprising the amino acid sequence of SEQ ID NO:63 and a VL comprising the amino acid sequence of SEQ ID NO:61; (ii) a VH comprising the amino acid sequence of SEQ ID NO:60 and a VL comprising the amino acid sequence of SEQ ID NO:61; (iii) a VH comprising the amino acid sequence of SEQ ID NO:62 and a VL comprising the amino acid sequence of SEQ ID NO:61; (iv) a VH comprising the amino acid sequence of SEQ ID NO:60 and a VL comprising the amino acid sequence of SEQ ID NO:64; (v) a VH comprising the amino acid sequence of SEQ ID NO:62 and a VL comprising the amino acid sequence of SEQ ID NO:64; or (vi) a VH comprising the amino acid sequence of SEQ ID NO:63 and a VL comprising the amino acid sequence of SEQ ID NO:64.

In some aspects, the second antibody or antigen-binding fragment thereof comprises the VH-CDR1, VH-CDR2, VH-CDR3, VL-CDR1, VL-CDR2, and VL-CDR3 of SEQ ID NOs: 20, 21, 22, 23, 67, and 24, respectively. In some aspects, the second antibody or antigen-binding fragment thereof comprises (i) a VH comprising the amino acid sequence of SEQ ID NO:52 and a VL comprising the amino acid sequence of SEQ ID NO:53 or (ii) a VH comprising the amino acid sequence of SEQ ID NO:50 and a VL comprising the amino acid sequence of SEQ ID NO:51.

In some aspects, a composition or combination comprises: a first antibody or antigen-binding fragment thereof that specifically binds to the spike protein of SARS-COV-2, wherein the first antibody or antigen-binding fragment thereof comprises the VH-CDR1, VH-CDR2, VH-CDR3, VL-CDR1, VL-CDR2, and VL-CDR3 of SEQ ID NOs: 13, 14, 15, 16, 17, and 18, respectively; and a second antibody or antigen-binding fragment thereof that specifically binds to the spike protein of SARS-COV-2, wherein the second antibody or antigen-binding fragment thereof comprises (i) the VH-CDR1, VH-CDR2, VH-CDR3, VL-CDR1, VL-CDR2, and VL-CDR3 of SEQ ID NOs: 31, 32, 37, 34, 35, and 36, respectively or (ii) the VH-CDR1, VH-CDR2, VH-CDR3, VL-CDR1, VL-CDR2, and VL-CDR3 of SEQ ID NOs: 20, 21, 22, 23, 67, and 24, respectively.

In some aspects, the first antibody or antigen-binding fragment thereof comprises a VH comprising the amino acid sequence of SEQ ID NO:46 and/or a VL comprising the amino acid sequence of SEQ ID NO:47.

In some aspects, the second antibody or antigen-binding fragment thereof comprises a VH comprising the amino acid sequence of SEQ ID NO:63 and/or a VL comprising the amino acid sequence of SEQ ID NO:61.

In some aspects, the second antibody or antigen-binding fragment thereof comprises a VH comprising the amino acid sequence of SEQ ID NO:52 and/or a VL comprising the amino acid sequence of SEQ ID NO:53.

In some aspects, the composition or combination neutralizes SARS-COV-2 pseudovirus, optionally wherein the composition or combination neutralizes SARS-COV-2 BA.1, SARS-COV-2 BA1.1, SARS-COV-2 BA.2, SARS-COV-2 Delta, and/or SARS-COV-2 D614G pseudovirus with an EC50 of 75 ng/mL or less. In some aspects, the composition or combination (i) neutralizes SARS-COV-2 BA.1, SARS-COV-2 BA1.1, and/or SARS-COV-2 BA.2 pseudovirus with an EC50 of 25 ng/mL or less and/or (ii) neutralizes SARS-COV-2 Delta and/or SARS-COV-2 D614G pseudovirus with an EC50 of 75 ng/mL or less.

In some aspects, the first antibody or antigen-binding fragment is fully human and/or the second antibody or antigen-binding fragment is fully human.

In some aspects, the first antibody or antigen-binding fragment comprises a light chain constant region and/or the second antibody or antigen-binding fragment comprises a light chain constant region. In some aspects, the first antibody or antigen-binding fragment comprises a light chain constant region selected from the group consisting of human immunoglobulins IgGκ and IgGλ light chain constant regions, optionally wherein the light chain constant region is a human IgGκ light chain constant region and/or the second antibody or antigen-binding fragment comprises a light chain constant region selected from the group consisting of human immunoglobulins IgGκ and IgGλ light chain constant regions, optionally wherein the light chain constant region is a human IgGκ light chain constant region.

In some aspects, the first antibody or antigen-binding fragment comprises a heavy chain constant region and/or the second antibody or antigen-binding fragment comprises a heavy chain constant region. In some aspects, the first antibody or antigen-binding fragment comprises a heavy chain constant region selected from the group consisting of human immunoglobulins IgG1, IgG2, IgG3, IgG4, IgA1, and IgA2 heavy chain constant regions, optionally wherein the heavy chain constant region is a human IgG1 and/or the second antibody or antigen-binding fragment comprises a heavy chain constant region selected from the group consisting of human immunoglobulins IgG1, IgG2, IgG3, IgG4, IgA1, and IgA2 heavy chain constant regions, optionally wherein the heavy chain constant region is a human IgG1 heavy chain constant region.

In some aspects, the first antibody or antigen-binding fragment comprises (i) a human IgG1 heavy chain constant region and (ii) a human IgGκ light chain constant region and/or the second antibody or antigen-binding fragment comprises (i) a human IgG1 heavy chain constant region and (ii) a human IgGκ light chain constant region.

In some aspects, the first antibody or antigen-binding fragment comprises a heavy chain constant region comprising a YTE mutation, optionally wherein the heavy chain constant region is a human IgG1 heavy chain constant region, and a light chain constant region, optionally wherein the light chain constant region is a human IgGκ light chain constant region and/or the second antibody or antigen-binding fragment comprises a heavy chain constant region comprising a YTE mutation, optionally wherein the heavy chain constant region is a human IgG1 heavy chain constant region.

In some aspects, the first antibody or antigen-binding fragment comprises a heavy chain constant region comprising a TM mutation, optionally wherein the heavy chain constant region is a human IgG1 heavy chain constant region, and a light chain constant region, optionally wherein the light chain constant region is a human IgGκ light chain constant region and/or the second antibody or antigen-binding fragment comprises a heavy chain constant region comprising a TM mutation, optionally wherein the heavy chain constant region is a human IgG1 heavy chain constant region.

In some aspects, the first antibody or antigen-binding fragment comprises a heavy chain constant region comprising the amino acid sequence of SEQ ID NO:66 and/or the second antibody or antigen-binding fragment comprises a heavy chain constant region comprising the amino acid sequence of SEQ ID NO:66.

In some aspects, the first antibody or antigen-binding fragment is a full-length antibody and/or the second antibody or antigen-binding fragment is a full-length antibody. In some aspects, the first antibody or antigen-binding fragment is an antigen-binding fragment and/or the second antibody or antigen-binding fragment is an antigen-binding fragment. In some aspects, the first antigen-binding fragment comprises a Fab, Fab', F(ab')$_2$, single chain Fv (scFv), disulfide linked Fv, V-NAR domain, IgNar, IgGΔCH2, minibody, F(ab')$_3$, tetrabody, triabody, diabody, single-domain antibody, (scFv)$_2$, or scFv-Fc and/or the second antigen-binding fragment comprises a Fab, Fab', F(ab')$_2$, single chain Fv (scFv), disulfide linked Fv, V-NAR domain, IgNar, IgGΔCH2, minibody, F(ab')$_3$, tetrabody, triabody, diabody, single-domain antibody, (scFv)$_2$, or scFv-Fc.

In some aspects, the first antibody or antigen-binding fragment is isolated and/or the second antibody or antigen-binding fragment is isolated. In some aspects, the first antibody or antigen-binding fragment is monoclonal and/or the second antibody or antigen-binding fragment is monoclonal. In some aspects, the first antibody or antigen-binding fragment is recombinant and/or the second antibody or antigen-binding fragment is recombinant.

In some aspects, a composition or combination comprises: a first human IgG1 antibody or antigen-binding fragment thereof that specifically binds to the spike protein of SARS-COV-2, wherein the first antibody or antigen-binding fragment comprises a variable heavy chain (VH) comprising the amino acid sequence of SEQ ID NO:46, a variable light chain (VL) comprising the amino acid sequence of SEQ ID NO:47, a heavy chain constant region comprising a YTE mutation and a TM mutation, and a light chain constant region; and a second human IgG1 antibody or antigen-binding fragment thereof that specifically binds to the spike protein of SARS-COV-2, wherein the second antibody or antigen-binding fragment comprises a variable heavy chain (VH) comprising the amino acid sequence of SEQ ID NO:63, a variable light chain (VL) comprising the amino acid sequence of SEQ ID NO:61, a heavy chain constant region comprising a YTE mutation and a TM mutation, and a light chain constant region.

In some aspects, a composition or combination comprises: a first human IgG1 antibody or antigen-binding fragment thereof that specifically binds to the spike protein of SARS-COV-2, wherein the first antibody or antigen-binding fragment comprises a variable heavy chain (VH) comprising the amino acid sequence of SEQ ID NO:46, a variable light chain (VL) comprising the amino acid sequence of SEQ ID NO:47, a heavy chain constant region comprising a YTE mutation and a TM mutation, and a light chain constant region; and a second human IgG1 antibody or antigen-binding fragment thereof that specifically binds to the spike protein of SARS-COV-2, wherein the second antibody or antigen-binding fragment comprises a variable heavy chain (VH) comprising the amino acid sequence of SEQ ID NO:52, a variable light chain (VL) comprising the amino acid sequence of SEQ ID NO:53, a heavy chain constant region comprising a YTE mutation and a TM mutation, and a light chain constant region.

In some aspects, a composition or combination comprises: a first human IgG1 antibody or antigen-binding fragment thereof that specifically binds to the spike protein of SARS-COV-2, wherein the first antibody or antigen-binding fragment comprises a variable heavy chain (VH) comprising the amino acid sequence of SEQ ID NO:46, a variable light chain (VL) comprising the amino acid sequence of SEQ ID NO:47, a heavy chain constant region comprising a YTE mutation and a TM mutation, and a light chain constant region; and a second human IgG1 antibody or antigen-binding fragment thereof that specifically binds to the spike protein of SARS-COV-2, wherein the second antibody or antigen-binding fragment comprises a variable heavy chain (VH) comprising the amino acid sequence of SEQ ID NO:50, a variable light chain (VL) comprising the amino acid sequence of SEQ ID NO:51, a heavy chain constant region comprising a YTE mutation and a TM mutation, and a light chain constant region.

In some aspects, the heavy chain constant region of the first human IgG1 antibody or antigen-binding fragment comprises the amino acid sequence of SEQ ID NO:66 and/or the heavy chain constant region of the first human IgG1 antibody or antigen-binding fragment comprises the amino acid sequence of SEQ ID NO:66.

In some aspects, the composition is a pharmaceutical composition further comprising a pharmaceutically acceptable carrier.

In some aspects of a combination provided herein, the first antibody or antigen-binding fragment thereof and the second antibody or antigen-binding fragment thereof are in the same composition, optionally wherein the composition is a pharmaceutical composition. In some aspects, the first antibody or antigen-binding fragment thereof and the second antibody or antigen-binding fragment thereof are in separate compositions, optionally wherein the first antibody or antigen-binding fragment thereof and/or the second antibody or antigen-binding fragment thereof is in a pharmaceutical composition.

Also provided herein are methods for neutralizing SARS-COV-2. In some aspects, a method for neutralizing SARS-COV-2 comprises contacting the SARS-COV-2 with an antibody or antigen-binding fragment thereof provided herein or a composition or combination provided herein. In some aspects, the contacting is in vitro. In some aspects, the contacting is in a subject.

Also provided herein are methods for pre-exposure prophylaxis of SARS-COV-2. In some aspects, a method for providing pre-exposure prophylaxis of SARS-COV-2 in a subject comprises administering to the subject an effective amount of a composition or combination provided herein. In some aspects, the subject is not currently infected with SARS-COV-2. In some aspects, the subject does not have a known recent exposure to an individual infected with SARS-CoV-2. In some aspects, the subject has a moderate to severe immune compromise. In some aspects, the moderate to severe immune compromise is due to a medical condition or receipt of immunosuppressive medications or treatments. In some aspects, the subject may not mount an adequate immune response to COVID-19 vaccination. In some aspects, COVID-19 vaccination is not recommended for the subject. In some aspects, COVID-19 vaccination is not recommended due to a history of severe adverse reaction to a COVID-19 vaccine and/or a COVID-19 vaccine component. In some aspects, the first antibody or antigen-binding fragment thereof and the second antibody or antigen-binding fragment thereof are administered sequentially.

Also provided herein are methods of treating or preventing a SARS-COV-2 infection. In some aspects, a method of treating or preventing a SARS-COV-2 infection in a subject comprises administering to the subject an effective amount of a combination provided herein, wherein the first antibody or antigen-binding fragment thereof and the second antibody or antigen-binding fragment thereof are administered sequentially. In some aspects, the first antibody or antigen-binding fragment thereof is administered prior to the administration of the second antibody or antigen-binding fragment thereof. In some aspects, the first antibody or antigen-binding fragment thereof is administered after the administration of the second antibody or antigen-binding fragment thereof. In some aspects, the first antibody or antigen-binding is administered intramuscularly and/or wherein the second antibody or antigen-binding fragment thereof is administered intramuscularly.

In some aspects, a method for providing pre-exposure prophylaxis of SARS-COV-2 in a subject comprises administering to the subject an effective amount of an antibody or antigen-binding fragment thereof provided herein. In some aspects, a method of treating or preventing a SARS-COV-2 infection in a subject comprises administering to the subject an effective amount of the antibody or antigen-binding fragment thereof provided herein. In some aspects, the administration is intramuscularly.

In some aspects of the methods provided herein, the subject has been exposed to SARS-CoV-2 or is at risk of exposure to SARS-COV-2.

In some aspects of the methods provided herein, the subject is human.

In some aspects of the methods provided herein, the SARS-COV-2 is SARS-COV-2 BA.1, SARS-COV-2 BA1.1, SARS-COV-2 BA.2, SARS-COV-2 Beta, SARS-COV-2 Delta, and/or SARS-COV-2 D614G. In some aspects of the methods provided herein, the SARS-COV-2 is SARS-COV-2 BA.2.12.1.

Also provided herein are methods for detecting SARS-COV-2. In some aspects, a method for detecting SARS-COV-2 in a sample comprises contacting the sample with an antibody or antigen-binding fragment provided herein or a composition or combination provided herein.

6. BRIEF DESCRIPTION OF THE FIGURES

FIG. 1 shows SARS-COV-2 pseudovirus neutralization by RQ33, RQ40, RQ41, and RQ43 antibodies. (See Example 17.)

FIG. 2 shows SARS-COV-2 pseudovirus neutralization by combinations of antibodies. (See Example 17.)

Figure 3:
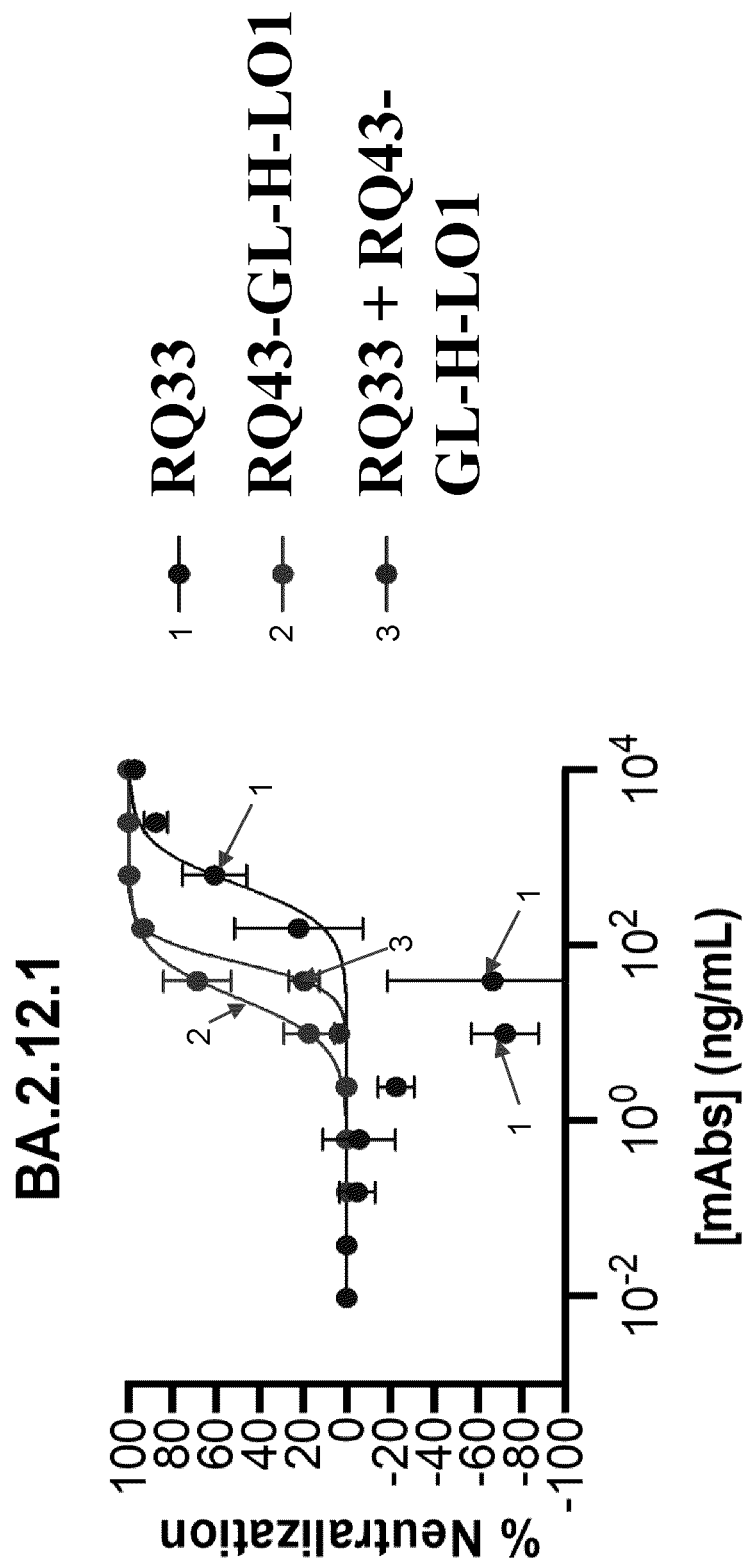

FIG. 3 shows in vitro neutralization activity of RQ33, RQ43-GL-H-LO1, and the combination of RQ33+RQ43-GL-H-LO1 against SARS-COV-2 BA.2.12.1 VOC by focus reduction neutralization test (FRNT) assay. The assay was repeated in two independent replicates, each in duplicate. Non-linear regression dose-response curves depict the mean and standard deviation of both replicates at each dilution. mAb, monoclonal antibody; VOC, variant of concern (See Example 18.)

Figure 4:
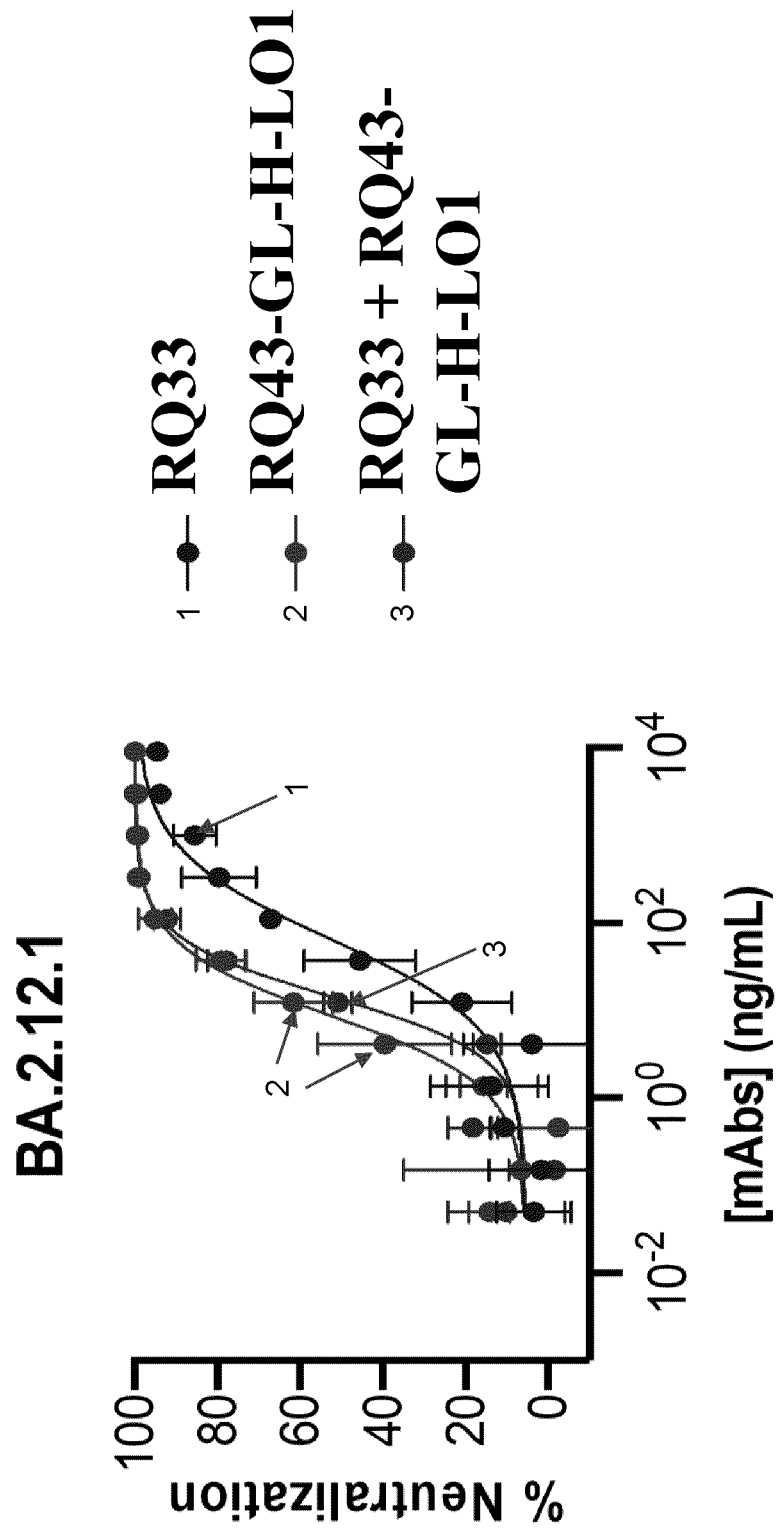

FIG. 4 shows in vitro neutralization curves for pseudovirus with spike from SARS-COV-2 omicron BA.2.12.1 VOC by pseudovirus neutralization assay. The assay was repeated in three independent replicates, each in triplicate. Non-linear regression dose-response curves depict a representative replicate with the mean and standard deviation at each dilution. mAb, monoclonal antibody; VOC, variant of concern (See Example 18.)

Figure 5:
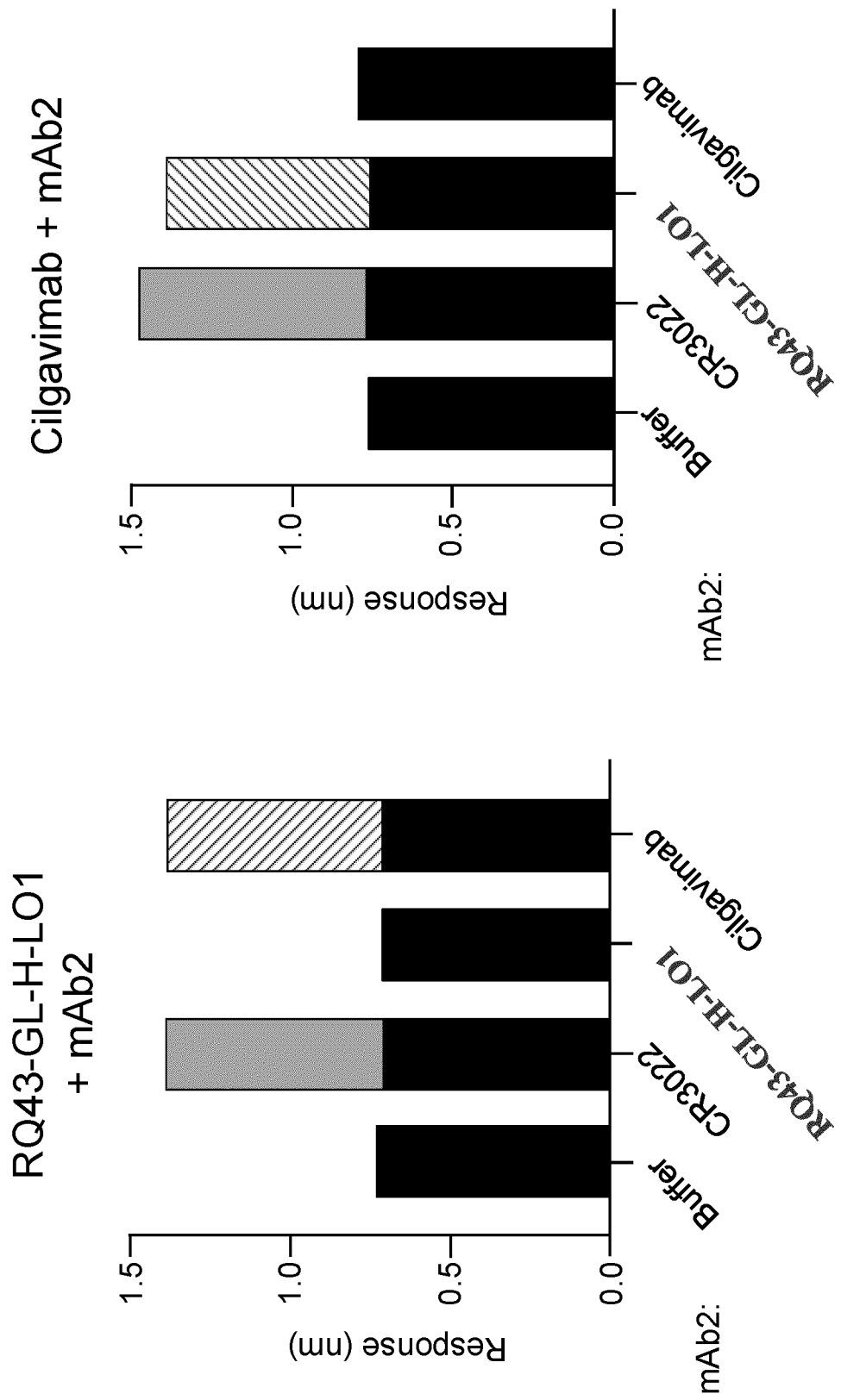

FIG. 5 shows that cilgavimab and RQ43-GL-H-LO1 bind consecutively to the SARS-CoV-2 spike protein receptor binding domain. Bio-layer interferometry was performed to evaluate concurrent binding of cilgavimab, RQ43-GL-H-LO1, and CR3022 (non-competing control mAb) to the SARS-COV-2 spike RBD. Binding signal (nm) is shown for mAb1 binding (black) followed by subsequent increase in signal from binding of buffer (no visible signal), CR3022 (gray), cilgavimab (hashed in left graph), or RQ43-GL-H-LO1 (hashed in right graph). Binding signal was averaged from data points taken for 10 seconds at equilibrium for each binding step. mAbs were considered binding if the increase in binding signal was greater than 0.3 nm. Data are representative of two independent experiments. mAb, monoclonal antibody; SARS-COV-2, severe acute respiratory syndrome coronavirus 2. (See Example 18.)

Figure 6:
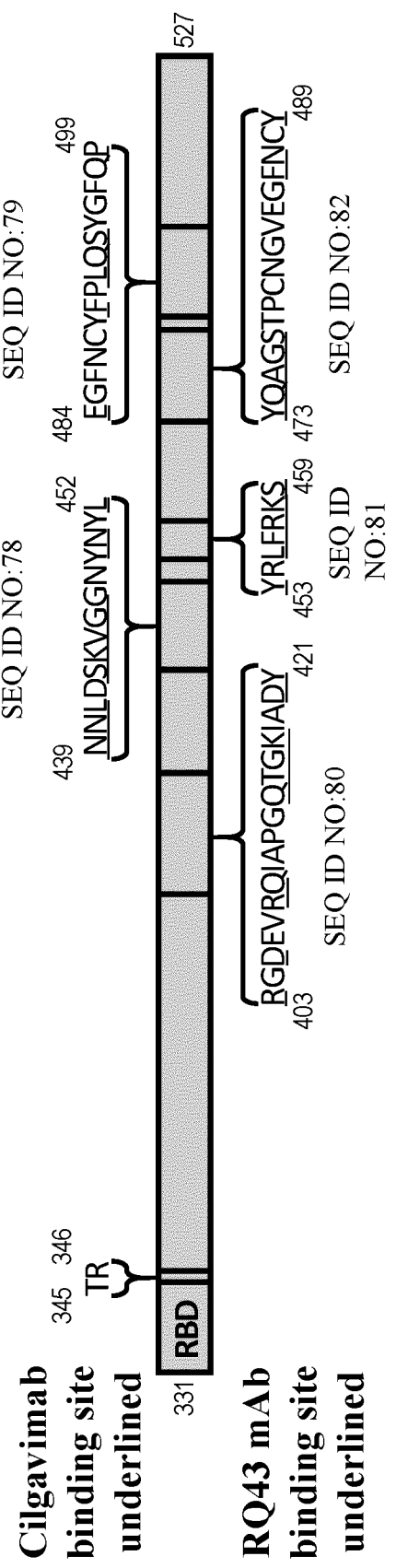

FIG. 6 provides a linear depiction of the cilgavimab binding site (top) and the RQ43 binding site (bottom) mapped to the SARS-COV-2 RBD. Cilgavimab and RQ43 binding sites are non-contiguous and are indicated by the boxes and underlined letters, while residues outside the respective binding sites are not underlined. (See Example 18.)

7. DETAILED DESCRIPTION

Provided herein are antibodies (e.g., monoclonal antibodies) and antigen-binding fragments thereof that specifically bind to the spike protein of SARS-COV-2 and methods of using the same.

7.1 Terminology

The term "antibody" means an immunoglobulin molecule that recognizes and specifically binds to a target, such as a protein, polypeptide, peptide, carbohydrate, polynucleotide, lipid, or combinations of the foregoing through at least one antigen recognition site within the variable region of the immunoglobulin molecule. As used herein, the term "antibody" encompasses intact polyclonal antibodies, intact monoclonal antibodies, chimeric antibodies, humanized antibodies, human antibodies, fusion proteins comprising an antibody, and any other modified immunoglobulin molecule so long as the antibodies exhibit the desired biological activity. An antibody can be of any the five major classes of immunoglobulins: IgA, IgD, IgE, IgG, and IgM, or subclasses (isotypes) thereof (e.g. IgG1, IgG2, IgG3, IgG4, IgA1 and IgA2), based on the identity of their heavy-chain constant domains referred to as alpha, delta, epsilon, gamma, and mu, respectively. The different classes of immunoglobulins have different and well-known subunit structures and three-dimensional configurations. Antibodies can be naked or conjugated to other molecules such as toxins, radioisotopes, etc.

The term "antibody fragment" refers to a portion of an intact antibody. An "antigen-binding fragment," "antigen-binding domain," or "antigen-binding region," refers to a portion of an intact antibody that binds to an antigen. An antigen-binding fragment can contain the antigenic determining regions of an intact antibody (e.g., the complementarity determining regions (CDR)). Examples of antigen-binding fragments of antibodies include, but are not limited to Fab, Fab', F(ab')$_2$, and Fv fragments, linear antibodies, and single chain antibodies. An antigen-binding fragment of an antibody can be derived from any animal species, such as rodents (e.g., mouse, rat, or hamster) and humans or can be artificially produced.

The terms "anti-spike protein of SARS-COV-2 antibody," "SARS-COV-2 spike protein antibody" and "antibody that binds to the spike protein of SARS-COV-2" are used interchangeably herein to refer to an antibody that is capable of binding to the spike protein of SARS-COV-2 with sufficient affinity such that the antibody is useful as a diagnostic and/or therapeutic agent in targeting SARS-COV-2. The extent of binding of a SARS-COV-2 spike protein antibody to an unrelated, non-SARS-COV-2 spike protein can be less than about 10% of the binding of the antibody to SARS-COV-2 spike protein as measured, e.g., using ForteBio or Biacore.

A "monoclonal" antibody or antigen-binding fragment thereof refers to a homogeneous antibody or antigen-binding fragment population involved in the highly specific recognition and binding of a single antigenic determinant, or epitope. This is in contrast to polyclonal antibodies that typically include different antibodies directed against different antigenic determinants. The term "monoclonal" antibody or antigen-binding fragment thereof encompasses both intact and full-length monoclonal antibodies as well as antibody fragments (such as Fab, Fab', F(ab')$_2$, Fv), single chain (scFv) mutants, fusion proteins comprising an antibody portion, and any other modified immunoglobulin molecule comprising an antigen recognition site. Furthermore, "monoclonal" antibody or antigen-binding fragment thereof refers to such antibodies and antigen-binding fragments thereof made in any number of manners including but not limited to by hybridoma, phage selection, recombinant expression, and transgenic animals.

As used herein, the terms "variable region" or "variable domain" are used interchangeably and are common in the art. The variable region typically refers to a portion of an antibody, generally, a portion of a light or heavy chain, typically about the amino-terminal 110 to 120 amino acids or 110 to 125 amino acids in the mature heavy chain and about 90 to 115 amino acids in the mature light chain, which differ extensively in sequence among antibodies and are used in the binding and specificity of a particular antibody for its particular antigen. The variability in sequence is concentrated in those regions called complementarity determining regions (CDRs) while the more highly conserved regions in the variable domain are called framework regions (FR). Without wishing to be bound by any particular mechanism or theory, it is believed that the CDRs of the light and heavy chains are primarily responsible for the interaction and specificity of the antibody with antigen. In some aspects, the variable region is a human variable region. In some aspects, the variable region comprises rodent or murine CDRs and human framework regions (FRs). In some aspects, the variable region is a primate (e.g., non-human primate) variable region. In some aspects, the variable region comprises rodent or murine CDRs and primate (e.g., non-human primate) framework regions (FRs).

The term "complementarity determining region" or "CDR" as used herein refers to each of the regions of an antibody variable domain which are hypervariable in sequence and/or form structurally defined loops (hypervariable loops) and/or contain the antigen-contacting residues. Antibodies can comprise six CDRs, e.g., three in the VH and three in the VL.

The terms "VL" and "VL domain" are used interchangeably to refer to the light chain variable region of an antibody.

The terms "VH" and "VH domain" are used interchangeably to refer to the heavy chain variable region of an antibody.

The term "Kabat numbering" and like terms are recognized in the art and refer to a system of numbering amino acid residues in the heavy and light chain variable regions of an antibody or an antigen-binding fragment thereof. In some aspects, CDRs can be determined according to the Kabat numbering system (see, e.g., Kabat E A & Wu T T (1971) Ann NY Acad Sci 190:382-391 and Kabat E A et al., (1991) Sequences of Proteins of Immunological Interest, Fifth Edition, U.S. Department of Health and Human Services, NIH Publication No. 91-3242). Using the Kabat numbering system, CDRs within an antibody heavy chain molecule are typically present at amino acid positions 31 to 35, which optionally can include one or two additional amino acids, following 35 (referred to in the Kabat numbering scheme as 35A and 35B) (CDR1), amino acid positions 50 to 65

(CDR2), and amino acid positions 95 to 102 (CDR3). Using the Kabat numbering system, CDRs within an antibody light chain molecule are typically present at amino acid positions 24 to 34 (CDR1), amino acid positions 50 to 56 (CDR2), and amino acid positions 89 to 97 (CDR3).

Chothia refers instead to the location of the structural loops (Chothia and Lesk, J. Mol. Biol. 196:901-917 (1987)). The end of the Chothia CDR-H1 loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34). The AbM hypervariable regions represent a compromise between the Kabat CDRs and Chothia structural loops, and are used by Oxford Molecular's AbM antibody modeling software.

| Loop | Kabat | AbM | Chothia |
|---|---|---|---|
| L1 | L24-L34 | L24-L34 | L24-L34 |
| L2 | L50-L56 | L50-L56 | L50-L56 |
| L3 | L89-L97 | L89-L97 | L89-L97 |
| H1 | H31-H35B | H26-H35B | H26-H32 . . . 34 (Kabat Numbering) |
| H1 | H31-H35 | H26-H35 | H26-H32 (Chothia Numbering) |
| H2 | H50-H65 | H50-H58 | H52-H56 |
| H3 | H95-H102 | H95-H102 | H95-H102 |

As used herein, the term "constant region" or "constant domain" are interchangeable and have its meaning common in the art. The constant region is an antibody portion, e.g., a carboxyl terminal portion of a light and/or heavy chain which is not directly involved in binding of an antibody to antigen but which can exhibit various effector functions, such as interaction with the Fc receptor. The constant region of an immunoglobulin molecule generally has a more conserved amino acid sequence relative to an immunoglobulin variable domain. In some aspects, an antibody or antigen-binding fragment comprises a constant region or portion thereof that is sufficient for antibody-dependent cell-mediated cytotoxicity (ADCC).

As used herein, the term "heavy chain" when used in reference to an antibody can refer to any distinct type, e.g., alpha (α), delta (δ), epsilon (ε), gamma (γ), and mu (µ), based on the amino acid sequence of the constant domain, which give rise to IgA, IgD, IgE, IgG, and IgM classes of antibodies, respectively, including subclasses of IgG, e.g., IgG1, IgG2, IgG3, and IgG4. Heavy chain amino acid sequences are well known in the art. In some aspects, the heavy chain is a human heavy chain.

As used herein, the term "light chain" when used in reference to an antibody can refer to any distinct type, e.g., kappa (κ) or lambda (λ) based on the amino acid sequence of the constant domains. Light chain amino acid sequences are well known in the art. In some aspects, the light chain is a human light chain.

The term "humanized" antibody or antigen-binding fragment thereof refers to forms of non-human (e.g. murine) antibodies or antigen-binding fragments that are specific immunoglobulin chains or fragments thereof that contain minimal non-human (e.g., murine) sequences. Typically, humanized antibodies or antigen-binding fragments thereof are human immunoglobulins in which residues from the complementary determining region (CDR) are replaced by residues from the CDR of a non-human species (e.g. mouse, rat, rabbit, hamster) that have the desired specificity, affinity, and capability ("CDR grafted") (Jones et al., Nature 321: 522-525 (1986); Riechmann et al., Nature 332:323-327 (1988); Verhoeyen et al., Science 239:1534-1536 (1988)). In some instances, the Fv framework region (FR) residues of a human immunoglobulin are replaced with the corresponding residues in an antibody or fragment from a non-human species that has the desired specificity, affinity, and capability. The humanized antibody or antigen-binding fragment thereof can be further modified by the substitution of additional residues either in the Fv framework region and/or within the replaced non-human residues to refine and optimize antibody or antigen-binding fragment thereof specificity, affinity, and/or capability. In general, the humanized antibody or antigen-binding fragment thereof will comprise substantially all of at least one, and typically two or three, variable domains containing all or substantially all of the CDR regions that correspond to the non-human immunoglobulin whereas all or substantially all of the FR regions are those of a human immunoglobulin consensus sequence. The humanized antibody or antigen-binding fragment thereof can also comprise at least a portion of an immunoglobulin constant region or domain (Fc), typically that of a human immunoglobulin. Examples of methods used to generate humanized antibodies are described in U.S. Pat. No. 5,225, 539; Roguska et al., Proc. Natl. Acad. Sci., USA, 91 (3): 969-973 (1994), and Roguska et al., Protein Eng. 9 (10): 895-904 (1996). In some aspects, a "humanized antibody" is a resurfaced antibody.

The term "human" or "fully human" antibody or antigen-binding fragment thereof means an antibody or antigen-binding fragment thereof having an amino acid sequence derived from a human immunoglobulin gene locus, where such antibody or antigen-binding fragment is made using any technique known in the art. This definition of a human antibody or antigen-binding fragment thereof includes intact or full-length antibodies and fragments thereof.

"Binding affinity" generally refers to the strength of the sum total of non-covalent interactions between a single binding site of a molecule (e.g., an antibody or antigen-binding fragment thereof) and its binding partner (e.g., an antigen). Unless indicated otherwise, as used herein, "binding affinity" refers to intrinsic binding affinity which reflects a 1:1 interaction between members of a binding pair (e.g., antibody or antigen-binding fragment thereof and antigen). The affinity of a molecule X for its partner Y can generally be represented by the dissociation constant ($K_D$). Affinity can be measured and/or expressed in a number of ways known in the art, including, but not limited to, equilibrium dissociation constant ($K_D$), and equilibrium association constant ($K_A$). The $K_D$ is calculated from the quotient of $k_{off}/k_{on}$, whereas $K_A$ is calculated from the quotient of $k_{on}/k_{off}$. Kon refers to the association rate constant of, e.g., an antibody or antigen-binding fragment thereof to an antigen, and $k_{off}$ refers to the dissociation of, e.g., an antibody or antigen-binding fragment thereof from an antigen. The $k_{on}$ and $k_{off}$ can be determined by techniques known to one of ordinary skill in the art, such as BIAcore® or KinExA®.

As used herein, an "epitope" is a term in the art and refers to a localized region of an antigen to which an antibody or antigen-binding fragment thereof can specifically bind. An epitope can be, for example, contiguous amino acids of a polypeptide (linear or contiguous epitope) or an epitope can, for example, come together from two or more non-contiguous regions of a polypeptide or polypeptides (conformational, non-linear, discontinuous, or non-contiguous epitope). In some aspects, the epitope to which an antibody or antigen-binding fragment thereof binds can be determined by, e.g., NMR spectroscopy, X-ray diffraction crystallography studies, ELISA assays, hydrogen/deuterium exchange coupled with mass spectrometry (e.g., liquid chromatography electrospray mass spectrometry), array-based oligopeptide scanning assays, and/or mutagenesis mapping (e.g., site-directed mutagenesis mapping). For X-ray crystallography, crystallization may be accomplished using any of the known methods in the art (e.g., Giegé R et al., (1994) Acta Crystallogr D Biol Crystallogr 50 (Pt 4): 339-350; McPherson A (1990) Eur J Biochem 189:1-23; Chayen N E (1997) Structure 5:1269-1274; McPherson A (1976) J Biol Chem 251:6300-6303). Antibody/antigen-binding fragment thereof: antigen crystals can be studied using well known X-ray diffraction techniques and can be refined using computer software such as X-PLOR (Yale University, 1992, distributed by Molecular Simulations, Inc.; see, e.g., Meth Enzymol (1985) volumes 114 & 115, eds Wyckoff H W et al.; U.S. 2004/0014194), and BUSTER (Bricogne G (1993) Acta Crystallogr D Biol Crystallogr 49 (Pt 1): 37-60; Bricogne G (1997) Meth Enzymol 276A: 361-423, ed Carter C W; Roversi P et al., (2000) Acta Crystallogr D Biol Crystallogr 56 (Pt 10): 1316-1323). Mutagenesis mapping studies can be accomplished using any method known to one of skill in the art. See, e.g., Champe M et al., (1995) J Biol Chem 270:1388-1394 and Cunningham B C & Wells J A (1989) Science 244:1081-1085 for a description of mutagenesis techniques, including alanine scanning mutagenesis techniques.

An antibody that "binds to the same epitope" as a reference antibody refers to an antibody that binds to the same amino acid residues as the reference antibody. The ability of an antibody to bind to the same epitope as a reference antibody can be determined by a hydrogen/deuterium exchange assay (see e.g., Coales et al. Rapid Commun. Mass Spectrom. 2009; 23:639-647).

As used herein, the terms "immunospecifically binds," "immunospecifically recognizes," "specifically binds," and "specifically recognizes" are analogous terms in the context of antibodies or antigen-binding fragments thereof. These terms indicate that the antibody or antigen-binding fragment thereof binds to an epitope via its antigen-binding domain and that the binding entails some complementarity between the antigen-binding domain and the epitope. Accordingly, in some aspects, an antibody that "specifically binds" to the spike protein of SARS-CoV-2 can also bind to the spike protein of one or more related viruses (e.g., SARS-1) and/or can also bind to variants of the spike protein of SARS-COV-2, but the extent of binding to an un-related, non-SARS-COV-2 spike protein is less than about 10% of the binding of the antibody to the spike protein of SARS-COV—as measured, e.g., using ForteBio® or Biacore®.

An antibody is said to "competitively inhibit" binding of a reference antibody to a given epitope if it preferentially binds to that epitope or an overlapping epitope to the extent that it blocks, to some degree, binding of the reference antibody to the epitope. Competitive inhibition may be determined by any method known in the art, for example, competition ELISA assays. An antibody can be said to competitively inhibit binding of the reference antibody to a given epitope by at least 90%, at least 80%, at least 70%, at least 60%, or at least 50%.

A polypeptide, antibody, polynucleotide, vector, cell, or composition which is "isolated" is a polypeptide, antibody, polynucleotide, vector, cell, or composition which is in a form not found in nature. Isolated polypeptides, antibodies, polynucleotides, vectors, cell or compositions include those which have been purified to a degree that they are no longer in a form in which they are found in nature. In some aspects, an antibody, polynucleotide, vector, cell, or composition which is isolated is substantially pure. As used herein, "substantially pure" refers to material which is at least 50% pure (i.e., free from contaminants), at least 90% pure, at least 95% pure, at least 98% pure, or at least 99% pure.

The terms "polypeptide," "peptide," and "protein" are used interchangeably herein to refer to polymers of amino acids of any length. The polymer can be linear or branched, it can comprise modified amino acids, and it can be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art. It is understood that, because the polypeptides of this invention are based upon antibodies, in some aspects, the polypeptides can occur as single chains or associated chains.

"Percent identity" refers to the extent of identity between two sequences (e.g., amino acid sequences or nucleic acid sequences). Percent identity can be determined by aligning two sequences, introducing gaps to maximize identity between the sequences. Alignments can be generated using programs known in the art. For purposes herein, alignment of nucleotide sequences can be performed with the blastn program set at default parameters, and alignment of amino acid sequences can be performed with the blastp program set at default parameters (see National Center for Biotechnology Information (NCBI) on the worldwide web, ncbi.nlm.nih.gov).

As used herein, amino acids with hydrophobic side chains include alanine (A), isoleucine (I), leucine (L), methionine (M), valine (V), phenylalanine (F), tryptophan (W), and tyrosine (Y). Amino acids with aliphatic hydrophobic side chains include alanine (A), isoleucine (I), leucine (L), methionine (M), and valine (V). Amino acids with aromatic hydrophobic side chains include phenylalanine (F), tryptophan (W), and tyrosine (Y).

As used herein, amino acids with polar neutral side chains include asparagine (N), cysteine (C), glutamine (Q), serine(S), and threonine (T).

As used herein, amino acids with electrically charged side chains include aspartic acid (D), glutamic acid (E), arginine (R), histidine (H), and lysine (K). Amino acids with acidic electrically charged side chains include aspartic acid (D) and glutamic acid (E). Amino acids with basic electrically charged side chains include arginine (R), histidine (H), and lysine (K).

As used herein, the term "host cell" can be any type of cell, e.g., a primary cell, a cell in culture, or a cell from a cell line. In some aspects, the term "host cell" refers to a cell transfected with a nucleic acid molecule and the progeny or potential progeny of such a cell. Progeny of such a cell may not be identical to the parent cell transfected with the nucleic acid molecule, e.g., due to mutations or environmental influences that may occur in succeeding generations or integration of the nucleic acid molecule into the host cell genome.

The term "pharmaceutical formulation" or "pharmaceutical composition" refers to a preparation which is in such form as to permit the biological activity of the active ingredient to be effective, and which contains no additional components which are unacceptably toxic to a subject to which the formulation would be administered. The formulation can be sterile.

As provided herein a "combination" of antibodies or antigen-binding fragments thereof refers to two or more antibodies or antigen-binding fragments thereof for use together. The antibodies or antigen-binding fragments thereof in the combination can be contained together in a single pharmaceutical composition or can be in separate pharmaceutical compositions. The antibodies or antigen-binding fragments of a combination in separate pharmaceutical compositions can be administered simultaneously or sequentially.

The terms "administer", "administering", "administration", and the like, as used herein, refer to methods that may be used to enable delivery of a drug, e.g., an antibody or antigen-binding fragment thereof that specifically binds to the spike protein of SARS-COV-2 to the desired site of biological action (e.g., intravenous administration). Administration techniques that can be employed with the agents and methods described herein are found in e.g., Goodman and Gilman, The Pharmacological Basis of Therapeutics, current edition, Pergamon; and Remington's, Pharmaceutical Sciences, current edition, Mack Publishing Co., Easton, Pa.

As used herein, the terms "subject" and "patient" are used interchangeably. The subject can be an animal. In some aspects, the subject is a mammal such as a non-human animal (e.g., cow, pig, horse, cat, dog, rat, mouse, monkey or other primate, etc.). In some aspects, the subject is a human.

The term "therapeutically effective amount" refers to an amount of a drug, e.g., one or more antibodies or antigen-binding fragments thereof effective to treat a disease or disorder in a subject.

Terms such as "treating" or "treatment" or "to treat" or "alleviating" or "to alleviate" refer to therapeutic measures that cure, slow down, lessen symptoms of, and/or halt progression of a diagnosed pathologic condition or disorder. Thus, those in need of treatment include those already diagnosed with or suspected of having the disorder. Patients or subjects in need of treatment can include those diagnosed with coronavirus 2019 (COVID 19) and those who have been infected with severe acute respiratory syndrome coronavirus 2 (SARS-COV-2).

Alternatively, the pharmacologic and/or physiologic effect may be prophylactic, i.e., the effect completely or partially prevents a disease or symptom thereof. In this respect, the disclosed method comprises administering a "prophylactically effective amount" of a drug (e.g., one or more antibodies or antigen-binding fragments thereof). A "prophylactically effective amount" refers to an amount effective, at dosages and for periods of time necessary, to achieve a desired prophylactic result (e.g., prevention of SARS-COV-2 infection or disease onset).

As used in the present disclosure and claims, the singular forms "a," "an," and "the" include plural forms unless the context clearly dictates otherwise.

It is understood that wherever aspects are described herein with the language "comprising," otherwise analogous aspects described in terms of "consisting of" and/or "consisting essentially of" are also provided. In this disclosure, "comprises," "comprising," "containing" and "having" and the like can mean "includes," "including," and the like; "consisting essentially of" or "consists essentially" are open-ended, allowing for the presence of more than that which is recited so long as basic or novel characteristics of that which is recited is not changed by the presence of more than that which is recited, but excludes prior art aspects.

Unless specifically stated or obvious from context, as used herein, the term "or" is understood to be inclusive. The term "and/or" as used in a phrase such as "A and/or B" herein is intended to include both "A and B," "A or B," "A," and "B." Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

As used herein, the terms "about" and "approximately," when used to modify a numeric value or numeric range, indicate that deviations of up to 10% above and down to 10% below the value or range remain within the intended meaning of the recited value or range. It is understood that wherever aspects are described herein with the language "about" or "approximately" a numeric value or range, otherwise analogous aspects referring to the specific numeric value or range (without "about") are also provided.

Any compositions or methods provided herein can be combined with one or more of any of the other compositions and methods provided herein.

7.2 Antibodies and Antigen-Binding Fragments Thereof

In a specific aspect, provided herein are antibodies (e.g., monoclonal antibodies, such as human antibodies) and antigen-binding fragments thereof that bind to the spike protein of SARS-CoV-2. The amino acid sequence of the spike protein of the spike protein of SARS-COV-2 is provided in SEQ ID NO:1:

```
                                                          (SEQ ID NO: 1)
MFVFLVLLPLVSSQCVNLTTRTQLPPAYTNSFTRGVYYPDKVFRSSVLHSTQDLFLPFFS

NVTWFHAIHVSGTNGTKRFDNPVLPFNDGVYFASTEKSNIIRGWIFGTTLDSKTQSLLIVN

NATNVVIKVCEFQFCNDPFLGVYYHKNNKSWMESEFRVYSSANNCTFEYVSQPFLMDL

EGKQGNFKNLREFVFKNIDGYFKIYSKHTPINLVRDLPQGFSALEPLVDLPIGINITRFQTL

LALHRSYLTPGDSSSGWTAGAAAYYVGYLQPRTFLLKYNENGTITDAVDCALDPLSETK

CTLKSFTVEKGIYQTSNFRVQPTESIVRFPNITNLCPFGEVENATRFASVYAWNRKRISNC

VADYSVLYNSASFSTFKCYGVSPTKLNDLCFTNVYADSFVIRGDEVRQIAPGQTGKIADY

NYKLPDDFTGCVIAWNSNNLDSKVGGNYNYLYRLFRKSNLKPFERDISTEIYQAGSTPC
```

-continued

```
NGVEGENCYFPLQSYGFQPTNGVGYQPYRVVVLSFELLHAPATVCGPKKSTNLVKNKC

VNFNFNGLTGTVLTESNKKFLPFQQFGRDIADTTDAVRDPQTLEILDITPCSFGGVSVIT

PGTNTSNQVAVLYQDVNCTEVPVAIHADQLTPTWRVYSTGSNVFQTRAGCLIGAEHVN

NSYECDIPIGAGICASYQTQTNSPRRARSVASQSIIAYTMSLGAENSVAYSNNSIAIPTNFTI

SVTTEILPVSMTKTSVDCTMYICGDSTECSNLLLQYGSFCTQLNRALTGIAVEQDKNTQE

VFAQVKQIYKTPPIKDFGGFNFSQILPDPSKPSKRSFIEDLLFNKVTLADAGFIKQYGDCL

GDIAARDLICAQKFNGLTVLPPLLTDEMIAQYTSALLAGTITSGWTFGAGAALQIPFAMQ

MAYRFNGIGVTQNVLYENQKLIANQFNSAIGKIQDSLSSTASALGKLQDVVNQNAQALN

TLVKQLSSNFGAISSVLNDILSRLDKVEAEVQIDRLITGRLQSLQTYVTQQLIRAAEIRASA

NLAATKMSECVLGQSKRVDFCGKGYHLMSFPQSAPHGVVFLHVTYVPAQEKNFTTAPA

ICHDGKAHFPREGVFVSNGTHWFVTQRNFYEPQIITTDNTFVSGNCDVVIGIVNNTVYDP

LQPELDSFKEELDKYFKNHTSPDVDLGDISGINASVVNIQKEIDRLNEVAKNLNESLIDLQ

ELGKYEQYIKWPWYIWLGFIAGLIAIVMVTIMLCCMTSCCSCLKGCCSCGSCCKFDEDD

SEPVLKGVKLHYT
```

Amino acids 1-12 of SEQ ID NO:1 are the signal peptide of the spike protein. Therefore, the mature version of the spike protein of SARS-COV-2 contains amino acids 13-1273 of SEQ ID NO:1. Amino acids 13-1213 of SEQ ID NO: 1 correspond to the extracellular domain; amino acids 1214-1234 correspond to the transmembrane domain; and amino acids 1235-1273 correspond to the cytoplasmic domain.

In some aspects, an antibody or antigen-binding fragment thereof described herein binds to the spike protein of SARS-COV-2 and specifically binds to the receptor binding domain (RBD) of the spike protein of SARS-COV-2.

In some aspects, an antibody or antigen-binding fragment thereof described herein binds to the spike protein of SARS-COV-2 and comprises the six CDRs of an antibody listed in Table 1 (i.e., the three VH CDRs of the antibody and the three VL CDRs of the same antibody).

TABLE 1

Antibody Sequences with Kabat-Defined CDRs

| Clone | H/L | Variable Sequence Region | CDR1 | CDR2 | CDR3 |
|---|---|---|---|---|---|
| RQ20 | H | QVQLVESGPEMKKPGTSVKVSCKASGFTFITSAVQWV RQARGQRLEWMGWIAVGSGNTNYAQKFQDRVTINRD MSTSTAYMELSSLRSEDTAVYYCAAPHCDRTSCHDGF DIWGQGTMVTVSS (SEQ ID NO: 38) | TSAVQ (SEQ ID NO: 2) | WIAVGSGN TNYAQKFQ D (SEQ ID NO: 3) | PHCDRTSCH DGFDI (SEQ ID NO: 4) |
| RQ20 | L | DIVMTQSPGTLSLSPGERATLSCRASQSVRSSYLAWYQ QKPGQAPRLLIYGASRRGTGIPDRFSGSGSGTDFTLTISR LEPEDFAVYYCQQYGSSPWTFGQGTKVEIK (SEQ ID NO: 39) | RASQSVRSS YLA (SEQ ID NO: 5) | GASRRGT (SEQ ID NO: 6) | QQYGSSPWT (SEQ ID NO: 7) |
| RQ20-GL-LH | H | QVQLVQSGPEVKKPGTSVKVSCKASGFTFITSAVQWV RQARGQRLEWMGWIAVGSGNTNYAQKFQDRVTITRD MSTSTAYMELSSLRSEDTAVYYCAAPHCDRTSCHDGF DIWGQGTMVTVSS (SEQ ID NO: 40) | TSAVQ (SEQ ID NO: 2) | WIAVGSGN TNYAQKFQ D (SEQ ID NO: 3) | PHCDRTSCH DGFDI (SEQ ID NO: 4) |
| RQ20-GL-LH | L | EIVMTQSPGTLSLSPGERATLSCRASQSVRSSYLAWYQ QKPGQAPRLLIYGASRRGTGIPDRFSGSGSGTDFTLTISR LEPEDFAVYYCQQYGSSPWTFGGGTKVEIK (SEQ ID NO: 41) | RASQSVRSS YLA (SEQ ID NO: 5) | GASRRGT (SEQ ID NO: 6) | QQYGSSPWT (SEQ ID NO: 7) |
| RQ29 | H | EVQLVQSGAEVKKPGSSVKVSCKASGRTFNTYVFTWV RQAPGQGLEWMGGIIPFFGTADYAQKFQGRVTITADDS TSTAYMELSSLRSEDTAVYYCSRLSQWDLLPMWGQGT LVTVSS (SEQ ID NO: 42) | TYVFT (SEQ ID NO: 8) | GIIPFFGTAD YAQKFQG (SEQ ID NO: 9) | LSQWDLLPM (SEQ ID NO: 10) |
| RQ29 | L | DIVMTQSPGTLSLSPGERATLSCRASQSFTSSYLAWYQ QKPGQAPRLLIYGASSRATGIPDRFSGTGSGTDFTLTISR LEPEDFAVYYCQQYGTSPRMYTFGQGTKVDIK (SEQ ID NO: 43) | RASQSFTSS YLA (SEQ ID NO: 11) | GASSRAT (SEQ ID NO: 67) | QQYGTSPRM YT (SEQ ID NO: 12) |

TABLE 1-continued

Antibody Sequences with Kabat-Defined CDRs

| | | | | | |
|---|---|---|---|---|---|
| RQ29-GL-LH | H | QVQLVQSGAEVKKPGSSVKVSCKASRGTFNTYVFTWV RQAPGQGLEWMGGIIPFFGTADYAQKFQGRVTITADES TSTAYMELSSLRSEDTAVYYCSRLSQWDLLPMWGQGT LVTVSS (SEQ ID NO: 44) | TYVFT (SEQ ID NO: 8) | GIIPFFGTAD YAQKFQG (SEQ ID NO: 9) | LSQWDLLPM (SEQ ID NO: 10) |
| RQ29-GL-LH | L | EIVMTQSPGTLSLSPGERATLSCRASQSFTSSYLAWYQQ KPGQAPRLLIYGASSRATGIPDRFSGSGSGTDFTLTISRL EPEDFAVYYCQQYGTSPRMYTFGQGTKLEIK (SEQ ID NO: 45) | RASQSFTSS YLA (SEQ ID NO: 11) | GASSRAT (SEQ ID NO: 67) | QQYGTSPRM YT (SEQ ID NO: 12) |
| RQ33 | H | QVQLQESGPGLVKPSETLSLTCTVFGGSITSSNHYWVW IRQPPGKGLEWIGSMYYSGSTAYNPSLTNRVTISVDTSK NQFSLKLSSVTAADTAVYYCARQIGPKRPSQVADWFD PWGQGTLVTVSS (SEQ ID NO: 46) | SSNHYWV (SEQ ID NO: 13) | SMYYSGST AYNPSLTN (SEQ ID NO: 14) | QIGPKRPSQV ADWFDP (SEQ ID NO: 15) |
| RQ33 | L | DIQLTQSPSFLSASVGDRVTITCRASQGISSYLAWYQQK PGKAPKLLIYAASTLQSGVPSRFSGSGSGTEFTLTISSLQ PEDFATYYCQQLNSYPLTFGGGTKVEIK (SEQ ID NO: 47) | RASQGISSY LA (SEQ ID NO: 16) | AASTLQS (SEQ ID NO: 17) | QQLNSYPLT (SEQ ID NO: 18) |
| RQ33-GL-H | H | QVQLQESGPGLVKPSETLSLTCTVSGGSITSSNHYWVW IRQPPGKGLEWIGSMYYSGSTAYNPSLTNR VTISVDTSK NQFSLKLSSVTAADTAVYYCARQIGPKRPSQVADWFD PWGQGTLVTVSS (SEQ ID NO: 48) | SSNHYWV (SEQ ID NO: 13) | SMYYSGST AYNPSLTN (SEQ ID NO: 14) | QIGPKRPSQV ADWFDP (SEQ ID NO: 15) |
| RQ33-GL-H | L | DIQLTQSPSFLSASVGDRVTITCRASQGISSYLAWYQQK PGKAPKLLIYAASTLQSGVPSRFSGSGSGTEFTLTISSLQ PEDFATYYCQQLNSYPLTFGGGTKVEIK (SEQ ID NO: 47) | RASQGISSY LA (SEQ ID NO: 16) | AASTLQS (SEQ ID NO: 17) | QQLNSYPLT (SEQ ID NO: 18) |
| RQ33-GL-H-LO1 | H | QVQLQESGPGLVKPSETLSLTCTVSGGSITSSNHYWVW IRQPPGKGLEWIGSMYYSGSTAYNPSLTNRVTISVDTSK NQFSLKLSSVTAADTAVYYCARQIGPKRPSQVADWFEP WGQGTLVTVSS (SEQ ID NO: 49) | SSNHYWV (SEQ ID NO: 13) | SMYYSGST AYNPSLTN (SEQ ID NO: 14) | QIGPKRPSQV ADWFEP (SEQ ID NO: 19) |
| RQ33-GL-H-LO1 | L | DIQLTQSPSFLSASVGDRVTITCRASQGISSYLAWYQQK PGKAPKLLIYAASTLQSGVPSRFSGSGSGTEFTLTISSLQ PEDFATYYCQQLNSYPLTFGGGTKVEIK (SEQ ID NO: 47) | RASQGISSY LA (SEQ ID NO: 16) | AASTLQS (SEQ ID NO: 17) | QQLNSYPLT (SEQ ID NO: 18) |
| RQ40 | H | EVQLVESGAEVKKPGSSVKVSCKASGGTFSSYAINWV RQAPGQGLEWMGGIIPIFRTPHYAQKFQGRVTITADEST GTAYMELSSLRSEDTAVYYCASPSCGGDCPQYLKSSKL DWYFDLWGRGTLVTVSS (SEQ ID NO: 50) | SYAIN (SEQ ID NO: 20) | GIIPIFRTPH YAQKFQG (SEQ ID NO: 21) | PSCGGDCPQ YLKSSKLDW YFDL (SEQ ID NO: 22) |
| RQ40 | L | VIWMTQSPGTLSLSPGERATLSCRASQSVSSTYLAWYQ QKPGQAPRLLIYGASSRATGIPDRFSGSGSGTDFTLTISR LEPEDFAVYYCQHYGSSPLTFGQGTRLEIK (SEQ ID NO: 51) | RASQSVSST YLA (SEQ ID NO: 23) | GASSRAT (SEQ ID NO: 67) | QHYGSSPLT (SEQ ID NO: 24) |
| RQ40-GL-LH | H | QVQLVQSGAEVKKPGSSVKVSCKASGGTFSSYAINWV RQAPGQGLEWMGGIIPIFRTPHYAQKFQGRVTITADEST STAYMELSSLRSEDTAVYYCASPSCGGDCPQYLKSSKL DWYFDLWGRGTLVTVSS (SEQ ID NO: 52) | SYAIN (SEQ ID NO: 20) | GIIPIFRTPH YAQKFQG (SEQ ID NO: 21) | PSCGGDCPQ YLKSSKLDW YFDL (SEQ ID NO: 22) |
| RQ40-GL-LH | L | EIVMTQSPGTLSLSPGERATLSCRASQSVSSTYLAWYQ QKPGQAPRLLIYGASSRATGIPDRFSGSGSGTDFTLTISR LEPEDFAVYYCQHYGSSPLTFGQGTRLEIK (SEQ ID NO: 53) | RASQSVSST YLA (SEQ ID NO: 23) | GASSRAT (SEQ ID NO: 67) | QHYGSSPLT (SEQ ID NO: 24) |
| RQ41 | H | EVQLVESGGGLIQPGGSLRLSCAASEIIVSRNYMSWVR QAPGKGLEWVSVIYSGGSTFYADSVKGRFTISRDNSKN TLYLQMNSLRAEDTAVYYCARDLDVVGGTDYWGQGT LVTVSS (SEQ ID NO: 54) | RNYMS (SEQ ID NO: 25) | VIYSGGSTF YADSVKG (SEQ ID NO: 26) | DLDVVGGTD Y (SEQ ID NO: 27) |
| RQ41 | L | EIVLTQSPGTLSLSPGERATLSCRASQSVSSSYLAWYQQ KPGQAPRLLIYGASSRATGIPDRFSGSGSGTDFTLTISRL EPEDFAVYYCQQYGSSPGYTFGQGTKVDIK (SEQ ID NO: 55) | RASQSVSSS YLA (SEQ ID NO: 28) | GASSRAT (SEQ ID NO: 67) | QQYGSSPGY T (SEQ ID NO: 29) |
| RQ41-GL-LH | H | EVQLVETGGGLIQPGGSLRLSCAASEIIVSRNYMSWVR QAPGKGLEWVSVIYSGGSTFYADSVKGRFTISRDNSKN TLYLQMNSLRAEDTAVYYCARDLDVVGGTDYWGQGT LVTVSS (SEQ ID NO: 56) | RNYMS (SEQ ID NO: 25) | VIYSGGSTF YADSVKG (SEQ ID NO: 26) | DLDVVGGTD Y (SEQ ID NO: 27) |

TABLE 1-continued

Antibody Sequences with Kabat-Defined CDRs

| | | | | | |
|---|---|---|---|---|---|
| RQ41-GL-LH | L | EIVLTQSPGTLSLSPGERATLSCRASQSVSSSYLAWYQQKPGQAPRLLIYGASSRATGIPDRFSGSGSGTDFTLTISRLEPEDFAVYYCQQYGSSPGYTFGPGTKVDIK (SEQ ID NO: 57) | RASQSVSSSYLA (SEQ ID NO: 28) | GASSRAT (SEQ ID NO: 67) | QQYGSSPGYT (SEQ ID NO: 29) |
| RQ41-GL-LH-LO1 | H | EVQLVETGGGLIQPGGSLRLSCAASEIIVSRNYMSWVRQAPGKGLEWVSVIYSGGSTFYADSVKGRFTISRDNSKNTLYLQMNSLRAEDTAVYYCARDLEVVGGTDYWGQGTLVTVSS (SEQ ID NO: 58) | RNYMS (SEQ ID NO: 25) | VIYSGGSTFYADSVKG (SEQ ID NO: 26) | DLEVVGGTDY (SEQ ID NO: 30) |
| RQ41-GL-LH-LO1 | L | EIVLTQSPGTLSLSPGERATLSCRASQSVSSSYLAWYQQKPGQAPRLLIYGASSRATGIPDRFSGSGSGTDFTLTISRLEPEDFAVYYCQQYGSSPGYTFGPGTKVDIK (SEQ ID NO: 57) | RASQSVSSSYLA (SEQ ID NO: 28) | GASSRAT (SEQ ID NO: 67) | QQYGSSPGYT (SEQ ID NO: 29) |
| RQ41-LO1 | H | EVQLVESGGGLIQPGGSLRLSCAASEIIVSRNYMSWVRQAPGKGLEWVSVIYSGGSTFYADSVKGRFTISRDNSKNTLYLQMNSLRAEDTAVYYCARDLEVVGGTDYWGQGTLVTVSS (SEQ ID NO: 59) | RNYMS (SEQ ID NO: 25) | VIYSGGSTFYADSVKG (SEQ ID NO: 26) | DLEVVGGTDY (SEQ ID NO: 30) |
| RQ41-LO1 | L | EIVLTQSPGTLSLSPGERATLSCRASQSVSSSYLAWYQQKPGQAPRLLIYGASSRATGIPDRFSGSGSGTDFTLTISRLEPEDFAVYYCQQYGSSPGYTFGQGTKVDIK (SEQ ID NO: 55) | RASQSVSSSYLA (SEQ ID NO: 28) | GASSRAT (SEQ ID NO: 67) | QQYGSSPGYT (SEQ ID NO: 29) |
| RQ43 | H | EVQLLETGGGLVQPGRSLRLSCAASGFPFDDYAIHWVRLAPGKGLEWVSSISWDSGSIGYADSVKGRFTISRDNAKNSLYLQMNSLRAEDTALYYCAKGAFPGYSSGWYYGLDVWGQGATVTVSS (SEQ ID NO: 60) | DYAIH (SEQ ID NO: 31) | SISWDSGSIGYADSVKG (SEQ ID NO: 32) | GAFPGYSSGWYYGLDV (SEQ ID NO: 33) |
| RQ43 | L | QSVVTQPPSASGSLGQSVTISCTGTSSDVGGYNYVSWYQQHPGKAPKLMIFEVSKRPSGVPDRFSGSKSGNTASLTVSGLQAEDEADYYCSSYAGNKGVFGGGTKLTVL (SEQ ID NO: 61) | TGTSSDVGGYNYVS (SEQ ID NO: 34) | EVSKRPS (SEQ ID NO: 35) | SSYAGNKGV (SEQ ID NO: 36) |
| RQ43-GL-H | H | EVQLVESGGGLVQPGRSLRLSCAASGFPFDDYAIHWVRLAPGKGLEWVSSISWDSGSIGYADSVKGRFTISRDNAKNSLYLQMNSLRAEDTALYYCAKGAFPGYSSGWYYGLDVWGQGTTVTVSS (SEQ ID NO: 62) | DYAIH (SEQ ID NO: 31) | SISWDSGSIGYADSVKG (SEQ ID NO: 32) | GAFPGYSSGWYYGLDV (SEQ ID NO: 33) |
| RQ43-GL-H | L | QSVVTQPPSASGSLGQSVTISCTGTSSDVGGYNYVSWYQQHPGKAPKLMIFEVSKRPSGVPDRFSGSKSGNTASLTVSGLQAEDEADYYCSSYAGNKGVFGGGTKLTVL (SEQ ID NO: 61) | TGTSSDVGGYNYVS (SEQ ID NO: 34) | EVSKRPS (SEQ ID NO: 35) | SSYAGNKGV (SEQ ID NO: 36) |
| RQ43-GL-H-LO1 | H | EVQLVESGGGLVQPGRSLRLSCAASGFPFDDYAIHWVRLAPGKGLEWVSSISWDSGSIGYADSVKGRFTISRDNAKNSLYLQMNSLRAEDTALYYCAKGAFPGYSSGWYYGLEVWGQGTTVTVSS (SEQ ID NO: 63) | DYAIH (SEQ ID NO: 31) | SISWDSGSIGYADSVKG (SEQ ID NO: 32) | GAFPGYSSGWYYGLEV (SEQ ID NO: 37) |
| RQ43-GL-H-LO1 | L | QSVVTQPPSASGSLGQSVTISCTGTSSDVGGYNYVSWYQQHPGKAPKLMIFEVSKRPSGVPDRFSGSKSGNTASLTVSGLQAEDEADYYCSSYAGNKGVFGGGTKLTVL (SEQ ID NO: 61) | TGTSSDVGGYNYVS (SEQ ID NO: 34) | EVSKRPS (SEQ ID NO: 35) | SSYAGNKGV (SEQ ID NO: 36) |
| RQ43-GL-L | H | EVQLLETGGGLVQPGRSLRLSCAASGFPFDDYAIHWVRLAPGKGLEWVSSISWDSGSIGYADSVKGRFTISRDNAKNSLYLQMNSLRAEDTALYYCAKGAFPGYSSGWYYGLDVWGQGATVTVSS (SEQ ID NO: 60) | DYAIH (SEQ ID NO: 31) | SISWDSGSIGYADSVKG (SEQ ID NO: 32) | GAFPGYSSGWYYGLDV (SEQ ID NO: 33) |
| RQ43-GL-L | L | QSAVTQPASVSGSPGQSITISCTGTSSDVGGYNYVSWYQQHPGKAPKLMIFEVSKRPSGVSNRFSGSKSGNTASLTISGLQAEDEADYYCSSYAGNKGVFGSGTKVTVL (SEQ ID NO: 64) | TGTSSDVGGYNYVS (SEQ ID NO: 34) | EVSKRPS (SEQ ID NO: 35) | SSYAGNKGV (SEQ ID NO: 36) |
| RQ43-GL-LH | H | EVQLVESGGGLVQPGRSLRLSCAASGFPFDDYAIHWVRLAPGKGLEWVSSISWDSGSIGYADSVKGRFTISRDNAKNSLYLQMNSLRAEDTALYYCAKGAFPGYSSGWYYGLDVWGQGTTVTVSS (SEQ ID NO: 62) | DYAIH (SEQ ID NO: 31) | SISWDSGSIGYADSVKG (SEQ ID NO: 32) | GAFPGYSSGWYYGLDV (SEQ ID NO: 33) |
| RQ43-GL-LH | L | QSAVTQPASVSGSPGQSITISCTGTSSDVGGYNYVSWYQQHPGKAPKLMIFEVSKRPSGVSNRFSGSKSGNTASLTISGLQAEDEADYYCSSYAGNKGVFGSGTKVTVL (SEQ ID NO: 64) | TGTSSDVGGYNYVS (SEQ ID NO: 34) | EVSKRPS (SEQ ID NO: 35) | SSYAGNKGV (SEQ ID NO: 36) |

TABLE 1-continued

Antibody Sequences with Kabat-Defined CDRs

| Clone | H/L | Heavy and Light Chain Sequences | CDR1 | CDR2 | CDR3 |
|---|---|---|---|---|---|
| RQ43-GL-LH-LO1 | H | EVQLVESGGGLVQPGRSLRLSCAASGFPFDDYAIHWVRLAPGKGLEWVSSISWDSGSIGYADSVKGRFTISRDNAKNSLYLQMNSLRAEDTALYYCAKGAFPGYSSGWYYGLEVWGQGTTVTVSS (SEQ ID NO: 63) | DYAIH (SEQ ID NO: 31) | SISWDSGSIGYADSVKG (SEQ ID NO: 32) | GAFPGYSSGWYYGLEV (SEQ ID NO: 37) |
| RQ43-GL-LH-LO1 | L | QSAVTQPASVSGSPGQSITISCTGTSSDVGGYNYVSWYQQHPGKAPKLMIFEVSKRPSGVSNRFSGSKSGNTASLTISGLQAEDEADYYCSSYAGNKGVFGSGTKVTVL (SEQ ID NO: 64) | TGTSSDVGGYNYVS (SEQ ID NO: 34) | EVSKRPS (SEQ ID NO: 35) | SSYAGNKGV (SEQ ID NO: 36) |
| cilgavimab (AZD1061) | H | QMQLVQSGPEVKKPGTSVKVSCKASGFTFMSSAVQWVRQARGQRLEWIGWIVIGSGNTNYAQKFQERVTITRDMSTSTAYMELSSLRSEDTAVYYCAAPYCSSISCNDGFDIWGQGTMVTVSS (SEQ ID NO: 68) | GFTFMSSA (SEQ ID NO: 69) | IVIGSGNT (SEQ ID NO: 70) | AAPYCSSISCNDGFDI (SEQ ID NO: 71) |
| cilgavimab (AZD1061) | L | EIVLTQSPGTLSLSPGERATLSCRASQSVSSSYLAWYQQKPGQAPRLLIYGASSRATGIPDRFSGSGSGTDFTLTISRLEPEDFAVYYCQHYGSSRGWTFGQGTKVEIK (SEQ ID NO: 72) | QSVSSSY (SEQ ID NO: 73) | GAS (SEQ ID NO: 74) | QHYGSSRGWT (SEQ ID NO: 75) |
| Clone | H/L | Heavy and Light Chain Sequences | CDR1 | CDR2 | CDR3 |
| cilgavimab (AZD1061) | H | EVQLVESGGGLVKPGGSLRLSCAASGFTFRDVWMSWVRQAPGKGLEWVGRIKSKIDGGTTDYAAPVKGRFTISRDDSKNTLYLQMNSLKTEDTAVYYCTTAGSYYYDTVGPGLPEGKFDYWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKRVEPKSCDKTHTCPPCPAPEFEGGPSVFLFPPKPKDTLYITREPEVTCVVVDVSHEDPEVKFNWYVDGVEVHNAKTKPREEQYNSTYRVVSVLTVLHQDWLNGKEYKCKVSNKALPASIEKTISKAKGQPREPQVYTLPPSREEMTKNQVSLTCLVKGFYPSDIAVEWESNGQPENNYKTTPPVLDSDGSFFLYSKLTVDKSRWQQGNVFSCSVMHEALHNHYTQKSLSLSPGK (SEQ ID NO: 76) | GFTFMSSA (SEQ ID NO: 69) | IVIGSGNT (SEQ ID NO: 70) | AAPYCSSISCNDGFDI (SEQ ID NO: 71) |
| cilgavimab (AZD1061) | L | DIVMTQSPDSLAVSLGERATINCKSSQSVLYSSNNKNYLAWYQQKPGQPPKLLMYWASTRESGVPDRFSGSGSGAEFTLTISSLQAEDVAIYYCQQYYSTLTFGGGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC (SEQ ID NO: 77) | QSVSSSY (SEQ ID NO: 73) | GAS (SEQ ID NO: 74) | QHYGSSRGWT (SEQ ID NO: 75) |

In some aspects, an antibody or antigen-binding fragment thereof described herein binds to the spike protein of SARS-COV-2 and comprises the VH of an antibody listed in Table 1. In some aspects, an antibody or antigen-binding fragment thereof described herein binds to the spike protein of SARS-COV-2 and comprises the VL of an antibody listed in Table 1.

In some aspects, an antibody or antigen-binding fragment thereof described herein binds to the spike protein of SARS-COV-2 and comprises the VH and the VL of an antibody listed in 1 (i.e., the VH of the antibody and the VL of the same antibody).

In some aspects, an antibody or antigen-binding fragment thereof described herein may be described by its VL domain alone, or its VH domain alone, or by its 3 VL CDRs alone, or its 3 VH CDRs alone. See, for example, Rader C et al., (1998) PNAS 95:8910-8915, which is incorporated herein by reference in its entirety, describing the humanization of the mouse anti-αvβ3 antibody by identifying a complementing light chain or heavy chain, respectively, from a human light chain or heavy chain library, resulting in humanized antibody variants having affinities as high or higher than the affinity of the original antibody. See also Clackson T et al., (1991) Nature 352:624-628, which is incorporated herein by reference in its entirety, describing methods of producing antibodies that bind a specific antigen by using a specific VL domain (or VH domain) and screening a library for the complementary variable domains. The screen produced 14 new partners for a specific VH domain and 13 new partners for a specific VL domain, which were strong binders, as determined by ELISA. See also Kim S J & Hong H J, (2007) J Microbiol 45:572-577, which is incorporated herein by reference in its entirety, describing methods of producing antibodies that bind a specific antigen by using a specific VH domain and screening a library (e.g., human VL library) for complementary VL domains; the selected VL domains in turn could be used to guide selection of additional complementary (e.g., human) VH domains.

In some aspects, the CDRs of an antibody or antigen-binding fragment thereof can be determined according to the Chothia numbering scheme, which refers to the location of immunoglobulin structural loops (see, e.g., Chothia C & Lesk A M, (1987), J Mol Biol 196:901-917; Al-Lazikani B et al., (1997) J Mol Biol 273:927-948; Chothia C et al., (1992) J Mol Biol 227:799-817; Tramontano A et al., (1990) J Mol Biol 215 (1): 175-82; and U.S. Pat. No. 7,709,226). Typically, when using the Kabat numbering convention, the Chothia CDR-H1 loop is present at heavy chain amino acids 26 to 32, 33, or 34, the Chothia CDR-H2 loop is present at heavy chain amino acids 52 to 56, and the Chothia CDR-H3 loop is present at heavy chain amino acids 95 to 102, while the Chothia CDR-L1 loop is present at light chain amino acids 24 to 34, the Chothia CDR-L2 loop is present at light chain amino acids 50 to 56, and the Chothia CDR-L3 loop is present at light chain amino acids 89 to 97. The end of the Chothia CDR-H1 loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34).

In some aspects, provided herein are antibodies and antigen-binding fragments thereof that specifically bind to the spike protein of SARS-COV-2 and comprise the Chothia VH and VL CDRs of an antibody listed in Table 1. In some aspects, antibodies or antigen-binding fragments thereof that specifically bind to the spike protein of SARS-COV-2 comprise one or more CDRs, in which the Chothia and Kabat CDRs have the same amino acid sequence. In some aspects, provided herein are antibodies and antigen-binding fragments thereof that specifically bind to the spike protein of SARS-COV-2 and comprise combinations of Kabat CDRs and Chothia CDRs.

In some aspects, the CDRs of an antibody or antigen-binding fragment thereof can be determined according to the IMGT numbering system as described in Lefranc M-P, (1999) The Immunologist 7:132-136 and Lefranc M-P et al., (1999) Nucleic Acids Res 27:209-212. According to the IMGT numbering scheme, VH-CDR1 is at positions 26 to 35, VH-CDR2 is at positions 51 to 57, VH-CDR3 is at positions 93 to 102, VL-CDR1 is at positions 27 to 32, VL-CDR2 is at positions 50 to 52, and VL-CDR3 is at positions 89 to 97. In some aspects, provided herein are antibodies and antigen-binding fragments thereof that specifically bind to the spike protein of SARS-COV-2 and comprise the IMGT VH and VL CDRs of an antibody listed in Table 1, for example, as described in Lefranc M-P (1999) supra and Lefranc M-P et al., (1999) supra).

In some aspects, the CDRs of an antibody or antigen-binding fragment thereof can be determined according to MacCallum R M et al., (1996) J Mol Biol 262:732-745. See also, e.g., Martin A. "Protein Sequence and Structure Analysis of Antibody Variable Domains," in Antibody Engineering, Kontermann and Dübel, eds., Chapter 31, pp. 422-439, Springer-Verlag, Berlin (2001). In some aspects, provided herein are antibodies or antigen-binding fragments thereof that specifically bind to the spike protein of SARS-COV-2 and comprise VH and VL CDRs of an antibody listed in Table 1 as determined by the method in MacCallum R M et al.

In some aspects, the CDRs of an antibody or antigen-binding fragment thereof can be determined according to the AbM numbering scheme, which refers AbM hypervariable regions which represent a compromise between the Kabat CDRs and Chothia structural loops, and are used by Oxford Molecular's AbM antibody modeling software (Oxford Molecular Group, Inc.). In some aspects, provided herein are antibodies or antigen-binding fragments thereof that specifically bind to the spike protein of SARS-COV-2 and comprise VH and VL CDRs of an antibody listed in Table 1 as determined by the AbM numbering scheme.

In some aspects, provided herein are antibodies that comprise a heavy chain and/or a light chain. Non-limiting examples of human constant region sequences have been described in the art, e.g., see U.S. Pat. No. 5,693,780 and Kabat E A et al., (1991) supra.

With respect to the heavy chain, in some aspects, the heavy chain of an antibody described herein can be an alpha (α), delta (δ), epsilon (ε), gamma (γ) or mu (μ) heavy chain. In some aspects, the heavy chain of an antibody described can comprise a human alpha (α), delta (δ), epsilon (¿), gamma (γ) or mu (μ) heavy chain. In some aspects, an antibody described herein, which immunospecifically binds to the spike protein of SARS-COV-2, comprises a heavy chain wherein the amino acid sequence of the VH domain comprises an amino acid sequence set forth in Table 1 and wherein the constant region of the heavy chain comprises the amino acid sequence of a human gamma (γ) heavy chain constant region (e.g., a human IgG1 heavy chain constant region). In some aspects, an antibody described herein, which specifically binds to the spike protein of SARS-COV-2, comprises a heavy chain wherein the amino acid sequence of the VH domain comprises a sequence set forth in Table 1, and wherein the constant region of the heavy chain comprises the amino acid of a human heavy chain described herein or known in the art.

As is known in the art, heavy chain C-terminal lysines can be removed, e.g., in cell culture. While, C-terminal lysines are conserved in the heavy chain genes of all human IgG subclasses (i.e., IgG1, IgG2, IgG3 and IgG4), this residue is generally absent from IgG found in serum. It is also known that the processing and cleavage of C-terminal lysine from antibodies is one of the most commonly detected sources of product charge-heterogeneity during cell culture. Lysine residues at the heavy-chain C-terminus of recombinant IgGs can be removed during cell culture by carboxypeptidases that are endogenous to mammalian host cells. Thus, in some aspects, an antibody or antigen-binding fragment provided herein comprises a heavy chain that has a C-terminal lysine. In some aspects, an antibody or antigen-binding fragment provided herein comprises a heavy chain that does not have a C-terminal lysine.

In some aspects, the light chain of an antibody or antigen-binding fragment thereof described herein is a human kappa light chain or a human lambda light chain. In some aspects, an antibody described herein, which immunospecifically binds to the spike protein of SARS-COV-2 comprises a light chain wherein the amino acid sequence of the VL domain comprises a sequence set forth in Table 1 and wherein the constant region of the light chain comprises the amino acid sequence of a human kappa or lambda light chain constant region.

In some aspects, an antibody or antigen-binding fragment thereof described herein, which immunospecifically binds to the spike protein of SARS-COV-2 comprises a light chain wherein the amino acid sequence of the VL domain comprises a sequence set forth in Table 1, and wherein the constant region of the light chain comprises the amino acid sequence of a human kappa light chain constant region. The amino acid sequence of a human kappa light chain constant region can comprise the amino acid sequence of (SEQ ID NO: 64)
RTVAAPSVFIFPPSDEQLKSGTASVVCLLNNFYPREAKVQWKVDNALQS

GNSQESVTEQDSKDSTYSLSSTLTLSKADYEKHKVYACEVTHQGLSSPV

TKSFNRGEC

In some aspects, the light chain of an antibody described herein is a lambda light chain. In some aspects, an antibody described herein, which immunospecifically binds to the spike protein of SARS-COV-2 comprises a light chain wherein the amino acid sequence of the VL domain comprises a sequence set forth in Table 1 and wherein the constant region of the light chain comprises the amino acid sequence of a human lambda light chain constant region. The amino acid sequence of a human kappa light chain constant region can comprise the amino acid sequence of (SEQ ID NO: 65)
GQPKAAPSVTLFPPSSEELQANKATLVCLISDFYPGAVTVAWKADSSPV

KAGVETTTPSKQSNNKYAASSYLSLTPEQWKSHRSYSCQVTHEGSTVEK

TVAPTECS

In some aspects, an antibody described herein, which immunospecifically binds to the spike protein of SARS-COV-2 comprises a VH domain and a VL domain comprising any amino acid sequence described herein, and wherein the constant regions comprise the amino acid sequences of the constant regions of an IgG, IgE, IgM, IgD, IgA, or IgY immunoglobulin molecule, or a human IgG, IgE, IgM, IgD, IgA, or IgY immunoglobulin molecule. In some aspects, an antibody described herein, which immunospecifically binds to the spike protein of SARS-COV-2 comprises a VH domain and a VL domain comprising any amino acid sequence described herein, and wherein the constant regions comprise the amino acid sequences of the constant regions of an IgG, IgE, IgM, IgD, IgA, or IgY immunoglobulin molecule, any class (e.g., IgG1, IgG2, IgG3, IgG4, IgA1, and IgA2), or any subclass (e.g., IgG2a and IgG2b) of immunoglobulin molecule. In some aspects, the constant regions comprise the amino acid sequences of the constant regions of a human IgG, IgE, IgM, IgD, IgA, or IgY immunoglobulin molecule, any class (e.g., IgG1, IgG2, IgG3, IgG4, IgA1, and IgA2), or any subclass (e.g., IgG2a and IgG2b) of immunoglobulin molecule.

Fc region engineering is used in the art, e.g., to extend the half-life of therapeutic antibodies and antigen-binding fragments thereof and protect from degradation in vivo. In some aspects, the Fc region of an IgG antibody or antigen-binding fragment can be modified in order to increase the affinity of the IgG molecule for the Fc Receptor-neonate (FcRn), which mediates IgG catabolism and protects IgG molecules from degradation. Suitable Fc region amino acid substitutions or modifications are known in the art and include, for example, the triple substitution M252Y/S254T/T256E (referred to as "YTE"), numbered according to the EU index as in Kabat (see, e.g., U.S. Pat. No. 7,658,921; U.S. Patent Application Publication 2014/0302058; and Yu et al., *Antimicrob. Agents Chemother.*, 61 (1): e01020-16 (2017)). In some aspects, an antibody or antigen-binding binding fragment (e.g., monoclonal antibody or fragment) that binds to the spike protein of SARS-COV-2 comprises an Fc region comprising the YTE mutation.

The triple mutation (TM) L234F/L235E/P331S (according to European Union numbering convention; Sazinsky et al. *Proc Natl Acad Sci USA*, 105:20167-20172 (2008)) in the heavy chain constant region can significantly reduce IgG effector function.

In some aspects, an IgG1 CH1-CH3 sequence comprising the YTE mutation and the TM mutation comprises the amino acid sequence of (SEQ ID NO: 66)
ASTKGPSVFPLAPSSKSTSGGTAALGCLVKDYFPEPVTVSWNSGALTSG

VHTFPAVLQSSGLYSLSSVVTVPSSSLGTQTYICNVNHKPSNTKVDKRV

-continued
EPKSCDKTHTCPPCPAPEFEGGPSVFLFPPKPKDTLYITREPEVTCVVV

DVSHEDPEVKFNWYVDGVEVHNAKTKPREEQYNSTYRVVSVLTVLHQDW

LNGKEYKCKVSNKALPASIEKTISKAKGQPREPQVYTLPPSREEMTKNQ

VSLTCLVKGFYPSDIAVEWESNGQPENNYKTTPPVLDSDGSFFLYSKLT

VDKSRWQQGNVFSCSVMHEALHNHYTQKSLSLSPGK

In some aspects, one, two, or more mutations (e.g., amino acid substitutions) are introduced into the Fc region of an antibody or antigen-binding fragment thereof described herein (e.g., into the CH2 domain (residues 231-340 of human IgG1) and/or CH3 domain (residues 341-447 of human IgG1) and/or the hinge region, with numbering according to the Kabat numbering system (e.g., the EU index in Kabat)) to alter one or more functional properties of the antibody or antigen-binding fragment thereof, such as serum half-life, complement fixation, Fc receptor binding, and/or antigen-dependent cellular cytotoxicity.

In some aspects, one, two, or more mutations (e.g., amino acid substitutions) are introduced into the hinge region of the Fc region (CH1 domain) such that the number of cysteine residues in the hinge region are altered (e.g., increased or decreased) as described in, e.g., U.S. Pat. No. 5,677,425. The number of cysteine residues in the hinge region of the CH1 domain may be altered to, e.g., facilitate assembly of the light and heavy chains, or to alter (e.g., increase or decrease) the stability of the antibody or antigen-binding fragment thereof.

In some aspects, one, two, or more mutations (e.g., amino acid substitutions) are introduced into the Fc region of an antibody or antigen-binding fragment thereof described herein (e.g., CH2 domain (residues 231-340 of human IgG1) and/or CH3 domain (residues 341-447 of human IgG1) and/or the hinge region, with numbering according to the Kabat numbering system (e.g., the EU index in Kabat)) to increase or decrease the affinity of the antibody or antigen-binding fragment thereof for an Fc receptor (e.g., an activated Fc receptor) on the surface of an effector cell. Mutations in the Fc region that decrease or increase affinity for an Fc receptor and techniques for introducing such mutations into the Fc receptor or fragment thereof are known to one of skill in the art. Examples of mutations in the Fc receptor that can be made to alter the affinity of the antibody or antigen-binding fragment thereof for an Fc receptor are described in, e.g., Smith P et al., (2012) PNAS 109:6181-6186, U.S. Pat. No. 6,737,056, and International Publication Nos. WO 02/060919; WO 98/23289; and WO 97/34631, which are incorporated herein by reference.

In some aspects, one, two, or more amino acid mutations (i.e., substitutions, insertions or deletions) are introduced into an IgG constant domain, or FcRn-binding fragment thereof (preferably an Fc or hinge-Fc domain fragment) to alter (e.g., decrease or increase) half-life of the antibody or antigen-binding fragment thereof in vivo. See, e.g., International Publication Nos. WO 02/060919; WO 98/23289; and WO 97/34631; and U.S. Pat. Nos. 5,869,046, 6,121,022, 6,277,375 and 6,165,745 for examples of mutations that will alter (e.g., decrease or increase) the half-life of an antibody or antigen-binding fragment thereof in vivo. In some aspects, one, two or more amino acid mutations (i.e., substitutions, insertions, or deletions) are introduced into an IgG constant domain, or FcRn-binding fragment thereof (preferably an Fc or hinge-Fc domain fragment) to decrease the half-life of the antibody or antigen-binding fragment thereof in vivo. In some aspects, one, two or more amino acid mutations (i.e., substitutions, insertions or deletions) are introduced into an IgG constant domain, or FcRn-binding fragment thereof (preferably an Fc or hinge-Fc domain fragment) to increase the half-life of the antibody or antigen-binding fragment thereof in vivo. In some aspects, the antibodies or antigen-binding fragments thereof may have one or more amino acid mutations (e.g., substitutions) in the second constant (CH2) domain (residues 231-340 of human IgG1) and/or the third constant (CH3) domain (residues 341-447 of human IgG1), with numbering according to the EU index in Kabat (Kabat E A et al., (1991) supra). In some aspects, the constant region of the IgG1 comprises a methionine (M) to tyrosine (Y) substitution in position 252, a serine(S) to threonine (T) substitution in position 254, and a threonine (T) to glutamic acid (E) substitution in position 256, numbered according to the EU index as in Kabat. See U.S. Pat. No. 7,658,921, which is incorporated herein by reference. This type of mutant IgG, referred to as "YTE mutant" has been shown to display fourfold increased half-life as compared to wild-type versions of the same antibody (see Dall'Acqua W F et al., (2006) J Biol Chem 281:23514-24). In some aspects, an antibody or antigen-binding fragment thereof comprises an IgG constant domain comprising one, two, three or more amino acid substitutions of amino acid residues at positions 251-257, 285-290, 308-314, 385-389, and 428-436, numbered according to the EU index as in Kabat.

In some aspects, one, two, or more amino acid substitutions are introduced into an IgG constant domain Fc region to alter the effector function(s) of the antibody or antigen-binding fragment thereof. For example, one or more amino acids selected from amino acid residues 234, 235, 236, 237, 297, 318, 320 and 322, numbered according to the EU index as in Kabat, can be replaced with a different amino acid residue such that the antibody or antigen-binding fragment thereof has an altered affinity for an effector ligand but retains the antigen-binding ability of the parent antibody. The effector ligand to which affinity is altered can be, for example, an Fc receptor or the C1 component of complement. This approach is described in further detail in U.S. Pat. Nos. 5,624,821 and 5,648,260. In some aspects, the deletion or inactivation (through point mutations or other means) of a constant region domain may reduce Fc receptor binding of the circulating antibody or antigen-binding fragment thereof thereby increasing tumor localization. See, e.g., U.S. Pat. Nos. 5,585,097 and 8,591,886 for a description of mutations that delete or inactivate the constant domain and thereby increase tumor localization. In some aspects, one or more amino acid substitutions can be introduced into the Fc region to remove potential glycosylation sites on Fc region, which may reduce Fc receptor binding (see, e.g., Shields R L et al., (2001) J Biol Chem 276:6591-604).

In some aspects, one or more amino acids selected from amino acid residues 322, 329, and 331 in the constant region, numbered according to the EU index as in Kabat, can be replaced with a different amino acid residue such that the antibody or antigen-binding fragment thereof has altered C1q binding and/or reduced or abolished complement dependent cytotoxicity (CDC). This approach is described in further detail in U.S. Pat. No. 6,194,551 (Idusogie et al). In some aspects, one or more amino acid residues within amino acid positions 231 to 238 in the N-terminal region of the CH2 domain are altered to thereby alter the ability of the antibody to fix complement. This approach is described further in International Publication No. WO 94/29351. In some aspects, the Fc region is modified to increase the ability of the antibody or antigen-binding fragment thereof to mediate antibody dependent cellular cytotoxicity (ADCC) and/or to increase the affinity of the antibody or antigen-binding fragment thereof for an Fcγ receptor by mutating one or more amino acids (e.g., introducing amino acid substitutions) at the following positions: 238, 239, 248, 249, 252, 254, 255, 256, 258, 265, 267, 268, 269, 270, 272, 276, 278, 280, 283, 285, 286, 289, 290, 292, 293, 294, 295, 296, 298, 301, 303, 305, 307, 309, 312, 315, 320, 322, 324, 326, 327, 328, 329, 330, 331, 333, 334, 335, 337, 338, 340, 360, 373, 376, 378, 382, 388, 389, 398, 414, 416, 419, 430, 434, 435, 437, 438, or 439, numbered according to the EU index as in Kabat. This approach is described further in International Publication No. WO 00/42072.

In some aspects, an antibody or antigen-binding fragment thereof described herein comprises the constant domain of an IgG1 with a mutation (e.g., substitution) at position 267, 328, or a combination thereof, numbered according to the EU index as in Kabat. In some aspects, an antibody or antigen-binding fragment thereof described herein comprises the constant domain of an IgG1 with a mutation (e.g., substitution) selected from the group consisting of S267E, L328F, and a combination thereof. In some aspects, an antibody or antigen-binding fragment thereof described herein comprises the constant domain of an IgG1 with a S267E/L328F mutation (e.g., substitution). In some aspects, an antibody or antigen-binding fragment thereof described herein comprising the constant domain of an IgG1 with a S267E/L328F mutation (e.g., substitution) has an increased binding affinity for FcγRIIA, FcγRIIB, or FcγRIIA and FcγRIIB.

Engineered glycoforms may be useful for a variety of purposes, including but not limited to enhancing or reducing effector function. Methods for generating engineered glycoforms in an antibody or antigen-binding fragment thereof described herein include but are not limited to those disclosed, e.g., in Umaña P et al., (1999) Nat Biotechnol 17:176-180; Davies J et al., (2001) Biotechnol Bioeng 74:288-294; Shields R L et al., (2002) J Biol Chem 277: 26733-26740; Shinkawa T et al., (2003) J Biol Chem 278:3466-3473; Niwa R et al., (2004) Clin Cancer Res 1:6248-6255; Presta L G et al., (2002) Biochem Soc Trans 30:487-490; Kanda Y et al., (2007) Glycobiology 17:104-118; U.S. Pat. Nos. 6,602,684; 6,946,292; and 7,214,775; U.S. Patent Publication Nos. US 2007/0248600; 2007/0178551; 2008/0060092; and 2006/0253928; International Publication Nos. WO 00/61739; WO 01/292246; WO 02/311140; and WO 02/30954; Potillegent™ technology (Biowa, Inc. Princeton, N.J.); and GlycoMAb® glycosylation engineering technology (Glycart biotechnology AG, Zurich, Switzerland). See also, e.g., Ferrara C et al., (2006) Biotechnol Bioeng 93:851-861; International Publication Nos. WO 07/039818; WO 12/130831; WO 99/054342; WO 03/011878; and WO 04/065540.

In some aspects, any of the constant region mutations or modifications described herein can be introduced into one or both heavy chain constant regions of an antibody or antigen-binding fragment thereof described herein having two heavy chain constant regions.

In some aspects, an antibody or antigen-binding fragment thereof described herein, that specifically binds to the spike protein of SARS-COV-2 neutralizes SARS-COV-2. In some aspects, an antibody or antigen-binding fragment thereof described herein that specifically binds to the spike protein of SARS-COV-2 neutralizes SARS-COV-2 pseudovirus. In some aspects, the antibody or antigen-binding fragment thereof neutralizes SARS-COV-2 BA.1, SARS-COV-2 BA1.1, SARS-COV-2 BA.2, SARS-COV-2 Delta, and/or SARS-COV-2 D614G pseudovirus with an EC50 of 100 ng/ml or less ((e.g., an EC50 of about 1 ng/ml to about 100 ng/mL or about 2.5 ng/ml to about 100 ng/ml).

Competition binding assays can be used to determine whether two antibodies bind to overlapping epitopes. Competitive binding can be determined in an assay in which the immunoglobulin under test inhibits specific binding of a reference antibody to a common antigen, such as the spike protein of SARS-COV-2 or SARS-COV-2. Numerous types of competitive binding assays are known, for example: octet competitive binding assay, solid phase direct or indirect radioimmunoassay (RIA), solid phase direct or indirect enzyme immunoassay (EIA), sandwich competition assay (see Stahli C et al., (1983) Methods Enzymol 9:242-253); solid phase direct biotin-avidin EIA (see Kirkland T N et al., (1986) J Immunol 137:3614-9); solid phase direct labeled assay, solid phase direct labeled sandwich assay (see Harlow E & Lane D, (1988) Antibodies: A Laboratory Manual, Cold Spring Harbor Press); solid phase direct label RIA using I-125 label (see Morel G A et al., (1988) Mol Immunol 25 (1): 7-15); solid phase direct biotin-avidin EIA (Cheung R C et al., (1990) Virology 176:546-52); and direct labeled RIA. (Moldenhauer G et al., (1990) Scand J Immunol 32:77-82). Typically, such an assay involves the use of purified antigen bound to a solid surface or cells bearing either of these, an unlabeled test immunoglobulin and a labeled reference immunoglobulin. Competitive inhibition can be measured by determining the amount of label bound to the solid surface or cells in the presence of the test immunoglobulin. Usually the test immunoglobulin is present in excess. Usually, when a competing antibody is present in excess, it will inhibit specific binding of a reference antibody to a common antigen by at least 50-55%, 55-60%, 60-65%, 65-70%, 70-75% or more. A competition binding assay can be configured in a large number of different formats using either labeled antigen or labeled antibody. In a common version of this assay, the antigen is immobilized on a 96-well plate. The ability of unlabeled antibodies to block the binding of labeled antibodies to the antigen is then measured using radioactive or enzyme labels. For further details see, for example, Wagener C et al., (1983) J Immunol 130:2308-2315; Wagener C et al., (1984) J Immunol Methods 68:269-274; Kuroki M et al., (1990) Cancer Res 50:4872-4879; Kuroki M et al., (1992) Immunol Invest 21:523-538; Kuroki M et al., (1992) Hybridoma 11:391-407 and Antibodies: A Laboratory Manual, Ed Harlow E & Lane D editors supra, pp. 386-389. One competitive binding assay is provided herein in Example 15.

In some aspects, an antibody or antigen-binding fragment thereof that competitively inhibits binding of another antibody or antigen-binding fragment thereof competitively inhibits binding in an octet competitive binding assay, e.g., an octet competitive binding assay as provided in Example 15 herein.

In some aspects, a competition assay is performed using surface plasmon resonance (BIAcore®), e.g., by an 'in tandem approach' such as that described by Abdiche Y N et al., (2009) Analytical Biochem 386:172-180, whereby antigen is immobilized on the chip surface, for example, a CM5 sensor chip and the antibodies or antigen-binding fragments are then run over the chip. To determine if an antibody or antigen-binding fragment thereof competes with an antibody that binds to the spike protein of SARS-COV-2 as described herein, the antibody or antigen-binding fragment is first run over the chip surface to achieve saturation and then the potential, competing antibody is added. Binding of the competing antibody or antigen-binding fragment thereof can then be determined and quantified relative to a non-competing control.

In another aspect, provided herein are antibodies that competitively inhibit (e.g., in a dose dependent manner) an antibody or antigen-binding fragment thereof described from binding to the spike protein of SARS-COV-2 or to SARS-COV-2, as determined using assays known to one of skill in the art or described herein (e.g., ELISA competitive assays, or suspension array or surface plasmon resonance assay).

In some aspects, an antigen-binding fragment as described herein that specifically binds to the spike protein of SARS-COV-2, is selected from the group consisting of a Fab, Fab', F(ab')$_2$, and scFv, wherein the Fab, Fab', F(ab')$_2$, or scFv comprises a heavy chain variable region sequence and a light chain variable region sequence of an antibody or antigen-binding fragment thereof described herein that specifically binds to the spike protein of SARS-COV-2 or to SARS-COV-2. A Fab, Fab', F(ab')$_2$, or scFv can be produced by any technique known to those of skill in the art, including, but not limited to, those discussed herein. In some aspects, the Fab, Fab', F(ab')$_2$, or scFv further comprises a moiety that extends the half-life of the antibody in vivo. The moiety is also termed a "half-life extending moiety." Any moiety known to those of skill in the art for extending the half-life of a Fab, Fab', F(ab')$_2$, or scFv in vivo can be used. For example, the half-life extending moiety can include a Fc region, a polymer, an albumin, or an albumin binding protein or compound. The polymer can include a natural or synthetic, optionally substituted straight or branched chain polyalkylene, polyalkenylene, polyoxylalkylene, polysaccharide, polyethylene glycol, polypropylene glycol, polyvinyl alcohol, methoxypolyethylene glycol, lactose, amylose, dextran, glycogen, or derivative thereof. Substituents can include one or more hydroxy, methyl, or methoxy groups. In some aspects, the Fab, Fab', F(ab')$_2$, or scFv can be modified by the addition of one or more C-terminal amino acids for attachment of the half-life extending moiety. In some aspects, the half-life extending moiety is polyethylene glycol or human serum albumin. In some aspects, the Fab, Fab', F(ab')$_2$, or scFv is fused to a Fc region.

An antibody or antigen-binding fragment thereof that binds to the spike protein of SARS-COV-2 can be fused or conjugated (e.g., covalently or noncovalently linked) to a detectable label or substance. Examples of detectable labels or substances include enzyme labels, such as, glucose oxidase; radioisotopes, such as iodine ($^{125}$I, $^{121}$I), carbon ($^{14}$C), sulfur ($^{35}$S), tritium ($^{3}$H), indium ($^{121}$In), and technetium ($^{99}$Tc); luminescent labels, such as luminol; and fluorescent labels, such as fluorescein and rhodamine, and biotin. Such labeled antibodies or antigen-binding fragments thereof can be used to detect the spike protein of SARS-COV-2 or to SARS-COV-2. See, e.g., Section 7.6.2, infra.

7.3 Combinations of Antibodies and Antigen-Binding Fragments Thereof

Provided herein are combinations of antibodies or antigen-binding fragments thereof that bind to the spike protein of SARS-COV-2, e.g., a first antibody or antigen-binding fragment thereof that binds to the spike protein of SARS-COV-2 and a second antibody or antigen-binding fragment thereof that binds to the spike protein of SARS-COV-2. In some aspects, the first and second antibodies or antigen-binding fragments thereof in a combination are in a single composition. In some aspects, the first and second antibodies or antigen-binding fragments thereof in a combination are in separate compositions. When the first and second antibodies or antigen-binding fragments thereof in a combination are in separate compositions, the first and second antibodies or antigen-binding fragments thereof can be administered simultaneously or sequentially.

Also provided herein are compositions, e.g., pharmaceutical compositions, comprising antibodies or antigen-binding fragments thereof that bind to the spike protein of SARS-COV-2, e.g., a first antibody or antigen-binding fragment thereof that binds to the spike protein of SARS-CoV-2 and a second antibody or antigen-binding fragment thereof that binds to the spike protein of SARS-COV-2. Such compositions comprise both the first antibody or antigen-binding fragment thereof and the second antibody or antigen-binding fragment thereof.

In some aspects, a combination or composition provided herein comprises a first antibody or antigen-binding fragment thereof that binds to the spike protein of SARS-COV-2 and a second antibody or antigen-binding fragment thereof that binds to the spike protein of SARS-CoV-2. In some aspects, a method provided herein uses a combination or composition of antibodies and antigen-binding fragments thereof that bind to the spike protein of SARS-COV-2, e.g., a combination or composition comprising first antibody or antigen-binding fragment thereof that binds to the spike protein of SARS-COV-2 and a second antibody or antigen-binding fragment thereof that binds to the spike protein of SARS-COV-2.

In some aspects of the combinations, compositions, or methods provided herein, the first and second antibodies or antigen-binding fragments thereof bind to non-overlapping epitopes of the spike protein of SARS-COV-2. In some aspects of the combinations, compositions, or methods provided herein, the first and second antibodies or antigen-binding fragments thereof can bind to the RBD of the spike protein of SARS-COV-2 concurrently.

In some aspects of the combinations, compositions, or methods provided herein, the first antibody or antigen-binding fragment thereof comprises the 6 CDR sequences of an antibody provided in Table 1 and/or the second antibody or antigen-binding fragment thereof comprises the 6 CDR sequences of an antibody provided in Table 1.

The first antibody or antigen-binding fragment thereof can comprise the 6 CDRs of the RQ43-GL-H-LO1 antibody, and the second antibody or antigen-binding fragment thereof can comprise the 6 CDRs of the cilgavimab antibody.

The first antibody or antigen-binding fragment thereof can comprise the 6 CDRs of the RQ20, RQ20-GL-LH, or RQ20-GL-LH antibody, and the second antibody or antigen-binding fragment thereof can comprise the 6 CDRs of the RQ29 or RQ29-GL-LH antibody. The first antibody or antigen-binding fragment thereof can comprise the 6 CDRs of the RQ20, RQ20-GL-LH, or RQ20-GL-LH antibody, and the second antibody or antigen-binding fragment thereof can comprise the 6 CDRs of the RQ33, RQ33-GL-H, RQ33-GL-H-LO1, or RQ33-GL-H-LO1 antibody. The first antibody or antigen-binding fragment thereof can comprise the 6 CDRs of the RQ20, RQ20-GL-LH, or RQ20-GL-LH antibody, and the second antibody or antigen-binding fragment thereof can comprise the 6 CDRs of the RQ40 or RQ40-GL-LH antibody. The first antibody or antigen-binding fragment thereof can comprise the 6 CDRs of the RQ20, RQ20-GL-LH, or RQ20-GL-LH antibody, and the second antibody or antigen-binding fragment thereof can comprise the 6 CDRs of the RQ41, RQ41-GL-LH, RQ41-GL-LH-LO1, or RQ41-LO1 antibody. The first antibody or antigen-binding fragment thereof can comprise the 6 CDRs of the RQ20, RQ20-GL-LH, or RQ20-GL-LH antibody, and the second antibody or antigen-binding fragment thereof can comprise the 6 CDRs of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the 6 CDRs of the RQ29 or RQ29-GL-LH antibody, and the second antibody or antigen-binding fragment thereof can comprise the 6 CDRs of the RQ33, RQ33-GL-H, RQ33-GL-H-LO1, or RQ33-GL-H-LO1 antibody. The first antibody or antigen-binding fragment thereof can comprise the 6 CDRs of the RQ29 or RQ29-GL-LH antibody, and the second antibody or antigen-binding fragment thereof can comprise the 6 CDRs of the RQ40 or RQ40-GL-LH antibody. The first antibody or antigen-binding fragment thereof can comprise the 6 CDRs of the RQ29 or RQ29-GL-LH antibody, and the second antibody or antigen-binding fragment thereof can comprise the 6 CDRs of the RQ41, RQ41-GL-LH, RQ41-GL-LH-LO1, or RQ41-LO1 antibody. The first antibody or antigen-binding fragment thereof can comprise the 6 CDRs of RQ29 or RQ29-GL-LH antibody, and the second antibody or antigen-binding fragment thereof can comprise the 6 CDRs of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the 6 CDRs of the RQ33, RQ33-GL-H, RQ33-GL-H-LO1, or RQ33-GL-H-LO1 antibody, and the second antibody or antigen-binding fragment thereof can comprise the 6 CDRs of the RQ40 or RQ40-GL-LH antibody. The first antibody or antigen-binding fragment thereof can comprise the 6 CDRs of the RQ33, RQ33-GL-H, RQ33-GL-H-LO1, or RQ33-GL-H-LO1 antibody, and the second antibody or antigen-binding fragment thereof can comprise the 6 CDRs of the RQ41, RQ41-GL-LH, RQ41-GL-LH-LO1, or RQ41-LO1 antibody. The first antibody or antigen-binding fragment thereof can comprise the 6 CDRs of RQ33, RQ33-GL-H, RQ33-GL-H-LO1, or RQ33-GL-H-LO1 antibody, and the second antibody or antigen-binding fragment thereof can comprise the 6 CDRs of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the 6 CDRs of the RQ40 or RQ40-GL-LH antibody, and the second antibody or antigen-binding fragment thereof can comprise the 6 CDRs of the RQ41, RQ41-GL-LH, RQ41-GL-LH-LO1, or RQ41-LO1 antibody. The first antibody or antigen-binding fragment thereof can comprise the 6 CDRs of RQ40 or RQ40-GL-LH antibody, and the second antibody or antigen-binding fragment thereof can comprise the 6 CDRs of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the 6 CDRs of the RQ41, RQ41-GL-LH, RQ41-GL-LH-LO1, or RQ41-LO1 antibody, and the second antibody or antigen-binding fragment thereof can comprise the 6 CDRs of the RQ43, RQ43-GL-H, RQ43-GL-H-LO1, RQ43-GL-L, RQ43-GL-LH, or RQ43-GL-LH-LO1 antibody.

In some aspects of the combinations, compositions, or methods provided herein, the first antibody or antigen-binding fragment thereof comprises the VH and/or VL sequences of an antibody provided in Table 1 and/or the second antibody or antigen-binding fragment thereof comprises the VH and/or VL sequences of an antibody provided in Table 1.

The first antibody or antigen-binding fragment thereof can comprise the VH and VL of the RQ43-GL-H-LO1 antibody, and the second antibody or antigen-binding fragment thereof can comprise the VH and VL of the cilgavimab antibody. In some aspects, the second antibody comprises a heavy chain comprising the amino acid sequence of SEQ ID NO:76 and a light chain comprising the amino acid sequence of SEQ ID NO:77.

The first antibody or antigen-binding fragment thereof can comprise the VH and VL of the RQ20, RQ20-GL-LH, or RQ20-GL-LH antibody, and the second antibody or antigen-binding fragment thereof can comprise the VH and VL of the RQ29 or RQ29-GL-LH antibody. The first antibody or antigen-binding fragment thereof can comprise the VH and VL of the RQ20, RQ20-GL-LH, or RQ20-GL-LH antibody, and the second antibody or antigen-binding fragment thereof can comprise the VH and VL of the RQ33, RQ33-GL-H, RQ33-GL-H-LO1, or RQ33-GL-H-LO1 antibody. The first antibody or antigen-binding fragment thereof can comprise the VH and VL of the RQ20, RQ20-GL-LH, or RQ20-GL-LH antibody, and the second antibody or antigen-binding fragment thereof can comprise the VH and VL of the RQ40 or RQ40-GL-LH antibody. The first antibody or antigen-binding fragment thereof can comprise the VH and VL of the RQ20, RQ20-GL-LH, or RQ20-GL-LH antibody, and the second antibody or antigen-binding fragment thereof can comprise the VH and VL of the RQ41, RQ41-GL-LH, RQ41-GL-LH-LO1, or RQ41-LO1 antibody. The first antibody or antigen-binding fragment thereof can comprise the VH and VL of the RQ20, RQ20-GL-LH, or RQ20-GL-LH antibody, and the second antibody or antigen-binding fragment thereof can comprise the VH and VL of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the VH and VL of the RQ29 or RQ29-GL-LH antibody, and the second antibody or antigen-binding fragment thereof can comprise the VH and VL of the RQ33, RQ33-GL-H, RQ33-GL-H-LO1, or RQ33-GL-H-LO1 antibody. The first antibody or antigen-binding fragment thereof can comprise the VH and VL of the RQ29 or RQ29-GL-LH antibody, and the second antibody or antigen-binding fragment thereof can comprise the VH and VL of the RQ40 or RQ40-GL-LH antibody. The first antibody or antigen-binding fragment thereof can comprise the VH and VL of the RQ29 or RQ29-GL-LH antibody, and the second antibody or antigen-binding fragment thereof can comprise the VH and VL of the RQ41, RQ41-GL-LH, RQ41-GL-LH-LO1, or RQ41-LO1 antibody. The first antibody or antigen-binding fragment thereof can comprise the VH and VL of RQ29 or RQ29-GL-LH antibody, and the second antibody or antigen-binding fragment thereof can comprise the VH and VL of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the VH and VL of the RQ33, RQ33-GL-H, RQ33-GL-H-LO1, or RQ33-GL-H-LO1 antibody, and the second antibody or antigen-binding fragment thereof can comprise the VH and VL of the RQ40 or RQ40-GL-LH antibody. The first antibody or antigen-binding fragment thereof can comprise the VH and VL of the RQ33, RQ33-GL-H, RQ33-GL-H-LO1, or RQ33-GL-H-LO1 antibody, and the second antibody or antigen-binding fragment thereof can comprise the VH and VL of the RQ41, RQ41-GL-LH, RQ41-GL-LH-LO1, or RQ41-LO1 antibody. The first antibody or antigen-binding fragment thereof can comprise the VH and VL of RQ33, RQ33-GL-H, RQ33-GL-H-LO1, or RQ33-GL-H-LO1 antibody, and the second antibody or antigen-binding fragment thereof can comprise the VH and VL of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the VH and VL of the RQ40 or RQ40-GL-LH antibody, and the second antibody or antigen-binding fragment thereof can comprise the VH and VL of the RQ41, RQ41-GL-LH, RQ41-GL-LH-LO1, or RQ41-LO1 antibody. The first antibody or antigen-binding fragment thereof can comprise the VH and VL of RQ40 or RQ40-GL-LH antibody, and the second antibody or antigen-binding fragment thereof can comprise the VH and VL of the RQ43, RQ43-GL-H, RQ43-GL-H-LO1, RQ43-GL-L, RQ43-GL-LH, or RQ43-GL-LH-LO1 antibody.

The first antibody or antigen-binding fragment thereof can comprise the VH and VL of the RQ41, RQ41-GL-LH, RQ41-GL-LH-LO1, or RQ41-LO1 antibody, and the second antibody or antigen-binding fragment thereof can comprise the VH and VL of the RQ43, RQ43-GL-H, RQ43-GL-H-LO1, RQ43-GL-L, RQ43-GL-LH, or RQ43-GL-LH-LO1 antibody.

In some aspects of the combinations, compositions, or methods provided herein, the first antibody or antigen-binding fragment thereof competitively inhibits binding to the spike protein of SARS-COV-2 of an antibody comprising a variable heavy chain (VH) comprising the amino acid sequence of SEQ ID NO:63 and a variable light chain (VL) comprising the amino acid sequence of SEQ ID NO:61 and the second antibody or antigen-binding fragment thereof competitively inhibits binding to the spike protein of SARS-COV-2 of an antibody comprising a variable heavy chain (VH) comprising the amino acid sequence of SEQ ID NO:68 and a variable light chain (VL) comprising the amino acid sequence of SEQ ID NO:72. In some aspects, the first antibody or antigen-binding fragment thereof comprises a VH comprising the amino acid sequence of SEQ ID NO:63 and a VL comprising the amino acid sequence of SEQ ID NO:61. In some aspects, the second antibody or antigen-binding fragment thereof comprises a VH comprising the amino acid sequence of SEQ ID NO:68 and a VL comprising the amino acid sequence of SEQ ID NO: 72. In some aspects, the second antibody comprises a heavy chain comprising the amino acid sequence of SEQ ID NO:76 and a light chain comprising the amino acid sequence of SEQ ID NO: 77.

In some aspects of the combinations, compositions, or methods provided herein, the first antibody or antigen-binding fragment binds to the same epitope of the spike protein of SARS-CoV-2 as an antibody comprising a variable heavy chain (VH) comprising the amino acid sequence of SEQ ID NO:63 and a variable light chain (VL) comprising the amino acid sequence of SEQ ID NO: 61 and the second antibody or antigen-binding fragment thereof and the second antibody or antigen-binding fragment binds to the same epitope of the spike protein of SARS-COV-2 as an antibody comprising a variable heavy chain (VH) comprising the amino acid sequence of SEQ ID NO: 68 and a variable light chain (VL) comprising the amino acid sequence of SEQ ID NO:72.

In some aspects of the combinations, compositions, or methods provided herein, the first antibody or antigen-binding fragment thereof comprises the VH-CDR1, VH-CDR2, VH-CDR3, VL-CDR1, VL-CDR2, and VL-CDR3 of SEQ ID NOs: 31, 32, 37, 34, 35, and 36, respectively and the second antibody or antigen-binding fragment thereof comprises the VH-CDR1, VH-CDR2, VH-CDR3, VL-CDR1, VL-CDR2, and VL-CDR3 of SEQ ID NOs: 69, 70, 71, 73, 74, and 75, respectively.

In some aspects of the combinations, compositions, or methods provided herein, the first antibody or antigen-binding fragment thereof comprises a variable heavy chain (VH) comprising the amino acid sequence of SEQ ID NO:63 and a variable light chain (VL) comprising the amino acid sequence of SEQ ID NO:61 and the second antibody or antigen-binding fragment thereof comprises a variable heavy chain (VH) comprising the amino acid sequence of SEQ ID NO: 68 and a variable light chain (VL) comprising the amino acid sequence of SEQ ID NO:72. In some aspects, the second antibody comprises a heavy chain comprising the amino acid sequence of SEQ ID NO:76 and a light chain comprising the amino acid sequence of SEQ ID NO:77.

In some aspects of the combinations, compositions, or methods provided herein, the first antibody or antigen-binding fragment thereof competitively inhibits binding to the spike protein of SARS-COV-2 of an antibody comprising a variable heavy chain (VH) comprising the amino acid sequence of SEQ ID NO:46 and a variable light chain (VL) comprising the amino acid sequence of SEQ ID NO:47 and the second antibody or antigen-binding fragment thereof competitively inhibits binding to the spike protein of SARS-COV-2 of an antibody comprising a variable heavy chain (VH) comprising the amino acid sequence of SEQ ID NO:63 and a variable light chain (VL) comprising the amino acid sequence of SEQ ID NO:61. In some aspects, the first antibody or antigen-binding fragment thereof comprises a VH comprising the amino acid sequence of SEQ ID NO:46 and a VL comprising the amino acid sequence of SEQ ID NO:47; a VH comprising the amino acid sequence of SEQ ID NO:48 and a VL comprising the amino acid sequence of SEQ ID NO:47; or a VH comprising the amino acid sequence of SEQ ID NO:49 and a VL comprising the amino acid sequence of SEQ ID NO:47. In some aspects, the second antibody or antigen-binding fragment thereof comprises a VH comprising the amino acid sequence of SEQ ID NO: 63 and a VL comprising the amino acid sequence of SEQ ID NO:61; a VH comprising the amino acid sequence of SEQ ID NO:60 and a VL comprising the amino acid sequence of SEQ ID NO: 61; a VH comprising the amino acid sequence of SEQ ID NO:62 and a VL comprising the amino acid sequence of SEQ ID NO:61; a VH comprising the amino acid sequence of SEQ ID NO: 60 and a VL comprising the amino acid sequence of SEQ ID NO:64; a VH comprising the amino acid sequence of SEQ ID NO:62 and a VL comprising the amino acid sequence of SEQ ID NO: 64; or a VH comprising the amino acid sequence of SEQ ID NO:63 and a VL comprising the amino acid sequence of SEQ ID NO:64.

In some aspects of the combinations, compositions, or methods provided herein, the first antibody or antigen-binding fragment binds to the same epitope of the spike protein of SARS-CoV-2 as an antibody comprising a variable heavy chain (VH) comprising the amino acid sequence of SEQ ID NO:46 and a variable light chain (VL) comprising the amino acid sequence of SEQ ID NO: 47 and the second antibody or antigen-binding fragment thereof and the second antibody or antigen-binding fragment binds to the same epitope of the spike protein of SARS-CoV-2 as an antibody comprising a variable heavy chain (VH) comprising the amino acid sequence of SEQ ID NO: 63 and a variable light chain (VL) comprising the amino acid sequence of SEQ ID NO:61.

In some aspects of the combinations, compositions, or methods provided herein, the first antibody or antigen-binding fragment thereof comprises the VH-CDR1, VH-CDR2, VH-CDR3, VL-CDR1, VL-CDR2, and VL-CDR3 of SEQ ID NOs: 13, 14, 15, 16, 17, and 18, respectively and the second antibody or antigen-binding fragment thereof comprises the VH-CDR1, VH-CDR2, VH-CDR3, VL-CDR1, VL-CDR2, and VL-CDR3 of SEQ ID NOs: 31, 32, 37, 34, 35, and 36, respectively.

In some aspects of the combinations, compositions, or methods provided herein, the first antibody or antigen-binding fragment thereof comprises a variable heavy chain (VH) comprising the amino acid sequence of SEQ ID NO:46 and a variable light chain (VL) comprising the amino acid sequence of SEQ ID NO:47 and the second antibody or antigen-binding fragment thereof comprises a variable heavy chain (VH) comprising the amino acid sequence of SEQ ID NO: 63 and a variable light chain (VL) comprising the amino acid sequence of SEQ ID NO:61.

In some aspects of the combinations, compositions, or methods provided herein, the first antibody or antigen-binding fragment thereof competitively inhibits binding to the spike protein of SARS-COV-2 of an antibody comprising a variable heavy chain (VH) comprising the amino acid sequence of SEQ ID NO:46 and a variable light chain (VL) comprising the amino acid sequence of SEQ ID NO:47 and the second antibody or antigen-binding fragment thereof competitively inhibits binding to the spike protein of SARS-COV-2 of an antibody comprising a variable heavy chain (VH) comprising the amino acid sequence of SEQ ID NO:52 and a variable light chain (VL) comprising the amino acid sequence of SEQ ID NO:53. In some aspects, the first antibody or antigen-binding fragment thereof comprises a VH comprising the amino acid sequence of SEQ ID NO:46 and a VL comprising the amino acid sequence of SEQ ID NO:47; a VH comprising the amino acid sequence of SEQ ID NO:48 and a VL comprising the amino acid sequence of SEQ ID NO:47; or a VH comprising the amino acid sequence of SEQ ID NO:49 and a VL comprising the amino acid sequence of SEQ ID NO:47. In some aspects, the second antibody or antigen-binding fragment thereof comprises a VH comprising the amino acid sequence of SEQ ID NO: 52 and a VL comprising the amino acid sequence of SEQ ID NO:53; or a VH comprising the amino acid sequence of SEQ ID NO:50 and a VL comprising the amino acid sequence of SEQ ID NO: 51.

In some aspects of the combinations, compositions, or methods provided herein, the first antibody or antigen-binding fragment binds to the same epitope of the spike protein of SARS-CoV-2 as an antibody comprising a variable heavy chain (VH) comprising the amino acid sequence of SEQ ID NO:46 and a variable light chain (VL) comprising the amino acid sequence of SEQ ID NO: 47 and the second antibody or antigen-binding fragment thereof and the second antibody or antigen-binding fragment binds to the same epitope of the spike protein of SARS-COV-2 as an antibody comprising a variable heavy chain (VH) comprising the amino acid sequence of SEQ ID NO: 52 and a variable light chain (VL) comprising the amino acid sequence of SEQ ID NO:53.

In some aspects of the combinations, compositions, or methods provided herein, the first antibody or antigen-binding fragment thereof comprises the VH-CDR1, VH-CDR2, VH-CDR3, VL-CDR1, VL-CDR2, and VL-CDR3 of SEQ ID NOs: 13, 14, 15, 16, 17, and 18, respectively and the second antibody or antigen-binding fragment thereof comprises the VH-CDR1, VH-CDR2, VH-CDR3, VL-CDR1, VL-CDR2, and VL-CDR3 of SEQ ID NOs: 20, 21, 22, 23, 67, and 24, respectively.

In some aspects of the combinations, compositions, or methods provided herein, the first antibody or antigen-binding fragment thereof comprises a variable heavy chain (VH) comprising the amino acid sequence of SEQ ID NO:46 and a variable light chain (VL) comprising the amino acid sequence of SEQ ID NO:47 and the second antibody or antigen-binding fragment thereof comprises a variable heavy chain (VH) comprising the amino acid sequence of SEQ ID NO: 52 and a variable light chain (VL) comprising the amino acid sequence of SEQ ID NO:53.

In some aspects of the combinations, compositions, or methods provided herein, the combination or composition neutralizes SARS-COV-2 pseudovirus. In some aspects, the combination or composition neutralizes SARS-COV-2 BA.1, SARS-COV-2 BA1.1, SARS-COV-2 BA.2, SARS-COV-2 Delta, and/or SARS-COV-2 D614G pseudovirus with an EC50 of 75 ng/mL or less (e.g., an EC50 of about 1 ng/ml to about 75 ng/ml or about 2.5 ng/mL to about 75 ng/ml). In some aspects, the combination or composition neutralizes SARS-COV-2 BA.1, SARS-COV-2 BA1.1, and/or SARS-COV-2 BA.2 pseudovirus with an EC50 of 25 ng/mL or less (e.g., an EC50 of about 1 ng/ml to about 25 ng/ml or about 2.5 ng/ml to about 25 ng/ml). In some aspects, the combination or composition neutralizes SARS-COV-2 Delta and/or SARS-COV-2 D614G pseudovirus with an EC50 of 75 ng/mL or less (e.g., an EC50 of about 1 ng/ml to about 75 ng/ML; about 2.5 ng/ml to about 75 ng/ml; about 10 ng/mL to about 75 ng/ml; or about 20 ng/ml to about 75 ng/ml). In some aspects, the combination or composition (i) neutralizes SARS-COV-2 BA.1, SARS-COV-2 BA1.1, and/or SARS-COV-2 BA.2 pseudovirus with an EC50 of 25 ng/ml or less (e.g., an EC50 of about 1 ng/ml to about 25 ng/ml or about 2.5 ng/ml to about 25 ng/ml) and (ii) neutralizes SARS-COV-2 Delta and/or SARS-COV-2 D614G pseudovirus with an EC50 of 75 ng/ml or less ((e.g., an EC50 of about 1 ng/ml to about 75 ng/ml; about 2.5 ng/ml to about 75 ng/mL; about 10 ng/ml to about 75 ng/ml; or about 20 ng/ml to about 75 ng/ml).

In some aspects of the combinations, compositions, or methods provided herein, the combination or composition neutralizes SARS-COV-2 virus. In some aspects, the combination or composition neutralizes SARS-COV-2 D614G, SARS-COV-2 alpha, SARS-COV-2 Delta+T51I+T95I, SARS-COV-2 BA.1, SARS-COV-2 BA.1.1, SARS-COV-2 BA.2, SARS-COV-2 BA.2.12.1, and/or SARS-COV-2 BA.5 with an IC50 of 75 ng/mL or less (e.g., an IC50 of about 1 ng/mL to about 75 ng/mL, about 2.5 ng/ml to about 75 ng/mL, or about 5 ng/ml to about 75 ng/mL). In some aspects, the combination or composition neutralizes SARS-COV-2 D614G, SARS-COV-2 alpha, SARS-COV-2 Delta+T51I+T95I, SARS-COV-2 BA.1, SARS-COV-2 BA.1.1, SARS-COV-2 BA.2, SARS-COV-2 BA.2.12.1, and/or SARS-COV-2 BA.5 with an IC50 of 60 ng/ml or less (e.g., an IC50 of about 1 ng/ml to about 60 ng/mL, about 2.5 ng/ml to about 60 ng/ml, or about 5 ng/ml to about 60 ng/ml).

In some aspects of the combinations, compositions, or methods provided herein, the combination or composition neutralizes SARS-COV-2 BA.2.12.1 virus. In some aspects of the combinations, compositions, or methods provided herein, the combination or composition neutralizes SARS-COV-2 BA.2.12.1 virus with an IC50 of 25 ng/ml or less (e.g., an IC50 of about 1 ng/ml to about 25 ng/ml, about 5 ng/mL to about 25 ng/mL, about 10 ng/ml to about 25 ng/ml, or about 15 ng/ml to about 25 ng/mL. In some aspects of the combinations, compositions, or methods provided herein, the combination or composition neutralizes SARS-COV-2 BA.2.12.1 virus with an IC50 of 20 ng/mL or less (e.g., an IC50 of about 1 ng/ml to about 20 ng/ml, about 5 ng/ml to about 20 ng/ml, about 10 ng/ml to about 20 ng/mL, or about 15 ng/ml to about 20 ng/mL.

In some aspects of the combinations and methods provided herein, the first and second antibodies or antigen-binding fragments thereof are in the same composition. In some aspects of the combinations and methods provided herein, the first and second antibodies or antigen-binding fragments thereof are in separate compositions.

7.4 Antibody Production

Antibodies and antigen-binding fragments thereof that immunospecifically bind to the spike protein of SARS-COV-2 can be produced by any method known in the art for the synthesis of antibodies and antigen-binding fragments thereof, for example, by chemical synthesis or by recombinant expression techniques. The methods described herein employ, unless otherwise indicated, conventional techniques in molecular biology, microbiology, genetic analysis, recombinant DNA, organic chemistry, biochemistry, PCR, oligonucleotide synthesis and modification, nucleic acid hybridization, and related fields within the skill of the art. These techniques are described, for example, in the references cited herein and are fully explained in the literature. See, e.g., Sambrook J et al., (2001) Molecular Cloning: A Laboratory Manual, Cold Spring Harbor Laboratory Press, Cold Spring Harbor, NY; Ausubel F M et al., Current Protocols in Molecular Biology, John Wiley & Sons (1987 and annual updates); Current Protocols in Immunology, John Wiley & Sons (1987 and annual updates) Gait (ed.) (1984) Oligonucleotide Synthesis: A Practical Approach, IRL Press; Eckstein (ed.) (1991) Oligonucleotides and Analogues: A Practical Approach, IRL Press; Birren B et al., (eds.) (1999) Genome Analysis: A Laboratory Manual, Cold Spring Harbor Laboratory Press.

In some aspects, provided herein is a method of making an antibody or antigen-binding fragment which immunospecifically binds to the spike protein of SARS-COV-2 comprising culturing a cell or host cell described herein. In some aspects, provided herein is a method of making an antibody or antigen-binding fragment thereof which immunospecifically binds to the spike protein of SARS-COV-2 comprising expressing (e.g., recombinantly expressing) the antibody or antigen-binding fragment thereof using a cell or host cell described herein (e.g., a cell or a host cell comprising polynucleotides encoding an antibody or antigen-binding fragment thereof described herein). In some aspects, the cell is an isolated cell. In some aspects, the exogenous polynucleotides have been introduced into the cell. In some aspects, the method further comprises the step of separating or purifying the antibody or antigen-binding fragment obtained from the cell, host cell, or culture.

Methods for producing polyclonal antibodies are known in the art (see, for example, Chapter 11 in: Short Protocols in Molecular Biology, (2002) 5th Ed., Ausubel F M et al., eds., John Wiley and Sons, New York).

Monoclonal antibodies or antigen-binding fragments thereof can be prepared using a wide variety of techniques known in the art including the use of hybridoma, recombinant, and phage display technologies, yeast-based presentation technologies, or a combination thereof. For example, monoclonal antibodies or antigen-binding fragments thereof can be produced using hybridoma techniques including those known in the art and taught, for example, in Harlow E & Lane D, Antibodies: A Laboratory Manual, (Cold Spring Harbor Laboratory Press, 2nd ed. 1988); Hammerling G J et al., in: Monoclonal Antibodies and T-Cell Hybridomas 563 681 (Elsevier, N.Y., 1981), or as described in Kohler G & Milstein C (1975) Nature 256:495. Examples of yeast-based presentation methods that can be employed to select and generate the antibodies described herein include those disclosed in, for example, WO2009/036379A2; WO2010/105256; and WO2012/009568, each of which is herein incorporated by reference in its entirety.

In some aspects, a monoclonal antibody or antigen-binding fragment is an antibody or antigen-binding fragment produced by a clonal cell (e.g., hybridoma or host cell producing a recombinant antibody or antigen-binding fragment), wherein the antibody or antigen-binding fragment immunospecifically binds to the spike protein of SARS-COV-2 as determined, e.g., by ELISA or other antigen-binding assays known in the art. In some aspects, a monoclonal antibody or antigen-binding fragment thereof can be a human antibody or antigen-binding fragment thereof. In some aspects, a monoclonal antibody or antigen-binding fragment thereof can be a Fab fragment or a F(ab')$_2$ fragment. Monoclonal antibodies or antigen-binding fragments thereof described herein can, for example, be made by the hybridoma method as described in Kohler G & Milstein C (1975) Nature 256:495 or can, e.g., be isolated from phage libraries using the techniques as described herein, for example. Other methods for the preparation of clonal cell lines and of monoclonal antibodies and antigen-binding fragments thereof expressed thereby are well known in the art (see, for example, Chapter 11 in: Short Protocols in Molecular Biology, (2002) 5th Ed., Ausubel F M et al., supra).

Antigen-binding fragments of antibodies described herein can be generated by any technique known to those of skill in the art. For example, Fab and F(ab')$_2$ fragments described herein can be produced by proteolytic cleavage of immunoglobulin molecules, using enzymes such as papain (to produce Fab fragments) or pepsin (to produce F(ab')$_2$ fragments). A Fab fragment corresponds to one of the two identical arms of a tetrameric antibody molecule and contains the complete light chain paired with the VH and CH1 domains of the heavy chain. A F(ab')$_2$ fragment contains the two antigen-binding arms of a tetrameric antibody molecule linked by disulfide bonds in the hinge region.

Further, the antibodies or antigen-binding fragments thereof described herein can also be generated using various phage display and/or yeast-based presentation methods known in the art. In phage display methods, proteins are displayed on the surface of phage particles which carry the polynucleotide sequences encoding them. In particular, DNA sequences encoding VH and VL domains are amplified from animal cDNA libraries (e.g., human or murine cDNA libraries of affected tissues). The DNA encoding the VH and VL domains are recombined together with a scFv linker by PCR and cloned into a phagemid vector. The vector is electroporated in E. coli and the E. coli is infected with helper phage. Phage used in these methods are typically filamentous phage including fd and M13, and the VH and VL domains are usually recombinantly fused to either the phage gene III or gene VIII. Phage expressing an antibody or antigen-binding fragment thereof that binds to a particular antigen can be selected or identified with antigen, e.g., using labeled antigen or antigen bound or captured to a solid surface or bead. Examples of phage display methods that can be used to make the antibodies or fragments described herein include those disclosed in Brinkman U et al., (1995) J Immunol Methods 182:41-50; Ames R S et al., (1995) J Immunol Methods 184:177-186; Kettleborough C A et al., (1994) Eur J Immunol 24:952-958; Persic L et al., (1997) Gene 187:9-18; Burton D R & Barbas C F (1994) Advan Immunol 57:191-280; PCT Application No. PCT/GB91/001134; International Publication Nos. WO 90/02809, WO 91/10737, WO 92/01047, WO 92/18619, WO 93/11236, WO 95/15982, WO 95/20401, and WO 97/13844; and U.S. Pat. Nos. 5,698,426, 5,223,409, 5,403,484, 5,580,717, 5,427,908, 5,750,753, 5,821,047, 5,571,698, 5,427,908, 5,516,637, 5,780,225, 5,658,727, 5,733,743, and 5,969,108.

7.4.1 Polynucleotides

In some aspects, provided herein are polynucleotides comprising a nucleotide sequence encoding an antibody or antigen-binding fragment thereof described herein or a domain thereof (e.g., a variable light chain region and/or variable heavy chain region) that immunospecifically binds to the spike protein of SARS-COV-2, and vectors, e.g., vectors comprising such polynucleotides for recombinant expression in host cells (e.g., E. coli and mammalian cells).

In some aspects, provided herein are polynucleotides comprising nucleotide sequences encoding antibodies or antigen-binding fragments thereof, which immunospecifically bind to the spike protein of SARS-COV-2 and comprise an amino acid sequence as described herein, as well as antibodies or antigen-binding fragments that compete with such antibodies or antigen-binding fragments for binding to SARS-COV-2 (e.g., in a dose-dependent manner), or which bind to the same epitope as that of such antibodies or antigen-binding fragments.

Also provided herein are polynucleotides encoding an antibody or antigen-binding fragment thereof described herein that specifically binds to the spike protein of SARS-COV-2 that are optimized, e.g., by codon/RNA optimization, replacement with heterologous signal sequences, and elimination of mRNA instability elements. Methods to generate optimized nucleic acids encoding an antibody or antigen-binding fragment thereof that specifically binds to the spike protein of SARS-COV-2 or a domain thereof (e.g., heavy chain, light chain, VH domain, or VL domain) for recombinant expression by introducing codon changes (e.g., a codon change that encodes the same amino acid due to the degeneracy of the genetic code) and/or eliminating inhibitory regions in the mRNA can be carried out by adapting the optimization methods described in, e.g., U.S. Pat. Nos. 5,965,726; 6,174,666; 6,291,664; 6,414,132; and 6,794,498, accordingly.

A polynucleotide encoding an antibody or antigen-binding fragment thereof described herein or a domain thereof can be generated from nucleic acid from a suitable source (e.g., a hybridoma) using methods well known in the art (e.g., PCR and other molecular cloning methods). For example, PCR amplification using synthetic primers hybridizable to the 3' and 5' ends of a known sequence can be performed using genomic DNA obtained from hybridoma cells producing the antibody of interest. Such PCR amplification methods can be used to obtain nucleic acids comprising the sequence encoding the light chain and/or heavy chain of an antibody or antigen-binding fragment thereof. Such PCR amplification methods can be used to obtain nucleic acids comprising the sequence encoding the variable light chain region and/or the variable heavy chain region of an antibody or antigen-binding fragment thereof. The amplified nucleic acids can be cloned into vectors for expression in host cells and for further cloning, for example, to generate chimeric and humanized antibodies or antigen-binding fragments thereof.

Polynucleotides provided herein can be, e.g., in the form of RNA or in the form of DNA. DNA includes cDNA, genomic DNA, and synthetic DNA, and DNA can be double-stranded or single-stranded. If single stranded, DNA can be the coding strand or non-coding (anti-sense) strand. In some aspects, the polynucleotide is a cDNA or a DNA lacking one more endogenous introns. In some aspects, a polynucleotide is a non-naturally occurring polynucleotide. In some aspects, a polynucleotide is recombinantly produced. In some aspects, the polynucleotides are isolated. In some aspects, the polynucleotides are substantially pure. In some aspects, a polynucleotide is purified from natural components.

7.4.2 Cells and Vectors

In some aspects, provided herein are vectors (e.g., expression vectors) comprising polynucleotides comprising nucleotide sequences encoding antibodies and antigen-binding fragments thereof or a domain thereof that bind to the spike protein of SARS-COV-2 for recombinant expression in host cells, e.g., in mammalian cells. Also provided herein are cells, e.g. host cells, comprising such vectors for recombinantly expressing antibodies or antigen-binding fragments thereof described herein (e.g., human antibodies or antigen-binding fragments thereof) that bind to the spike protein of SARS-COV-2. In a particular aspect, provided herein are methods for producing an antibody or antigen-binding fragments thereof described herein, comprising expressing such antibody or antigen-binding fragment thereof in a host cell.

In some aspects, recombinant expression of an antibody or antigen-binding fragment thereof or domain thereof described herein (e.g., a heavy or light chain described herein) that specifically binds to the spike protein of SARS-COV-2 involves construction of an expression vector containing a polynucleotide that encodes the antibody or antigen-binding fragment thereof or domain thereof. Once a polynucleotide encoding an antibody or antigen-binding fragment thereof or domain thereof (e.g., heavy or light chain variable domain) described herein has been obtained, the vector for the production of the antibody or antigen-binding fragment thereof can be produced by recombinant DNA technology using techniques well known in the art. Thus, methods for preparing a protein by expressing a polynucleotide containing an antibody or antigen-binding fragment thereof or domain thereof (e.g., light chain or heavy chain) encoding nucleotide sequence are described herein. Methods which are well known to those skilled in the art can be used to construct expression vectors containing antibody or antigen-binding fragment thereof or domain thereof (e.g., light chain or heavy chain) coding sequences and appropriate transcriptional and translational control signals. These methods include, for example, in vitro recombinant DNA techniques, synthetic techniques, and in vivo genetic recombination. Also provided are replicable vectors comprising a nucleotide sequence encoding an antibody or antigen-binding fragment thereof described herein, a heavy or light chain, a heavy or light chain variable domain, or a heavy or light chain CDR, operably linked to a promoter. Such vectors can, for example, include the nucleotide sequence encoding the constant region of the antibody or antigen-binding fragment thereof (see, e.g., International Publication Nos. WO 86/05807 and WO 89/01036; and U.S. Pat. No. 5,122,464), and variable domains of the antibody or antigen-binding fragment thereof can be cloned into such a vector for expression of the entire heavy, the entire light chain, or both the entire heavy and light chains.

An expression vector can be transferred to a cell (e.g., host cell) by conventional techniques and the resulting cells can then be cultured by conventional techniques to produce an antibody or antigen-binding fragment thereof described herein (e.g., an antibody or antigen-binding fragment thereof comprising the six CDRs, the VH, the VL, the VH and the VL, the heavy chain, the light chain, or the heavy and the light chain of an antibody provided in Table 1) or a domain thereof (e.g., the VH, the VL, the VH and the VL, the heavy chain, or the light chain of an antibody provided in Table 1). Thus, provided herein are host cells containing a polynucleotide encoding an antibody or antigen-binding fragment thereof described herein (e.g., an antibody or antigen-binding fragment thereof comprising the six CDRs, the VH, the VL, the VH and the VL, the heavy chain, the light chain, or the heavy and the light chain of antibody provided in Table 1) or a domain thereof (e.g., the VH, the VL, the VH and the VL, the heavy chain, or the light chain of antibody provided in Table 1), operably linked to a promoter for expression of such sequences in the host cell. In some aspects, for the expression of double-chained antibodies or antigen-binding fragments thereof, vectors encoding both the heavy and light chains, individually, can be co-expressed in the host cell for expression of the entire immunoglobulin, as detailed below. In some aspects, a host cell contains a vector comprising a polynucleotide encoding both the heavy chain and light chain of an antibody described herein (e.g., the heavy and the light chain of antibody provided in Table 1), or a domain thereof (e.g., the VH and the VL of antibody provided in Table 1). In some aspects, a host cell contains two different vectors, a first vector comprising a polynucleotide encoding a heavy chain or a heavy chain variable region of an antibody or antigen-binding fragment thereof described herein, and a second vector comprising a polynucleotide encoding a light chain or a light chain variable region of an antibody described herein (e.g., an antibody comprising the six CDRs of an antibody provided in Table 1), or a domain thereof. In some aspects, a first host cell comprises a first vector comprising a polynucleotide encoding a heavy chain or a heavy chain variable region of an antibody or antigen-binding fragment thereof described herein, and a second host cell comprises a second vector comprising a polynucleotide encoding a light chain or a light chain variable region of an antibody or antigen-binding fragment thereof described herein (e.g., an antibody or antigen-binding fragment thereof comprising the six CDRs of an antibody provided in Table 1). In some aspects, a heavy chain/heavy chain variable region expressed by a first cell associated with a light chain/light chain variable region of a second cell to form an antibody or antigen-binding fragment thereof described herein (e.g., antibody or antigen-binding fragment thereof comprising the six CDRs of an antibody provided in Table 1). In some aspects, provided herein is a population of host cells comprising such first host cell and such second host cell.

In some aspects, provided herein is a population of vectors comprising a first vector comprising a polynucleotide encoding a light chain/light chain variable region of an antibody or antigen-binding fragment thereof described herein, and a second vector comprising a polynucleotide encoding a heavy chain/heavy chain variable region of an antibody or antigen-binding fragment thereof described herein (e.g., antibody or antigen-binding fragment thereof comprising the CDRs of an antibody provided in Table 1). Alternatively, a single vector can be used which encodes, and is capable of expressing, both heavy and light chain polypeptides.

A variety of host-expression vector systems can be utilized to express antibodies and antigen-binding fragments thereof described herein (e.g., an antibody or antigen-binding fragment thereof comprising the CDRs of an antibody provided in Table 1) (see, e.g., U.S. Pat. No. 5,807,715). Such host-expression systems represent vehicles by which the coding sequences of interest can be produced and subsequently purified, but also represent cells which can, when transformed or transfected with the appropriate nucleotide coding sequences, express an antibody or antigen-binding fragment thereof described herein in situ. These include but are not limited to microorganisms such as bacteria (e.g., *E. coli* and *B. subtilis*) transformed with recombinant bacteriophage DNA, plasmid DNA or cosmid DNA expression vectors containing antibody coding sequences; yeast (e.g., *Saccharomyces Pichia*) transformed with recombinant yeast expression vectors containing antibody coding sequences; insect cell systems infected with recombinant virus expression vectors (e.g., baculovirus) containing antibody coding sequences; plant cell systems (e.g., green algae such as *Chlamydomonas reinhardtii*) infected with recombinant virus expression vectors (e.g., cauliflower mosaic virus, CaMV; tobacco mosaic virus, TMV) or transformed with recombinant plasmid expression vectors (e.g., Ti plasmid) containing antibody coding sequences; or mammalian cell systems (e.g., COS (e.g., COS1 or COS), CHO, BHK, MDCK, HEK 293, NS0, PER.C6, VERO, CRL7O3O, HsS78Bst, HeLa, and NIH 3T3, HEK-293T, HepG2, SP210, R1.1, B-W, L-M, BSC1, BSC40, YB/20 and BMT10 cells) harboring recombinant expression constructs containing promoters derived from the genome of mammalian cells (e.g., metallothionein promoter) or from mammalian viruses (e.g., the adenovirus late promoter; the vaccinia virus 7.5K promoter). In some aspects, cells for expressing antibodies and antigen-binding fragments thereof described herein (e.g., an antibody or antigen-binding fragment thereof comprising the CDRs of an antibody provided in Table 1) are CHO cells, for example CHO cells from the CHO GS System™ (Lonza). In some aspects, cells for expressing antibodies described herein are human cells, e.g., human cell lines. In some aspects, a mammalian expression vector is pOptiVEC™ or pcDNA3.3. In some aspects, bacterial cells such as *Escherichia coli*, or eukaryotic cells (e.g., mammalian cells), especially for the expression of whole recombinant antibody molecule, are used for the expression of a recombinant antibody molecule. For example, mammalian cells such as Chinese hamster ovary (CHO) cells in conjunction with a vector such as the major intermediate early gene promoter element from human cytomegalovirus is an effective expression system for antibodies (Foecking M K & Hofstetter H (1986) Gene 45:101-105; and Cockett M I et al., (1990) Biotechnology 8:662-667). In some aspects, antibodies or antigen-binding fragments thereof described herein are produced by CHO cells or NS0 cells.

In addition, a host cell strain can be chosen which modulates the expression of the inserted sequences, or modifies and processes the gene product in the specific fashion desired. Such modifications (e.g., glycosylation) and processing (e.g., cleavage) of protein products can contribute to the function of the protein. To this end, eukaryotic host cells which possess the cellular machinery for proper processing of the primary transcript, glycosylation, and phosphorylation of the gene product can be used. Such mammalian host cells include but are not limited to CHO, VERO, BHK, Hela, MDCK, HEK 293, NIH 3T3, W138, BT483, Hs578T, HTB2, BT20 and T47D, NS0 (a murine myeloma cell line that does not endogenously produce any immunoglobulin chains), CRL7030, COS (e.g., COS1 or COS), PER.C6, VERO, HsS78Bst, HEK-293T, HepG2, SP210, R1.1, B-W, L-M, BSC1, BSC40, YB/20, BMT10 and HsS78Bst cells. In some aspects, antibodies or antigen-binding fragments thereof described herein that specifically bind to the spike protein of SARS-COV-2 are produced in mammalian cells, such as CHO cells.

Once an antibody or antigen-binding fragment thereof described herein has been produced by recombinant expression, it can be purified by any method known in the art for purification of an immunoglobulin molecule, for example, by chromatography (e.g., ion exchange, affinity, particularly by affinity for the specific antigen after Protein A, and size exclusion chromatography), centrifugation, differential solubility, or by any other standard technique for the purification of proteins. Further, the antibodies or antigen-binding fragments thereof described herein can be fused to heterologous polypeptide sequences described herein or otherwise known in the art to facilitate purification.

In some aspects, an antibody or antigen-binding fragment thereof described herein is isolated or purified. Generally, an isolated antibody or antigen-binding fragment thereof is one that is substantially free of other antibodies or antigen-binding fragments thereof with different antigenic specificities than the isolated antibody or antigen-binding fragment thereof. For example, in some aspects, a preparation of an antibody or antigen-binding fragment thereof described herein is substantially free of cellular material and/or chemical precursors.

7.5 Pharmaceutical Compositions

Provided herein are compositions comprising an antibody or antigen-binding fragment thereof described herein or a combination of antibodies or antigen-binding fragments thereof described herein having the desired degree of purity in a physiologically acceptable carrier, excipient or stabilizer (Remington's Pharmaceutical Sciences (1990) Mack Publishing Co., Easton, PA). Acceptable carriers, excipients, or stabilizers are nontoxic to recipients at the dosages and concentrations employed.

In some aspects, compositions comprising at least one antibody or antigen-binding fragment thereof that binds to the spike protein of SARS-COV-2 are provided in formulations with a pharmaceutically acceptable carrier (see, e.g., Gennaro, Remington: The Science and Practice of Pharmacy with Facts and Comparisons: Drugfacts Plus, 20th ed. (2003); Ansel et al., Pharmaceutical Dosage Forms and Drug Delivery Systems, 7th ed., Lippencott Williams and Wilkins (2004); Kibbe et al., Handbook of Pharmaceutical Excipients, 3rd ed., Pharmaceutical Press (2000). In some aspects, a pharmaceutical composition described herein comprises two antibodies or antigen-binding fragments that bind to the spike protein of SARS-COV-2, e.g., two antibodies or antigen-binding fragments thereof that bind to different epitopes of the spike protein of SARS-COV-2. In some aspects, a pharmaceutical composition described herein comprises two antibodies or antigen-binding fragments that bind to different epitopes of the receptor binding domain (RBD) of the spike protein of SARS-COV-2. In some aspects, a pharmaceutical composition described herein comprises two antibodies or antigen-binding fragments that bind to non-overlapping epitopes of the RBD of the spike protein of SARS-COV-2. In some aspects, a pharmaceutical composition described herein comprises two antibodies or antigen-binding fragments that can bind to SARS-COV-2 concurrently.

Pharmaceutical compositions described herein can be useful in neutralizing SARS-CoV-2.

Pharmaceutical compositions described herein can be useful in preventing and/or treating a SARS-COV-2 infection in a patient or one or more conditions or complications related to SARS-COV-2 infection in a patient. In some aspects, the patient may have been exposed to SARS-COV-2. Examples of SARS-COV-2 infection or one or more conditions or complications related to SARS-COV-2 infection that can be prevented and/or treated in accordance with the methods described herein include, but are not limited to, fever, cough, tiredness, shortness of breath, difficulty breathing, muscle aches, chills, muscle aches, chills, sore throat, loss of taste or smell, headache, chest pain, nausea, vomiting, and diarrhea. Additional examples of one or more conditions or complications related to SARS-COV-2 infection in a patient that can be treated in accordance with the methods described herein include, but are not limited to, cardiac complications, respiratory complications, diabetes complications, organ failure, and blood clots. In some aspects, a pharmaceutical composition provided herein can be useful in treating or preventing a SARS-COV-2 infection or one or more conditions or complications related to SARS-CoV-2 infection described herein in a patient with one or more risk factors for SARS-COV-2 infection. In some aspects, risk factors include but are not limited to: being age 65 or older, being immunocompromised, and suffering from one or more of chronic lung disease, asthma, or diabetes.

The pharmaceutical compositions described herein are, in some aspects, for use as a medicament. The pharmaceutical compositions described herein are, in some aspects, for use as a diagnostic, e.g., to detect the presence of SARS-COV-2 in a sample obtained from a patient (e.g., a human patient).

Compositions provided herein can be formulated for intramuscular (IM) administration, e.g., IM injection.

The compositions provided herein to be used for in vivo administration can be sterile. This is readily accomplished by filtration through, e.g., sterile filtration membranes.

7.6 Uses and Methods

7.6.1 Therapeutic Uses and Methods

In some aspects, provided herein are methods of preventing and/or treating SARS-CoV-2 infection in a patient or one or more conditions or complications related to SARS-COV-2 infection in a patient. The method of treating or preventing a SARS-COV-2 infection can comprise administering one or more antibodies or antigen-binding fragments thereof that bind to the spike protein of SARS-COV-2 to a patient (e.g., a human patient) in need thereof.

In some aspects, provided herein are methods of reducing the likelihood of infection in a subject at risk of contracting SARS-COV-2 infection. The method of reducing the likelihood of infection in a subject at risk of contracting SARS-COV-2 infection can comprise administering one or more antibodies or antigen-binding fragments thereof that bind to the spike protein of SARS-CoV-2

In some aspects, provided herein are methods of preventing and/or treating a SARS-CoV-2 infection or one or more conditions or complications related to SARS-COV-2 infection. Conditions or complications related to SARS-COV-2 infection include, but are not limited to, fever, cough, tiredness, shortness of breath, difficulty breathing, muscle aches, chills, muscle aches, chills, sore throat, loss of taste or smell, headache, chest pain, nausea, vomiting, and diarrhea. In some aspects, provided herein are methods of preventing and/or treating a SARS-COV-2 infection in a patient with one or more risk factors for SARS-COV-2 infection. In some aspects, risk factors include, but are not limited to, being age 65 or older, being immunocompromised, suffering from one or more of chronic lung disease, asthma, or diabetes, and/or being immunocompromised. In some aspects, such methods comprise administering an antibody or antigen-binding fragment thereof that binds to the spike protein of SARS-COV-2 provided herein or a pharmaceutical composition comprising an antibody or antigen-binding fragment thereof that binds to the spike protein of SARS-COV-2 herein to a patient (e.g., a human patient) in need thereof.

In some aspects, such methods comprise administering two antibodies or antigen-binding fragments thereof that bind to the spike protein of SARS-COV-2 provided herein or a pharmaceutical composition comprising two antibodies or antigen-binding fragments thereof that bind to the spike protein of SARS-COV-2 herein to a patient (e.g., a human patient) in need thereof.

In some aspects, such methods comprise administering a composition comprising one or more antibodies or antigen-binding fragments thereof that binds to the spike protein of SARS-CoV-2 herein to a patient (e.g., a human patient) in need thereof. In some aspects, a patient suffers from risk factors including but not limited to: being age 65 or older, being immunocompromised, and suffering from one or more of chronic lung disease, asthma, or diabetes.

In some aspects, one or more antibodies or antigen-binding fragments thereof that bind to the spike protein of SARS-COV-2, or pharmaceutical composition, is administered to a subject (e.g., a human subject) at risk of contracting SARS-COV-2.

In some aspects, one or more antibodies or antigen-binding fragments thereof that bind to the spike protein of SARS-COV-2 are administered intramuscularly, e.g., via intramuscular injection.

Usually, the patient is a human but non-human mammals including transgenic mammals can also be treated.

In some aspects, the present invention relates to an antibody or antigen-binding fragment thereof, a combination of antibodies or antigen-binding fragments thereof, or pharmaceutical composition provided herein for use as a medicament. In some aspects, the present invention relates to an antibody or antigen-binding fragment thereof, a combination of antibodies or antigen-binding fragments thereof, or pharmaceutical composition provided herein, for use in a method for the prevention or treatment of a SARS-COV-2 infection. In some aspects, the present invention relates to an antibody or antigen-binding fragment thereof, a combination of antibodies or antigen-binding fragments thereof, or pharmaceutical composition provided herein, for use in a method for the treatment of a SARS-COV-2 infection in a subject, comprising administering to the subject an effective amount of an antibody or antigen-binding fragment thereof, a, a combination of antibodies or antigen-binding fragments thereof, or pharmaceutical composition provided herein.

The amount of an antibody or antigen-binding fragment thereof or composition which will be effective in the treatment of a condition will depend on the nature of the disease.

The precise dose to be employed in a composition will also depend on the route of administration, and the seriousness of the disease.

7.6.2 Detection & Diagnostic Uses

An antibody or antigen-binding fragment thereof that binds to the spike protein of SARS-COV-2 described herein (see, e.g., Section 7.2) can be used to assay SARS-COV-2 protein levels or levels of SARS-COV-2 in a biological sample using classical methods known to those of skill in the art, including immunoassays, such as the enzyme linked immunosorbent assay (ELISA), immunoprecipitation, or Western blotting. Suitable antibody assay labels are known in the art and include enzyme labels, such as, glucose oxidase; radioisotopes, such as iodine ($^{125}$I, $^{121}$I), carbon ($^{14}$C), sulfur ($^{35}$S), tritium ($^{3}$H), indium ($^{121}$In), and technetium ($^{99}$Tc); luminescent labels, such as luminol; and fluorescent labels, such as fluorescein and rhodamine, and biotin. Such labels can be used to label an antibody or antigen-binding fragment thereof described herein. Alternatively, a second antibody or antigen-binding fragment thereof that recognizes an antibody or antigen-binding fragment thereof that binds to the spike protein of SARS-COV-2 described herein can be labeled and used in combination with an antibody or antigen-binding fragment thereof that binds to the spike protein of SARS-COV-2 to detect SARS-COV-2 protein levels.

Assaying for the expression level of SARS-COV-2 protein is intended to include qualitatively or quantitatively measuring or estimating the level of SARS-COV-2 protein in a first biological sample either directly (e.g., by determining or estimating absolute protein level) or relatively (e.g., by comparing to the disease associated protein level in a second biological sample). SARS-COV-2 protein expression level in the first biological sample can be measured or estimated and compared to a standard SARS-COV-2 protein level, the standard being taken from a second biological sample obtained from an individual not having the disorder or being determined by averaging levels from a population of individuals not having the disorder.

As used herein, the term "biological sample" refers to any biological sample obtained from a subject, cell line, tissue, or other source of cells potentially expressing SARS-COV-2. Methods for obtaining tissue biopsies and body fluids from animals (e.g., humans) are well known in the art.

Antibodies or antigen-binding fragments thereof that bind to the spike protein of SARS-CoV-2 described herein can carry a detectable or functional label. When fluorescence labels are used, currently available microscopy and fluorescence-activated cell sorter analysis (FACS) or combination of both methods procedures known in the art may be utilized to identify and to quantitate the specific binding members. Antibodies or antigen-binding fragments thereof that bind to the spike protein of SARS-COV-2 described herein can carry a fluorescence label. Exemplary fluorescence labels include, for example, reactive and conjugated probes, e.g., Aminocoumarin, Fluorescein and Texas red, Alexa Fluor dyes, Cy dyes and DyLight dyes. An antibody or antigen-binding fragment thereof that specifically binds to the spike protein of SARS-CoV-2 can carry a radioactive label, such as the isotopes $^{3}$H, $^{14}$C, $^{32}$P, $^{35}$S, $^{36}$Cl, $^{51}$Cr, $^{57}$Co, $^{58}$Co, $^{59}$Fe, $^{67}$Cu, $^{90}$Y, $^{99}$Tc, $^{111}$In, $^{117}$Lu, $^{121}$I, $^{124}$I, $^{125}$I, $^{131}$I, $^{198}$Au, $^{211}$At, $^{213}$Bi, $^{225}$Ac and $^{186}$Re. When radioactive labels are used, currently available counting procedures known in the art can be utilized to identify and quantitate the specific binding of an antibodies or antigen-binding fragment thereof that binds to the spike protein of SARS-COV-2. In the instance where the label is an enzyme, detection can be accomplished by any of the presently utilized colorimetric, spectrophotometric, fluorospectrophotometric, amperometric or gasometric techniques as known in the art. This can be achieved by contacting a sample or a control sample with an antibody or antigen-binding fragment thereof that binds to the spike protein of SARS-COV-2 under conditions that allow for the formation of a complex between the antibody or antigen-binding fragment thereof and the spike protein of SARS-COV-2. Any complexes formed between the antibodies or antigen-binding fragments and the spike proteins of SARS-COV-2 can be detected and compared in the sample (and optionally a control). In light of the specific binding of the antibodies or antigen-binding fragments thereof that bind to the spike protein of SARS-COV-2 described herein for SARS-COV-2, the antibodies or antigen-binding fragments thereof can be used to specifically detect SARS-COV-2 (e.g., in a subject).

Also included herein is an assay system that can be prepared in the form of a test kit for the quantitative analysis of the extent of the presence of, for instance, SARS-COV-2 spike proteins. The system or test kit may comprise a labeled component, e.g., a labeled antibody or antigen-binding fragment, and one or more additional immunochemical reagents. See, e.g., Section 7.7 below for more on kits.

In some aspects, methods for in vitro detecting SARS-COV-2 spike proteins in a sample, comprise contacting the sample with an antibody or antigen-binding fragment thereof, are provided herein. In some aspects, provided herein is the use of an antibody or antigen-binding fragment thereof provided herein, for in vitro detecting SARS-COV-2 spike proteins in a sample. In one aspect, provided herein is an antibody or antigen-binding fragment thereof or pharmaceutical composition provided herein for use in the detection of SARS-COV-2 spike proteins in a subject or a sample obtained from a subject. In one aspect, provided herein is an antibody or antigen-binding fragment thereof or pharmaceutical composition provided herein for use as a diagnostic. In some aspects, the antibody comprises a detectable label. In some aspects, the subject is a human.

7.7 Kits

Provided herein are kits comprising one or more antibodies or antigen-binding fragments thereof described herein. In some aspects, provided herein is a pharmaceutical pack or kit comprising one or more containers filled with one or more of the ingredients of the pharmaceutical compositions described herein, such as one or more antibodies or antigen-binding fragments thereof provided herein. Optionally associated with such container(s) can be a notice in the form prescribed by a governmental agency regulating the manufacture, use, or sale of pharmaceuticals or biological products, which notice reflects approval by the agency of manufacture, use or sale for human administration.

Also provided herein are kits that can be used in diagnostic methods. In some aspects, a kit comprises an antibody or antigen-binding fragment thereof described herein, e.g., a purified antibody or antigen-binding fragment thereof, in one or more containers. In some aspects, kits described herein contain a substantially isolated SARS-COV-2 spike protein antigen that can be used as a control. In some aspects, the kits described herein further comprise a control antibody or antigen-binding fragment thereof that does not react with a SARS-COV-2 spike protein antigen. In some aspects, kits described herein contain one or more elements for detecting the binding of an antibody or antigen-binding fragment thereof to a SARS-COV-2 spike protein antigen (e.g., the antibody or antigen-binding fragment thereof can be conjugated to a detectable substrate such as a fluorescent compound, an enzymatic substrate, a radioactive compound or a luminescent compound, or a second antibody or antigen-binding fragment thereof which recognizes the first antibody or antigen-binding fragment thereof can be conjugated to a detectable substrate). In some aspects, a kit provided herein can include a recombinantly produced or chemically synthesized SARS-COV-2 spike protein antigen. The SARS-COV-2 spike protein antigen provided in the kit can also be attached to a solid support. In some aspects, the detecting means of the above-described kit includes a solid support to which a SARS-COV-2 spike protein antigen is attached. Such a kit can also include a non-attached reporter-labeled anti-human antibody or antigen-binding fragment thereof or anti-mouse/rat antibody or antigen-binding fragment thereof. In this aspect, binding of the antibody or antigen-binding fragment thereof that binds to the spike protein of SARS-COV-2 to the SARS-COV-2 spike protein antigen can be detected by binding of the reporter-labeled antibody or antigen-binding fragment thereof.

The following examples are offered by way of illustration and not by way of limitation.

8. EXAMPLES

The examples in this Examples Section (i.e., Section 8) are offered by way of illustration, and not by way of limitation.

8.1 Example 1: Antibody and Protein Production

Antibody VH and VL DNA fragments were cloned into a CMV driven mammalian expression plasmid containing human IgG1 Fc with the YTE serum half-life extending and TM effector function ablating modifications. The plasmids were sequence verified by Sanger sequencing. Antibodies were expressed transiently in HEK293F cells using 293Fectin™ (Gibco® #12347019) according to the manufacturer's instructions and grown in FreeStyle™ medium (Gibco® #12338018) for 6 days. At 6 days, the media was clarified by centrifugation, filtered, and purified using MabSelect SuRe™ resin (Cytiva #11-0034-94). Antibody purity was determined using HP-SEC as described below, and the correct mass of antibodies was verified by mass spectrometry. Sequences of exemplary antibodies are provided in Table 1.

SARS-COV-2 RBD (residues 334-526) was cloned with an N-terminal CD33 leader sequence and C-terminal GSSG linker, AviTag™, GSSG linker, and 8×HisTag, expressed in FreeStyle™ 293 cells (Thermo Fisher), and isolated by affinity chromatography using a HisTrap' column (GE Healthcare), followed by size exclusion chromatography with a Superdex™ 200 column (GE Healthcare). Purified proteins were analyzed by SDS-PAGE to ensure purity and appropriate molecular weights. Endotoxin levels were measured using Charles River Endosafe® cartridge (Charles River) and found to be below 1EU/mg.

8.2 Example 2: HP-SEC

Antibody samples were analyzed using HP-SEC to determine levels of aggregate, monomer, and fragment. Samples (100 µg in PBS buffer) were injected on an Agilent 1200 series high-performance liquid chromatography (HPLC) instrument and separated using a TSKgel® G3000SWxl size exclusion column (Tosoh Bioscience® #08541). The mobile phase was 100 mM sodium phosphate (pH 6.8), and sample flow rate was 1 mL/min. Ultraviolet (UV) detection was performed at 280 nm. Results are shown in Table 2.

8.3 Example 3: Baclovirus ELISA

Baculovirus particle (BVP) ELISA was performed essentially as previously described (Hotzel I, Theil F P, Bernstein L J, Prabhu S, Deng R, Quintana L, et al. A strategy for risk mitigation of antibodies with fast clearance. MAbs 2012; 4:753-60), with some modifications. Briefly, a 1% baculovirus (BV) suspension in 50 mM sodium carbonate buffer (pH 9.6) was used to coat half of 96-well ELISA plates (Nunc™ Maxisorp™) overnight at 4° C. while the second half of the ELISA plates was left uncoated to test the antibodies for plate binding. All following steps were performed at room temperature. The next day, the wells were washed with Dulbecco's PBS (DPBS), and then incubated with blocking buffer (Dulbecco's PBS with 0.5% BSA) for 1h, followed by three washes with DPBS. Next, antibodies at 100 nM and 10 nM in blocking buffer were added to both the BVP coated and uncoated wells and incubated for 1h, followed by three washes with DPBS. Next, goat anti-human IgG-HRP secondary antibodies (1:5000 dilution, Sigma-Aldrich® #A0170) in blocking buffer were added to the wells and incubated for 1h, followed by three washes with DPBS. Finally, TMB substrate (SeraCare #5120-0075) was added to each well and incubated for 2 minutes. The reactions were stopped by adding an equal volume of 0.2M sulfuric acid to each well. The absorbance was read at 450 nm. BVP score and plate binding was determined by normalizing absorbance to control wells with no test antibody. Results are shown in Table 2.

8.4 Example 4: HEK Binding Assay

Non-specific HEK cell binding was measured using a Mirrorball® Fluorescence Cytometer (SPT Labtech). First, 10 µL of Alexa Fluor™ 647 goat anti-human IgG (H+L) antibody (Invitrogen® #A-21445) diluted to 16 nM in Mirrorball® buffer (Hanks' Balanced Salt solution with 0.5% BSA) was added to wells of a 384-well, clear bottom plate. Next, 10 µL of test antibody serially diluted in Mirrorball® buffer was added to the wells. Finally, 20 µL of HEK293f cells diluted to 250,000 cells/mL in Mirrorball® buffer was added to the wells. The plate was incubated at room temperature for 2h, and the fluorescence of each well was measured using the Mirrorball® Fluorescence Cytometer. Results are shown in Table 2.

8.5 Example 5: AC-SINS

AC-SINS was performed essentially as previously described (Geng S B, Wu J, Alam M E, Schultz J S, Dickinson C D, Seminer C R, et al. Facile Preparation of Stable Antibody-Gold Conjugates and Application to Affinity-Capture Self-Interaction Nanoparticle Spectroscopy. Bioconjug Chem 2016; 27:2287-300), with some modifications. Briefly, both whole goat IgG (Jackson ImmunoResearch #005-000-003) (non-capture) and polyclonal goat anti-human IgG Fc (Jackson ImmunoResearch #109-005-098) (capture) antibodies were dialyzed into 20 mM potassium acetate (pH 4.3) buffer, and then conjugated to 20 nm gold nanoparticles (Innova Biosciences® #3201-0100) at a 3:2 ratio of capture:non-capture antibodies. Antibodies were incubated with gold nanoparticles at a 9:1 ratio for 1 h at room temperature, and then blocked by addition of 0.1 µM poly-(ethylene glycol) methyl ether thiol (2000 MW, Sigma-Aldrich® #729140) for 1 h. The coated and blocked nanoparticles were concentrated 12.5-fold by centrifugation, and stored at 4° C. To assess self-association, 5 µL of nanoparticles were mixed with 45 µL of purified antibody at 50 µg/mL in PBS, pH 7.2 or a buffer in a 384-well plate. Nanoparticles were mixed with buffer only (no antibody) as a control. Absorbance was measured on a SPECTROstar® Nano UV/vis plate reader from 490 to 700 nm. The wavelength of peak absorbance was calculated in the MARS data analysis software and used to determine the wavelength shift compared to the nanoparticle only control. Results are shown in Table 2.

8.6 Example 6: Accelerated Stability Heat Stress Study

For accelerated stability testing, samples were diluted to 1 mg/mL in PBS (pH 7.2) and incubated for 2 weeks at either 4° C. or 45° C. Samples from days 0, 7, and 14 were then analyzed by HP-SEC peptide mapping and DELFIA® binding assay as described herein. The monomer, aggregate, and fragment percentages for each sample were calculated based on curve integration using the HPLC ChemStation software (Agilent). The change in monomer, aggregate, and fragment content was calculated from the difference between each sample incubated at 45° C. versus 4° C. Results are shown in Table 3.

8.7 Example 7: Photostability Assay

For photostability testing, antibodies were formulated at 2.5 mg/mL in PBS (pH 7.2), filled into 1 cc Schott glass vials, stoppered/sealed, and placed into an ICH compliant photostability chamber (Caron Model 6545-2). Samples were exposed to cool white light at 3000 lux over the course of 1 week, for a total exposure of approximately 500,000 lux hours. Samples were analyzed by HP-SEC and peptide mapping as described in those sections. Results are shown in Table 3.

8.8 Example 8: Serum Stability Assay

Antibodies were diluted to 0.5 mg/ml into human serum (Sigma®) and incubated at 37° C. for 14 days. Day 0 control samples were taken and frozen at −80° C. until testing. At 14 days, the incubated samples were also frozen at −80° C. until testing could be carried out on all samples. Binding of stressed and un-stressed sample was assessed by DELFIA® binding assay against RBD as described herein. Results are shown in Table 3.

8.9 Example 9: DSC

Thermal melting transitions were determined by using Microcal VP differential scanning calorimetry system (Malvern, PA). Monoclonal antibody solutions were diluted to 1 mg/ml in the final buffer, and change in the heat capacity (Cp) was measured as the samples were heated from 20°-95° C. using a temperature ramp of 90° C./h. Normalized heat capacity data was obtained after subtracting the buffer blank and normalizing to the concentration of the monoclonal antibody. Data was analyzed using Microcal LLC origin software to calculate the thermal melting transitions associated with the unfolding of the distinct domains. Results are shown in Table 2.

8.10 Example 10: Viscosity

Concentrated antibody solutions were diluted in a formulation to 100 mg/mL. Each sample was subjected to rotational shear stresses of 1000 s-1 at 23° C. on an MCR301 rheometer utilizing the CP20-1 cone and plate system (Anton Parr, Part 3274). 5 measurements were taken each minute over the course of data collection and averaged to provide viscosity values. Results are shown in Table 2.

8.11 Example 11: DLS

Antibody panel was reformulated into an alternative buffer. Z-average apparent diffusion coefficient measurements were carried out using Dynapro™ plate reader (Wyatt technology, Santabarbara, CA) equipped with a laser source 833 nm wavelength. The scattered light was collected in a back scattering mode at an angle 153°. For each antibody, 40 ul at respective concentrations 2, 4, 6, 8, and 10 mg/ml was distributed in triplicate into a low volume 384-well plate (Corning, Tewskbury, MA), covered with a paraffin film, and spun at 3000 RPM for 1 minute to remove any air bubbles. The sample chamber was equilibrated for 1h prior to measurements, and data were collected for 10 acquisitions of 10 seconds and averaged for each well. The Z-average translational diffusion coefficient was determined from cumulant analysis of the autocorrelation function and modelled as:

$$D=D0(1+kDC) \text{ to obtain "} kD \text{" diffusion virial coefficient (interaction parameter).}$$

Results are shown in Table 2.

8.12 Example 12: Peptide Mapping

Reduced tryptic peptide mapping was performed based on manufacturing recommendations. Briefly, 100 µg of antibody sample was denatured and reduced in a guanidine hydrochloride buffer with dithiothreitol (DTT, 20291, Thermo Scientific®) at 37° C. for 30 minutes. Then the sample was alkylated with iodoacetamide (IAM, 786-078, G-Biosciences®) for 30 minutes in the dark at room temperature. Subsequently, the sample mixture was dialyzed into 6M Urea, and then diluted with Tris pH 7.5 buffer to allow for trypsin digestion. Trypsin (V5280, Promega®) was added at 1:20 protease: protein ratio and incubated at 37° C. for 4 h. The reaction was quenched by adding trifluoroacetic acid (TFA, T6508, Sigma-Aldrich®). Digests of the sample were analyzed using a Fusion Orbitrap™ mass spectrometer (Thermo Fisher Scientific®, Waltham, MA, USA) connected with an AQUITY™ ultra-performance liquid chromatograph (UPLC; Waters™). An AQUITY™ UPLC™ BEH300 C18 column (1.7 µm, 2.1×150 mm; Waters™) was used for separation. The column temperature was held at 55° C. Mobile phase A was 0.02% TFA in water, and mobile phase B was 0.02% TFA in acetonitrile. Digested peptides were eluted from the column with a 0-35% linear gradient and the chromatographic profile was monitored by using UV absorbance at 220 nm and MS. MS data were processed by Biopharma Finder™ 3.0 (Thermo Fisher Scientific®). Results are shown in Table 3.

8.13 Example 13: DELFIA Binding Assay

A DELFIA® (PerkinElmer®) method was used to measure antibody binding to the receptor binding domain (RBD)

of the SARS-COV-2 spike protein before and after heat stress. Nunc™ MaxiSorp™ 96-well plates are coated overnight with purified RBD Omicron protein. Assay plates were then washed with 1×TBS-Tween® buffer (PerkinElmer®) and blocked with bovine serum albumin (Sigma®). Antibody samples were serially diluted and added to the plate for 1h. Bound antibody was detected with DELFIA® Europium-N1 anti-human IgG (PerkinElmer®), and the signal quantified via time-resolved fluorescence on an Envision™ plate reader (PerkinElmer®). IC50 was calculated with a four-parameter logistic (4PL) curve using GraphPad Prism™ v 8.0. IC50 of the stressed sample was compared to a reference sample to generate a percent relative potency.

8.14 Example 14: FcRn Affinity Chromatography

Approximately 40 ug/40 uL of antibody was loaded onto a 1 ml huFcRN coupled sepharose affinity column using an Agilent HPLC, followed by a 3CV linear gradient from buffer A (20 mM MES, 150 mM NaCl, pH5.5) to 40% buffer B (20 mM tris+150 mM NaCl, pH8.8) and a 18CV linear gradient from 40% to 100% buffer B. The experiment was performed at a flow rate of 0.5 ml/min at room temperature using the Agilent-DAD to measure the A280 of the elution profile. Retention time was normalized to relative retention time with the following formula and using the well-behaved control antibody NIP228 in the WT and YTE format:

Relative $RT=([sample\ RT-NIP228\ RT]/[NIP228-YTE\ RT-NIP228\ RT])$. The results are shown in Table 3.

8.15 Example 15: Octet Binding Competition

Binding competition was performed with an Octet® model QK 384 biolayer interferometry instrument (FortéBio®). Streptavidin tips were first soaked in 1×kinetics buffer for 10 minutes followed by a baseline signal measurement in 1×kinetics buffer for 60 seconds. Biotinylated SARS-COV-2 spike RBD diluted in kinetics buffer to 4 nM was then loaded onto the tips for 300 seconds. Antigen containing tips were then added to wells containing the first mAb (mAb1) at 1 µM as mAb1 reference antibody, and association was measured for 300 seconds. Tips were then immersed into wells containing a second mAb, (mAb2) at 1 µM, and a second association was measured for 300 seconds. Binding signal at the end of each step was averaged from data points taken for the last 10 seconds at equilibrium to determine the change in signal. The mAbs were determined not to compete if the signal increased greater than 0.5 nm after addition to mAb2. The results are shown in Table 4 and demonstrate that RQ40 and RQ43 do not compete with RQ33.

8.16 Example 16: Binding to RBD with Point Mutations

Kinetic rates ($k_a$, $k_d$, and $K_D$) of mAb binding to SARS-COV-2 spike RBD (wt and point mutants) were evaluated with an Octet® model QK 384 biolayer interferometry instrument (FortéBio®). Anti-Penta-His (HIS1K) tips were first soaked in 1× kinetics buffer for 10 minutes followed by a baseline signal measurement in 1× kinetics buffer for 60 seconds. His-tagged SARS-CoV-2 spike RBD diluted in kinetics buffer to 5 ug/ml was then loaded onto the tips for 240 seconds. Antigen containing tips were then added to wells containing the mAb at a starting concentration of 200 nM, with subsequent 2 fold dilutions, and association was measured for 300 seconds. Dissociation was then measured in 1× kinetics buffer for 300 seconds. Data were reference subtracted and fit to a 1:1 binding model using Octet® Data Analysis Software 12.0. (Collected data were fit to a one-site binding equation using Biacore software to obtain binding kinetics measurements.) The results are shown in Table 5 and demonstrate that RQ33 and RQ43 are not sensitive to K444A and F486A RBD mutations.

8.17 Example 17: Pseudovirus Neutralization Assay

FreeStyle™ 293x cells were seeded and transfected with a third generation human immunodeficiency virus (HIV) based lentiviral vector expressing luciferase along with packaging plasmids encoding the following: SARS-COV-2 spike protein with C-terminus 19 amino acids deletion, Rev, and Gag-pol. The viral supernatant was harvested 48 hours later. Cell debris was removed by low speed centrifugation and the supernatant was passed through a 0.45 µM filter unit. The supernatant was concentrated 100-fold by ultracentrifugation to generate stock virus used in this assay.

Serial dilutions of mAbs were prepared in a 384-well microtiter plate and pre-incubated with pseudovirus for 1 hour at 37° C., to which Ad293 cells that stably express human ACE2 were added. The plate was returned to the 37° C. incubator for 48 hours and luciferase activity measured on an En Vision™ 2105 Multimode Plate Reader (PerkinElmer®) using the Bright-Glo™ Luciferase Assay System (Promega®) according to the manufacturer's recommendations. Percent inhibition was calculated relative to pseudovirus alone control, and potency ($IC_{50}$ value) was determined by nonlinear regression using GraphPad Prism™ software version 8.1.0. The average IC50 value for each mAb was determined from a minimum of two independent experiments. The results of the pseudovirus neutralization assay are shown in FIGS. 1 and 2. AZD7442 was used as a control in the neutralization assays testing combinations of mAbs. AZD7442 is a combination of two antibodies (tixagevimab (AZD8895) and cilgavimab (AZD1061)) derived from B-cells donated by convalescent patients after SARS-COV-2 virus.

TABLE 2

| Antibody | in silico (+pI) | Titer (CHO small scale, % of NIP228) | Monomer Content | Monomer ret. time (vs. NIP228) | self-association (AC-SINS PBS/buffer) | BVP (HEK cell binding) | DSC-TmOnset, ° C. | DSC-Tm Fab 1st Transition, ° C. | DLS kD (g/ml), | Viscosity at 150 mg/ml, (cP) |
|---|---|---|---|---|---|---|---|---|---|---|
| RQ33 (TM-YTE) | DP* | 17 | 98.62 | −0.004 | 1.9/2.6 | 1.01 (No) | 45.1 | 79.3 | 19.9 | 4.6 |
| RQ33-GL-H (TM-YTE) | DP | | 98.32 | −0.024 | 1.6/1.6 | 0.96 (No) | | | | |
| RQ33-GL-H-LO1 (TM-YTE) | | 46.2 | 98.3 | 0.04 | 2.1/1.6 | 0.97 (No) | 46.1 | 77.3 | 17.4 | 5.1 |
| RQ40 (TM-YTE) | Cys loop** | 38.3 | 92.9; 90 | 0.078 | 1.6/2.4 | 0.95 (No) | 47.9 | 75 | 13.9 | |
| RQ40-GL-LH (TM-YTE) | Cys loop | | 97.4 | 0.08 | 0.5/0.5 | 1.23 (No) | 47.2 | 75.2 | 11.7 | 7.2 |
| RQ41 (TM-YTE) | Integrin BS*** | 28 | 99.37 | −0.009 | 2.1/2.1 | 1.11 (No) | 46.6 | 61.9 | 7 | 5.5 |
| RQ41-GL-LH (TM-YTE) | Integrin BS | 36.1 | 98 | 0.003 | 1.1/1.1 | 1 (No) | | | | 5.5 |
| RQ41-GL-LH-LO1 (TM-YTE) | | | 99.26 | −0.016 | | | | | | |
| RQ41-LO1 (TM-YTE) | | | 99.25 | −0.017 | | | | | | |
| RQ43 (TM-YTE) | Integrin BS | 69.5 | 99.35 | 0.043 | 1.9/1.1 | 1.08 (No) | 47.6 | 61.8 | 5.8 | 8 |
| RQ43-GL-L (TM-YTE) | Integrin BS | | 98.7 | 0.021 | 1.4/1.6 | 0.92 (No) | | | | |
| RQ43-GL-H (TM-YTE) | Integrin BS | | 99.3 | 0.014 | 1.6/0.9 | 0.84 (No) | 45.7 | 65.5 | | |
| RQ43-GL-LH (TM-YTE) | Integrin BS | | 99.17 | −0.007 | 1.1/0.0 | 0.7 (No) | | | 1.2 | |
| RQ43-GL-LH-LO1 (TM-YTE) | | | 98.6 | 0.008 | | | | | | |
| RQ43-GL-H-LO1 (TM-YTE) | | 51.15 | 97.6 | 0.03 | 0.5/0.5 | 1.21 (No) | 45.1 | 60.9 | 2.5 | 6.8 |

*DP = "DP" amino acid sequence that can potentially cause fragmentation
**Cys loop = disulfide loop in CDR
***Integrin BS = integrin binding site

TABLE 3

| Antibody | Heat 7 day Aggregation (Fragmentation) | Heat 7 day binding | Heat 14 day Aggregation (Fragmentation) | Heat 14 day binding | Photo 7 day Aggregation (Fragmentation) | Photo 7 day binding | Serum stability 7 day binding | Serum stability 14 day binding | FcRn column binding before/after stress | Peptide mapping |
|---|---|---|---|---|---|---|---|---|---|---|
| RQ33 (TM-YTE) | 0.03 (0.26) | 102% | 0.20 (0.65) | 109% | 0.04 (0.16) | 94% | 98% | 95% | Pass | CDRH1 Deamidation; CDRH3 Isomerization |
| RQ33-GL-H (TM-YTE) | | | | | | | | | | |
| RQ33-GL-H-LO1 (TM-YTE) | 0.09 (0.23) | 107% | 0.48 (0.68) | | 0.00 (0.14) | 102% | 108% | | | |
| RQ40 (TM-YTE) | 0.85 (0.00) | 93% | 3.84 (1.75) | 102% | 2.14 (1.19) | 86% | 88% | 89% | | |
| RQ40-GL-LH (TM-YTE) | 0.71 (0.19) | 117% | 1.58 (0.52) | 96% | 1.06 (0.00) | 95% | 106% | 111% | Pass | CDRH3 oxidation |
| RQ41 (TM-YTE) | 1.15 (0.48) | 101% | 2.34 (1.39) | 118% | 0.11 (0.18) | 94% | 97% | 89% | | |
| RQ41-GL-LH (TM-YTE) | 1.05 (0.23) | 108% | 2.24 (1.15) | 121% | 0.05 (0.00) | 106% | 100% | 98% | | |
| RQ41-GL-LH-LO1 (TM-YTE) | | | | | | | | | | |
| RQ41-LO1 (TM-YTE) | | | | | | | | | | |
| RQ43 (TM-YTE) | 0.13 (0.62) | 105% | 0.69 (1.34) | 111% | 0.18 (0.24) | 98% | 100% | 97% | Pass | |
| RQ43-GL-L (TM-YTE) | | | | | | | | | | |
| RQ43-GL-H (TM-YTE) | | | | | | | | | | |

TABLE 3-continued

| Antibody | Heat 7 day Aggregation (Fragmentation) | Heat 7 day binding | Heat 14 day Aggregation (Fragmentation) | Heat 14 day binding | Photo 7 day Aggregation (Fragmentation) | Photo 7 day binding | Serum stability 7 day binding | Serum stability 14 day binding | FcRn column binding before/ after stress | Peptide mapping |
|---|---|---|---|---|---|---|---|---|---|---|
| RQ43-GL-LH (TM-YTE) | 0.09 (0.29) | 106% | | | 0.50 (0.00) | 100% | 86% | | | |
| RQ43-GL-LH-LO1 (TM-YTE) | | | | | | | | | | |
| RQ43-GL-H-LO1 (TM-YTE) | 0.59 (0.28) | 99% | 0.57 (0.66) | 102% | 0.20 (0.13) | 93% | 106% | 96% | Pass | |

TABLE 4

| mAb1 (below) | mAb2 (right) | | | |
|---|---|---|---|---|
|  | RQ33 | RQ40 | RQ41 | RQ43 |
| RQ33 | | Non-Competing Pair | Competing Pair | Non-Competing Pair |
| RQ40 | Non-Competing Pair | | Competing Pair | Competing Pair |
| RQ41 | Competing Pair | Competing Pair | | Competing Pair |
| RQ43 | Non-Competing Pair | Competing Pair | Competing Pair | |

TABLE 5

Avidity to RBD Point Mutants

| mAb | KD (M) value | | |
|---|---|---|---|
|  | RBD-wt | K444A* | F486A ** |
| RQ33 | 3.65E-09 | 3.13E-09 | 3.28E-09 |
| RQ40 | <1.0E-12 | <1.0E-12 | 4.71E-08 |
| RQ43 | <1.0E-12 | <1.0E-12 | <1.0E-12 |

8.18 Example 18: Divergent Neutralization Profile of RQ33

RQ33, RQ43-GL-H-LO1, and the combination (RQ33+RQ43-GL-H-LO1) was evaluated in neutralization assays to measure their antiviral activity against SARS-COV-2 variants of concern (VOC). Antiviral activity was observed in a dose dependent manner, resulting in a sigmoidal relationship between antibody concentration and percent neutralization for most VOC. However when neutralization was measured for the BA.2.12.1 variant of authentic SARS-COV-2 virus, negative neutralization (i.e., enhanced infection) was observed at low concentrations of RQ33 (FIG. 3). This observation was in contrast to observations with RQ43-GL-H-LO1 and the combination (RQ33+RQ43-GL-H-LO1) where low concentrations of antibody resulted in low or no neutralization but not negative neutralization (i.e., enhanced infection). This observation of enhanced infection was only observed when assaying authentic BA.2.12.1 virus and was not observed using pseudovirus (FIG. 4), nor with authentic virus from other variants.

This observation of enhanced infection of authentic BA.2.12.1 virus at low concentrations of RQ33 is not consistent with the target product profile for a monoclonal antibody product that should protect against SARS-COV-2 disease in the pre-exposure prophylaxis setting. Therefore, the combination of cilgavimab (instead of RQ33) with RQ43-GL-H-LO1 was evaluated. Cilgavimab and RQ43-GL-H-LO1 are biochemically compatible in that RQ43-GL-H-LO1 was shown not to compete with cilgavimab by Octet® competition assays utilizing the BA.2 RBD (FIG. 5). This is also demonstrated by comparing the binding footprints of RQ43 (the parent of RQ43-GL-H-LO1) and cilgavimab on the RBD surface (FIG. 6). Furthermore, together cilgavimab and RQ43-GL-H-LO1 provide broad and potent coverage across all tested variants of concern (Table 6).

TABLE 6

SARS-CoV-2 Antiviral Activity of RQ43-GL-H-LO1 and cilgavimab by Authentic Virus Neutralization Assay

| mAb Name | Authentic Virus Neutralization IC50 (ng/ml) | | | | | | | |
|---|---|---|---|---|---|---|---|---|
|  | D614G | Alpha | Delta + T51I + T95I | BA.1 | BA.1.1 | BA.2 | BA.2.12.1 | BA.5 |
| cilgavimab | 66 | 6 | 14 | 3779 | >10000 | 21 | 29 | 131 |
| RQ43-GL-H-LO1 | 99 | 60 | 21 | 11 | 7 | 31 | 28 | 17 |
| RQ43-GL-H-LO1 + cilgavimab | 58 | 7 | 24 | 29 | 16 | 18 | 20 | 24 |

Note:
IC50 values in table are calculated from the mean of 2 independent replicates, each in duplicate.

IC50, half-maximal inhibitory concentration; mAb, monoclonal antibody; SARS-COV-2, severe acute respiratory syndrome coronavirus 2.

The invention is not to be limited in scope by the aspects described herein. Indeed, various modifications of the invention in addition to those described will become apparent to those skilled in the art from the foregoing description and accompanying figures. Such modifications are intended to fall within the scope of the appended claims.

All references (e.g., publications or patents or patent applications) cited herein are incorporated herein by refer ence in their entirety and for all purposes to the same extent as if each individual reference (e.g., publication or patent or patent application) was specifically and individually indicated to be incorporated by reference in its entirety for all purposes.

Some aspects are within the following claims.

What is claimed:

1. An antibody or antigen-binding fragment thereof that specifically binds to the spike protein of SARS-COV-2, wherein the antibody or antigen-binding fragment comprises the VH-CDR1, VH-CDR2, VH-CDR3, VL-CDR1, VL-CDR2, and VL-CDR3 of SEQ ID NOs: 31, 32, 37, 34, 35, and 36, respectively.

2. The antibody or antigen-binding fragment thereof of claim 1, wherein the antibody or antigen-binding fragment comprises:
   a variable heavy chain (VH) comprising the amino acid sequence of SEQ ID NO:63 and a variable light chain (VL) comprising the amino acid sequence of SEQ ID NO:61.

3. The antibody or antigen-binding fragment thereof of claim 1, wherein the antibody or antigen-binding fragment thereof neutralizes SARS-COV-2 BA.1, SARS-CoV-2 BA1.1, SARS-COV-2 BA.2, and SARS-COV-2 D614G pseudovirus with an EC50 of 100 ng/ml or less.

4. The antibody or antigen-binding fragment thereof of claim 3, wherein the antibody or antigen-binding fragment is fully human.

5. The antibody or antigen-binding fragment thereof of claim 2, wherein the antibody or antigen-binding fragment comprises a human IgGλ light chain constant region.

6. The antibody or antigen-binding fragment thereof of claim 2, wherein the antibody or antigen-binding fragment comprises a human IgG1 heavy chain constant region.

7. The antibody or antigen-binding fragment thereof of claim 2, wherein the antibody or antigen-binding fragment comprises (i) a human IgG1 heavy chain constant region and (ii) a human IgGκ light chain constant region.

8. The antibody or antigen-binding fragment thereof of claim 7, wherein the antibody or antigen-binding fragment comprises a heavy chain constant region comprising a YTE mutation.

9. The antibody or antigen-binding fragment thereof of claim 8, wherein the antibody or antigen-binding fragment comprises a heavy chain constant region comprising a TM mutation.

10. The antibody or antigen-binding fragment thereof of claim 2, which is a full-length antibody.

11. A composition comprising the antibody or antigen-binding fragment thereof of claim 1, wherein the composition is a pharmaceutical composition further comprising a pharmaceutically acceptable excipient.

12. A composition comprising the antibody or antigen-binding fragment thereof of claim 2, wherein the composition is a pharmaceutical composition further comprising a pharmaceutically acceptable excipient.

13. A composition comprising the antibody or antigen-binding fragment thereof of claim 9, wherein the composition is a pharmaceutical composition further comprising a pharmaceutically acceptable excipient.

14. An antibody that specifically binds to the spike protein of SARS-CoV-2 and comprises a variable heavy chain (VH) comprising the amino acid sequence of SEQ ID NO: 63 and a variable light chain (VL) comprising the amino acid sequence of SEQ ID NO:61, wherein the antibody further comprises (i) a human heavy chain constant region comprising the amino acid sequence of SEQ ID NO:66 and (ii) a human IgGκ light chain constant region.

15. A composition comprising the antibody or antigen-binding fragment thereof of claim 14, wherein the composition is a pharmaceutical composition further comprising a pharmaceutically acceptable excipient.

* * * * *

```
                            SEQUENCE LISTING

Sequence total quantity: 82
SEQ ID NO: 1            moltype = AA   length = 1273
FEATURE                 Location/Qualifiers
source                  1..1273
                        mol_type = protein
                        organism = synthetic construct
SEQUENCE: 1
MFVFLVLLPL VSSQCVNLTT RTQLPPAYTN SFTRGVYYPD KVFRSSVLHS TQDLFLPFFS   60
NVTWFHAIHV SGTNGTKRFD NPVLPFNDGV YFASTEKSNI IRGWIFGTTL DSKTQSLLIV  120
NNATNVVIKV CEFQFCNDPF LGVYYHKNNK SWMESEFRVY SSANNCTFEY VSQPFLMDLE  180
GKQGNFKNLR EFVFKNIDGY FKIYSKHTPI NLVRDLPQGF SALEPLVDLP IGINITRFQT  240
LLALHRSYLT PGDSSSGWTA GAAAYYVGYL QPRTFLLKYN ENGTITDAVD CALDPLSETK  300
CTLKSFTVEK GIYQTSNFRV QPTESIVRFP NITNLCPFGE VFNATRFASV YAWNRKRISN  360
CVADYSVLYN SASFSTFKCY GVSPTKLNDL CFTNVYADSF VIRGDEVRQI APGQTGKIAD  420
YNYKLPDDFT GCVIAWNSNN LDSKVGGNYN YLYRLFRKSN LKPFERDIST EIYQAGSTPC  480
NGVEGFNCYF PLQSYGFQPT NGVGYQPYRV VVLSFELLHA PATVCGPKKS TNLVKNKCVN  540
FNFNGLTGTG VLTESNKKFL PFQQFGRDIA DTTDAVRDPQ TLEILDITPC SFGGVSVITP  600
GTNTSNQVAV LYQDVNCTEV PVAIHADQLT PTWRVYSTGS NVFQTRAGCL IGAEHVNNSY  660
ECDIPIGAGI CASYQTQTNS PRRARSVASQ SIIAYTMSLG AENSVAYSNN SIAIPTNFTI  720
SVTTEILPVS MTKTSVDCTM YICGDSTECS NLLLQYGSFC TQLNRALTGI AVEQDKNTQE  780
VFAQVKQIYK TPPIKDFGGF NFSQILPDPS KPSKRSFIED LLFNKVTLAD AGFIKQYGDC  840
LGDIAARDLI CAQKFNGLTV LPPLLTDEMI AQYTSALLAG TITSGWTFGA GAALQIPFAM  900
QMAYRFNGIG VTQNVLYENQ KLIANQFNSA IGKIQDSLSS TASALGKLQD VVNQNAQALN  960
TLVKQLSSNF GAISSVLNDI LSRLDKVEAE VQIDRLITGR LQSLQTYVTQ QLIRAAEIRA 1020
SANLAATKMS ECVLGQSKRV DFCGKGYHLM SFPQSAPHGV VFLHVTYVPA QEKNFTTAPA 1080
ICHDGKAHFP REGVFVSNGT HWFVTQRNFY EPQIITTDNT FVSGNCDVVI GIVNNTVYDP 1140
LQPELDSFKE ELDKYFKNHT SPDVDLGDIS GINASVVNIQ KEIDRLNEVA KNLNESLIDL 1200
QELGKYEQYI KWPWYIWLGF IAGLIAIVMV TIMLCCMTSC CSCLKGCCSC GSCCKFDEDD 1260
SEPVLKGVKL HYT                                                   1273

SEQ ID NO: 2            moltype = AA   length = 5
FEATURE                 Location/Qualifiers
source                  1..5
                        mol_type = protein
                        note = CDR1
                        organism = synthetic construct
SEQUENCE: 2
TSAVQ                                                               5

SEQ ID NO: 3            moltype = AA   length = 17
FEATURE                 Location/Qualifiers
source                  1..17
                        mol_type = protein
                        note = CDR2
                        organism = synthetic construct
SEQUENCE: 3
WIAVGSGNTN YAQKFQD                                                 17

SEQ ID NO: 4            moltype = AA   length = 14
FEATURE                 Location/Qualifiers
source                  1..14
                        mol_type = protein
                        note = CDR3
                        organism = synthetic construct
SEQUENCE: 4
PHCDRTSCHD GFDI                                                    14

SEQ ID NO: 5            moltype = AA   length = 12
FEATURE                 Location/Qualifiers
source                  1..12
                        mol_type = protein
                        note = CDR1
                        organism = synthetic construct
SEQUENCE: 5
RASQSVRSSY LA                                                      12

SEQ ID NO: 6            moltype = AA   length = 7
FEATURE                 Location/Qualifiers
source                  1..7
                        mol_type = protein
                        note = CDR2
                        organism = synthetic construct
```

```
SEQUENCE: 6
GASRRGT                                                                         7

SEQ ID NO: 7           moltype = AA   length = 9
FEATURE                Location/Qualifiers
source                 1..9
                       mol_type = protein
                       note = CDR3
                       organism = synthetic construct
SEQUENCE: 7
QQYGSSPWT                                                                       9

SEQ ID NO: 8           moltype = AA   length = 5
FEATURE                Location/Qualifiers
source                 1..5
                       mol_type = protein
                       note = CDR1
                       organism = synthetic construct
SEQUENCE: 8
TYVFT                                                                           5

SEQ ID NO: 9           moltype = AA   length = 17
FEATURE                Location/Qualifiers
source                 1..17
                       mol_type = protein
                       note = CDR2
                       organism = synthetic construct
SEQUENCE: 9
GIIPFFGTAD YAQKFQG                                                              17

SEQ ID NO: 10          moltype = AA   length = 9
FEATURE                Location/Qualifiers
source                 1..9
                       mol_type = protein
                       note = CDR3
                       organism = synthetic construct
SEQUENCE: 10
LSQWDLLPM                                                                       9

SEQ ID NO: 11          moltype = AA   length = 12
FEATURE                Location/Qualifiers
source                 1..12
                       mol_type = protein
                       note = CDR1
                       organism = synthetic construct
SEQUENCE: 11
RASQSFTSSY LA                                                                   12

SEQ ID NO: 12          moltype = AA   length = 11
FEATURE                Location/Qualifiers
source                 1..11
                       mol_type = protein
                       note = CDR3
                       organism = synthetic construct
SEQUENCE: 12
QQYGTSPRMY T                                                                    11

SEQ ID NO: 13          moltype = AA   length = 7
FEATURE                Location/Qualifiers
source                 1..7
                       mol_type = protein
                       note = CDR1
                       organism = synthetic construct
SEQUENCE: 13
SSNHYWV                                                                         7

SEQ ID NO: 14          moltype = AA   length = 16
FEATURE                Location/Qualifiers
source                 1..16
                       mol_type = protein
                       note = CDR2
                       organism = synthetic construct
SEQUENCE: 14
SMYYSGSTAY NPSLTN                                                               16

SEQ ID NO: 15          moltype = AA   length = 16
FEATURE                Location/Qualifiers
source                 1..16
                       mol_type = protein
```

```
                                  note = CDR3
                                  organism = synthetic construct
SEQUENCE: 15
QIGPKRPSQV ADWFDP                                                       16

SEQ ID NO: 16         moltype = AA   length = 11
FEATURE               Location/Qualifiers
source                1..11
                      mol_type = protein
                      note = CDR1
                      organism = synthetic construct
SEQUENCE: 16
RASQGISSYL A                                                            11

SEQ ID NO: 17         moltype = AA   length = 7
FEATURE               Location/Qualifiers
source                1..7
                      mol_type = protein
                      note = CDR2
                      organism = synthetic construct
SEQUENCE: 17
AASTLQS                                                                 7

SEQ ID NO: 18         moltype = AA   length = 9
FEATURE               Location/Qualifiers
source                1..9
                      mol_type = protein
                      note = CDR3
                      organism = synthetic construct
SEQUENCE: 18
QQLNSYPLT                                                               9

SEQ ID NO: 19         moltype = AA   length = 16
FEATURE               Location/Qualifiers
source                1..16
                      mol_type = protein
                      note = CDR3
                      organism = synthetic construct
SEQUENCE: 19
QIGPKRPSQV ADWFEP                                                       16

SEQ ID NO: 20         moltype = AA   length = 5
FEATURE               Location/Qualifiers
source                1..5
                      mol_type = protein
                      note = CDR1
                      organism = synthetic construct
SEQUENCE: 20
SYAIN                                                                   5

SEQ ID NO: 21         moltype = AA   length = 17
FEATURE               Location/Qualifiers
source                1..17
                      mol_type = protein
                      note = CDR2
                      organism = synthetic construct
SEQUENCE: 21
GIIPIFRTPH YAQKFQG                                                      17

SEQ ID NO: 22         moltype = AA   length = 22
FEATURE               Location/Qualifiers
source                1..22
                      mol_type = protein
                      note = CDR3
                      organism = synthetic construct
SEQUENCE: 22
PSCGGDCPQY LKSSKLDWYF DL                                                22

SEQ ID NO: 23         moltype = AA   length = 12
FEATURE               Location/Qualifiers
source                1..12
                      mol_type = protein
                      note = CDR1
                      organism = synthetic construct
SEQUENCE: 23
RASQSVSSTY LA                                                           12

SEQ ID NO: 24         moltype = AA   length = 9
FEATURE               Location/Qualifiers
```

```
source                         1..9
                               mol_type = protein
                               note = CDR3
                               organism = synthetic construct
SEQUENCE: 24
QHYGSSPLT                                                                       9

SEQ ID NO: 25                  moltype = AA  length = 5
FEATURE                        Location/Qualifiers
source                         1..5
                               mol_type = protein
                               note = CDR1
                               organism = synthetic construct
SEQUENCE: 25
RNYMS                                                                           5

SEQ ID NO: 26                  moltype = AA  length = 16
FEATURE                        Location/Qualifiers
source                         1..16
                               mol_type = protein
                               note = CDR2
                               organism = synthetic construct
SEQUENCE: 26
VIYSGGSTFY ADSVKG                                                              16

SEQ ID NO: 27                  moltype = AA  length = 10
FEATURE                        Location/Qualifiers
source                         1..10
                               mol_type = protein
                               note = CDR3
                               organism = synthetic construct
SEQUENCE: 27
DLDVVGGTDY                                                                     10

SEQ ID NO: 28                  moltype = AA  length = 12
FEATURE                        Location/Qualifiers
source                         1..12
                               mol_type = protein
                               note = CDR1
                               organism = synthetic construct
SEQUENCE: 28
RASQSVSSSY LA                                                                  12

SEQ ID NO: 29                  moltype = AA  length = 10
FEATURE                        Location/Qualifiers
source                         1..10
                               mol_type = protein
                               note = CDR3
                               organism = synthetic construct
SEQUENCE: 29
QQYGSSPGYT                                                                     10

SEQ ID NO: 30                  moltype = AA  length = 10
FEATURE                        Location/Qualifiers
source                         1..10
                               mol_type = protein
                               note = CDR3
                               organism = synthetic construct
SEQUENCE: 30
DLEVVGGTDY                                                                     10

SEQ ID NO: 31                  moltype = AA  length = 5
FEATURE                        Location/Qualifiers
source                         1..5
                               mol_type = protein
                               note = CDR1
                               organism = synthetic construct
SEQUENCE: 31
DYAIH                                                                           5

SEQ ID NO: 32                  moltype = AA  length = 17
FEATURE                        Location/Qualifiers
source                         1..17
                               mol_type = protein
                               note = CDR2
                               organism = synthetic construct
SEQUENCE: 32
SISWDSGSIG YADSVKG                                                             17
```

```
SEQ ID NO: 33            moltype = AA   length = 16
FEATURE                  Location/Qualifiers
source                   1..16
                         mol_type = protein
                         note = CDR3
                         organism = synthetic construct
SEQUENCE: 33
GAFPGYSSGW YYGLDV                                                        16

SEQ ID NO: 34            moltype = AA   length = 14
FEATURE                  Location/Qualifiers
source                   1..14
                         mol_type = protein
                         note = CDR1
                         organism = synthetic construct
SEQUENCE: 34
TGTSSDVGGY NYVS                                                          14

SEQ ID NO: 35            moltype = AA   length = 7
FEATURE                  Location/Qualifiers
source                   1..7
                         mol_type = protein
                         note = CDR2
                         organism = synthetic construct
SEQUENCE: 35
EVSKRPS                                                                   7

SEQ ID NO: 36            moltype = AA   length = 9
FEATURE                  Location/Qualifiers
source                   1..9
                         mol_type = protein
                         note = CDR3
                         organism = synthetic construct
SEQUENCE: 36
SSYAGNKGV                                                                 9

SEQ ID NO: 37            moltype = AA   length = 16
FEATURE                  Location/Qualifiers
source                   1..16
                         mol_type = protein
                         note = CDR3
                         organism = synthetic construct
SEQUENCE: 37
GAFPGYSSGW YYGLEV                                                        16

SEQ ID NO: 38            moltype = AA   length = 123
FEATURE                  Location/Qualifiers
source                   1..123
                         mol_type = protein
                         note = H Variable Sequence Region
                         organism = synthetic construct
SEQUENCE: 38
QVQLVESGPE MKKPGTSVKV SCKASGFTFI TSAVQWVRQA RGQRLEWMGW IAVGSGNTNY         60
AQKFQDRVTI NRDMSTSTAY MELSSLRSED TAVYYCAAPH CDRTSCHDGF DIWGQGTMVT        120
VSS                                                                     123

SEQ ID NO: 39            moltype = AA   length = 108
FEATURE                  Location/Qualifiers
source                   1..108
                         mol_type = protein
                         note = L Variable Sequence Region
                         organism = synthetic construct
SEQUENCE: 39
DIVMTQSPGT LSLSPGERAT LSCRASQSVR SSYLAWYQQK PGQAPRLLIY GASRRGTGIP         60
DRFSGSGSGT DFTLTISRLE PEDFAVYYCQ QYGSSPWTFG QGTKVEIK                    108

SEQ ID NO: 40            moltype = AA   length = 123
FEATURE                  Location/Qualifiers
source                   1..123
                         mol_type = protein
                         note = H Variable Sequence Region
                         organism = synthetic construct
SEQUENCE: 40
QVQLVQSGPE VKKPGTSVKV SCKASGFTFI TSAVQWVRQA RGQRLEWMGW IAVGSGNTNY         60
AQKFQDRVTI TRDMSTSTAY MELSSLRSED TAVYYCAAPH CDRTSCHDGF DIWGQGTMVT        120
VSS                                                                     123

SEQ ID NO: 41            moltype = AA   length = 108
FEATURE                  Location/Qualifiers
```

```
source                          1..108
                                mol_type = protein
                                note = L Variable Sequence Region
                                organism = synthetic construct
SEQUENCE: 41
EIVMTQSPGT LSLSPGERAT LSCRASQSVR SSYLAWYQQK PGQAPRLLIY GASRRGTGIP    60
DRFSGSGSGT DFTLTISRLE PEDFAVYYCQ QYGSSPWTFG GGTKVEIK                108

SEQ ID NO: 42                   moltype = AA   length = 118
FEATURE                         Location/Qualifiers
source                          1..118
                                mol_type = protein
                                note = H Variable Sequence Region
                                organism = synthetic construct
SEQUENCE: 42
EVQLVQSGAE VKKPGSSVKV SCKASRGTFN TYVFTWVRQA PGQGLEWMGG IIPFFGTADY    60
AQKFQGRVTI TADDSTSTAY MELSSLRSED TAVYYCSRLS QWDLLPMWGQ GTLVTVSS    118

SEQ ID NO: 43                   moltype = AA   length = 110
FEATURE                         Location/Qualifiers
source                          1..110
                                mol_type = protein
                                note = L Variable Sequence Region
                                organism = synthetic construct
SEQUENCE: 43
DIVMTQSPGT LSLSPGERAT LSCRASQSFT SSYLAWYQQK PGQAPRLLIY GASSRATGIP    60
DRFSGTGSGT DFTLTISRLE PEDFAVYYCQ QYGTSPRMYT FGQGTKVDIK              110

SEQ ID NO: 44                   moltype = AA   length = 118
FEATURE                         Location/Qualifiers
source                          1..118
                                mol_type = protein
                                note = H Variable Sequence Region
                                organism = synthetic construct
SEQUENCE: 44
QVQLVQSGAE VKKPGSSVKV SCKASRGTFN TYVFTWVRQA PGQGLEWMGG IIPFFGTADY    60
AQKFQGRVTI TADESTSTAY MELSSLRSED TAVYYCSRLS QWDLLPMWGQ GTLVTVSS    118

SEQ ID NO: 45                   moltype = AA   length = 110
FEATURE                         Location/Qualifiers
source                          1..110
                                mol_type = protein
                                note = L Variable Sequence Region
                                organism = synthetic construct
SEQUENCE: 45
EIVMTQSPGT LSLSPGERAT LSCRASQSFT SSYLAWYQQK PGQAPRLLIY GASSRATGIP    60
DRFSGSGSGT DFTLTISRLE PEDFAVYYCQ QYGTSPRMYT FGQGTKLEIK              110

SEQ ID NO: 46                   moltype = AA   length = 126
FEATURE                         Location/Qualifiers
source                          1..126
                                mol_type = protein
                                note = H Variable Sequence Region
                                organism = synthetic construct
SEQUENCE: 46
QVQLQESGPG LVKPSETLSL TCTVFGGSIT SSNHYWVWIR QPPGKGLEWI GSMYYSGSTA    60
YNPSLTNRVT ISVDTSKNQF SLKLSSVTAA DTAVYYCARQ IGPKRPSQVA DWFDPWGQGT   120
LVTVSS                                                              126

SEQ ID NO: 47                   moltype = AA   length = 107
FEATURE                         Location/Qualifiers
source                          1..107
                                mol_type = protein
                                note = L Variable Sequence Region
                                organism = synthetic construct
SEQUENCE: 47
DIQLTQSPSF LSASVGDRVT ITCRASQGIS SYLAWYQQKP GKAPKLLIYA ASTLQSGVPS    60
RFSGSGSGTE FTLTISSLQP EDFATYYCQQ LNSYPLTFGG GTKVEIK                 107

SEQ ID NO: 48                   moltype = AA   length = 126
FEATURE                         Location/Qualifiers
source                          1..126
                                mol_type = protein
                                note = H Variable Sequence Region
                                organism = synthetic construct
SEQUENCE: 48
QVQLQESGPG LVKPSETLSL TCTVSGGSIT SSNHYWVWIR QPPGKGLEWI GSMYYSGSTA    60
YNPSLTNRVT ISVDTSKNQF SLKLSSVTAA DTAVYYCARQ IGPKRPSQVA DWFDPWGQGT   120
LVTVSS                                                              126
```

```
SEQ ID NO: 49              moltype = AA  length = 126
FEATURE                    Location/Qualifiers
source                     1..126
                           mol_type = protein
                           note = H Variable Sequence Region
                           organism = synthetic construct
SEQUENCE: 49
QVQLQESGPG LVKPSETLSL TCTVSGGSIT SSNHYWVWIR QPPGKGLEWI GSMYYSGSTA    60
YNPSLTNRVT ISVDTSKNQF SLKLSSVTAA DTAVYYCARQ IGPKRPSQVA DWFEPWGQGT   120
LVTVSS                                                              126

SEQ ID NO: 50              moltype = AA  length = 131
FEATURE                    Location/Qualifiers
source                     1..131
                           mol_type = protein
                           note = H Variable Sequence Region
                           organism = synthetic construct
SEQUENCE: 50
EVQLVESGAE VKKPGSSVKV SCKASGGTFS SYAINWVRQA PGQGLEWMGG IIPIFRTPHY    60
AQKFQGRVTI TADESTGTAY MELSSLRSED TAVYYCASPS CGGDCPQYLK SSKLDWYFDL   120
WGRGTLVTVS S                                                        131

SEQ ID NO: 51              moltype = AA  length = 108
FEATURE                    Location/Qualifiers
source                     1..108
                           mol_type = protein
                           note = L Variable Sequence Region
                           organism = synthetic construct
SEQUENCE: 51
VIWMTQSPGT LSLSPGERAT LSCRASQSVS STYLAWYQQK PGQAPRLLIY GASSRATGIP    60
DRFSGSGSGT DFTLTISRLE PEDFAVYYCQ HYGSSPLTFG QGTRLEIK                108

SEQ ID NO: 52              moltype = AA  length = 131
FEATURE                    Location/Qualifiers
source                     1..131
                           mol_type = protein
                           note = H Variable Sequence Region
                           organism = synthetic construct
SEQUENCE: 52
QVQLVQSGAE VKKPGSSVKV SCKASGGTFS SYAINWVRQA PGQGLEWMGG IIPIFRTPHY    60
AQKFQGRVTI TADESTSTAY MELSSLRSED TAVYYCASPS CGGDCPQYLK SSKLDWYFDL   120
WGRGTLVTVS S                                                        131

SEQ ID NO: 53              moltype = AA  length = 108
FEATURE                    Location/Qualifiers
source                     1..108
                           mol_type = protein
                           note = L Variable Sequence Region
                           organism = synthetic construct
SEQUENCE: 53
EIVMTQSPGT LSLSPGERAT LSCRASQSVS STYLAWYQQK PGQAPRLLIY GASSRATGIP    60
DRFSGSGSGT DFTLTISRLE PEDFAVYYCQ HYGSSPLTFG QGTRLEIK                108

SEQ ID NO: 54              moltype = AA  length = 118
FEATURE                    Location/Qualifiers
source                     1..118
                           mol_type = protein
                           note = H Variable Sequence Region
                           organism = synthetic construct
SEQUENCE: 54
EVQLVESGGG LIQPGGSLRL SCAASEIIVS RNYMSWVRQA PGKGLEWVSV IYSGGSTFYA    60
DSVKGRFTIS RDNSKNTLYL QMNSLRAEDT AVYYCARDLD VVGGTDYWGQ GTLVTVSS     118

SEQ ID NO: 55              moltype = AA  length = 109
FEATURE                    Location/Qualifiers
source                     1..109
                           mol_type = protein
                           note = L Variable Sequence Region
                           organism = synthetic construct
SEQUENCE: 55
EIVLTQSPGT LSLSPGERAT LSCRASQSVS SSYLAWYQQK PGQAPRLLIY GASSRATGIP    60
DRFSGSGSGT DFTLTISRLE PEDFAVYYCQ QYGSSPGYTF GQGTKVDIK               109

SEQ ID NO: 56              moltype = AA  length = 118
FEATURE                    Location/Qualifiers
source                     1..118
                           mol_type = protein
                           note = H Variable Sequence Region
```

```
                            organism = synthetic construct
SEQUENCE: 56
EVQLVETGGG LIQPGGSLRL SCAASEIIVS RNYMSWVRQA PGKGLEWVSV IYSGGSTFYA    60
DSVKGRFTIS RDNSKNTLYL QMNSLRAEDT AVYYCARDLD VVGGTDYWGQ GTLVTVSS    118

SEQ ID NO: 57           moltype = AA  length = 109
FEATURE                 Location/Qualifiers
source                  1..109
                        mol_type = protein
                        note = L Variable Sequence Region
                        organism = synthetic construct
SEQUENCE: 57
EIVLTQSPGT LSLSPGERAT LSCRASQSVS SSYLAWYQQK PGQAPRLLIY GASSRATGIP    60
DRFSGSGSGT DFTLTISRLE PEDFAVYYCQ QYGSSPGYTF GPGTKVDIK              109

SEQ ID NO: 58           moltype = AA  length = 117
FEATURE                 Location/Qualifiers
source                  1..117
                        mol_type = protein
                        note = H Variable Sequence Region
                        organism = synthetic construct
SEQUENCE: 58
EVQLVETGGG LIQPGGSLRL SCAASEIIVS RNYMSWVRQA PGKGLEWVSV IYSGGSTFYA    60
DSVKGRFTIS RDNSKNLYLQ MNSLRAEDTA VYYCARDLEV VGGTDYWGQG TLVTVSS     117

SEQ ID NO: 59           moltype = AA  length = 118
FEATURE                 Location/Qualifiers
source                  1..118
                        mol_type = protein
                        note = H Variable Sequence Region
                        organism = synthetic construct
SEQUENCE: 59
EVQLVESGGG LIQPGGSLRL SCAASEIIVS RNYMSWVRQA PGKGLEWVSV IYSGGSTFYA    60
DSVKGRFTIS RDNSKNTLYL QMNSLRAEDT AVYYCARDLE VVGGTDYWGQ GTLVTVSS    118

SEQ ID NO: 60           moltype = AA  length = 125
FEATURE                 Location/Qualifiers
source                  1..125
                        mol_type = protein
                        note = H Variable Sequence Region
                        organism = synthetic construct
SEQUENCE: 60
EVQLLETGGG LVQPGRSLRL SCAASGFPFD DYAIHWVRLA PGKGLEWVSS ISWDSGSIGY    60
ADSVKGRFTI SRDNAKNSLY LQMNSLRAED TALYYCAKGA FPGYSSGWYY GLDVWGQGAT   120
VTVSS                                                              125

SEQ ID NO: 61           moltype = AA  length = 109
FEATURE                 Location/Qualifiers
source                  1..109
                        mol_type = protein
                        note = L Variable Sequence Region
                        organism = synthetic construct
SEQUENCE: 61
QSVVTQPPSA SGSLGQSVTI SCTGTSSDVG GYNYVSWYQQ HPGKAPKLMI FEVSKRPSGV    60
PDRFSGSKSG NTASLTVSGL QAEDEADYYC SSYAGNKGVF GGGTKLTVL              109

SEQ ID NO: 62           moltype = AA  length = 125
FEATURE                 Location/Qualifiers
source                  1..125
                        mol_type = protein
                        note = H Variable Sequence Region
                        organism = synthetic construct
SEQUENCE: 62
EVQLVESGGG LVQPGRSLRL SCAASGFPFD DYAIHWVRLA PGKGLEWVSS ISWDSGSIGY    60
ADSVKGRFTI SRDNAKNSLY LQMNSLRAED TALYYCAKGA FPGYSSGWYY GLDVWGQGTT   120
VTVSS                                                              125

SEQ ID NO: 63           moltype = AA  length = 125
FEATURE                 Location/Qualifiers
source                  1..125
                        mol_type = protein
                        note = H Variable Sequence Region
                        organism = synthetic construct
SEQUENCE: 63
EVQLVESGGG LVQPGRSLRL SCAASGFPFD DYAIHWVRLA PGKGLEWVSS ISWDSGSIGY    60
ADSVKGRFTI SRDNAKNSLY LQMNSLRAED TALYYCAKGA FPGYSSGWYY GLEVWGQGTT   120
VTVSS                                                              125

SEQ ID NO: 64           moltype = AA  length = 109
```

| FEATURE | Location/Qualifiers |
|---|---|
| source | 1..109<br>mol_type = protein<br>note = L Variable Sequence Region<br>organism = synthetic construct |

SEQUENCE: 64
```
QSAVTQPASV SGSPGQSITI SCTGTSSDVG GYNYVSWYQQ HPGKAPKLMI FEVSKRPSGV   60
SNRFSGSKSG NTASLTISGL QAEDEADYYC SSYAGNKGVF GSGTKVTVL              109
```

| SEQ ID NO: 65 | moltype = AA length = 106 |
|---|---|
| FEATURE | Location/Qualifiers |
| source | 1..106<br>mol_type = protein<br>organism = synthetic construct |

SEQUENCE: 65
```
GQPKAAPSVT LFPPSSEELQ ANKATLVCLI SDFYPGAVTV AWKADSSPVK AGVETTTPSK   60
QSNNKYAASS YLSLTPEQWK SHRSYSCQVT HEGSTVEKTV APTECS                 106
```

| SEQ ID NO: 66 | moltype = AA length = 330 |
|---|---|
| FEATURE | Location/Qualifiers |
| source | 1..330<br>mol_type = protein<br>organism = synthetic construct |

SEQUENCE: 66
```
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKRVEP KSCDKTHTCP PCPAPEFEGG  120
PSVFLFPPKP KDTLYITREP EVTCVVVDVS HEDPEVKFNW YVDGVEVHNA KTKPREEQYN  180
STYRVVSVLT VLHQDWLNGK EYKCKVSNKA LPASIEKTIS KAKGQPREPQ VYTLPPSREE  240
MTKNQVSLTC LVKGFYPSDI AVEWESNGQP ENNYKTTPPV LDSDGSFFLY SKLTVDKSRW  300
QQGNVFSCSV MHEALHNHYT QKSLSLSPGK                                  330
```

| SEQ ID NO: 67 | moltype = AA length = 7 |
|---|---|
| FEATURE | Location/Qualifiers |
| source | 1..7<br>mol_type = protein<br>note = CDR2<br>organism = synthetic construct |

SEQUENCE: 67
```
GASSRAT                                                             7
```

| SEQ ID NO: 68 | moltype = AA length = 123 |
|---|---|
| FEATURE | Location/Qualifiers |
| source | 1..123<br>mol_type = protein<br>note = H Variable Sequence Region<br>organism = synthetic construct |

SEQUENCE: 68
```
QMQLVQSGPE VKKPGTSVKV SCKASGFTFM SSAVQWVRQA RGQRLEWIGW IVIGSGNTNY   60
AQKFQERVTI TRDMSTSTAY MELSSLRSED TAVYYCAAPY CSSISCNDGF DIWGQGTMVT  120
VSS                                                                123
```

| SEQ ID NO: 69 | moltype = AA length = 8 |
|---|---|
| FEATURE | Location/Qualifiers |
| source | 1..8<br>mol_type = protein<br>note = CDR1<br>organism = synthetic construct |

SEQUENCE: 69
```
GFTFMSSA                                                            8
```

| SEQ ID NO: 70 | moltype = AA length = 8 |
|---|---|
| FEATURE | Location/Qualifiers |
| source | 1..8<br>mol_type = protein<br>note = CDR2<br>organism = synthetic construct |

SEQUENCE: 70
```
IVIGSGNT                                                            8
```

| SEQ ID NO: 71 | moltype = AA length = 16 |
|---|---|
| FEATURE | Location/Qualifiers |
| source | 1..16<br>mol_type = protein<br>note = CDR3<br>organism = synthetic construct |

SEQUENCE: 71
```
AAPYCSSISC NDGFDI                                                  16
```

| SEQ ID NO: 72 | moltype = AA length = 109 |
|---|---|

| FEATURE | Location/Qualifiers |
|---|---|
| source | 1..109<br>mol_type = protein<br>note = L Variable Sequence Region<br>organism = synthetic construct |

SEQUENCE: 72
```
EIVLTQSPGT LSLSPGERAT LSCRASQSVS SSYLAWYQQK PGQAPRLLIY GASSRATGIP   60
DRFSGSGSGT DFTLTISRLE PEDFAVYYCQ HYGSSRGWTF GQGTKVEIK              109
```

| SEQ ID NO: 73 | moltype = AA length = 7 |
|---|---|
| FEATURE | Location/Qualifiers |
| source | 1..7<br>mol_type = protein<br>note = CDR1<br>organism = synthetic construct |

SEQUENCE: 73
```
QSVSSSY                                                            7
```

| SEQ ID NO: 74 | moltype =    length = |
|---|---|

SEQUENCE: 74
000

| SEQ ID NO: 75 | moltype = AA length = 10 |
|---|---|
| FEATURE | Location/Qualifiers |
| source | 1..10<br>mol_type = protein<br>note = CDR3<br>organism = synthetic construct |

SEQUENCE: 75
```
QHYGSSRGWT                                                         10
```

| SEQ ID NO: 76 | moltype = AA length = 461 |
|---|---|
| FEATURE | Location/Qualifiers |
| source | 1..461<br>mol_type = protein<br>note = H<br>organism = synthetic construct |

SEQUENCE: 76
```
EVQLVESGGG LVKPGGSLRL SCAASGFTFR DVWMSWVRQA PGKGLEWVGR IKSKIDGGTT   60
DYAAPVKGRF TISRDDSKNT LYLQMNSLKT EDTAVYYCTT AGSYYYDTVG PGLPEGKFDY   120
WGQGTLVTVS SASTKGPSVF PLAPSSKSTS GGTAALGCLV KDYFPEPVTV SWNSGALTSG   180
VHTFPAVLQS SGLYSLSSVV TVPSSSLGTQ TYICNVNHKP SNTKVDKRVE PKSCDKTHTC   240
PPCPAPEFEG GPSVFLFPPK PKDTLYITRE PEVTCVVVDV SHEDPEVKFN WYVDGVEVHN   300
AKTKPREEQY NSTYRVVSVL TVLHQDWLNG KEYKCKVSNK ALPASIEKTI SKAKGQPREP   360
QVYTLPPSRE EMTKNQVSLT CLVKGFYPSD IAVEWESNGQ PENNYKTTPP VLDSDGSFFL   420
YSKLTVDKSR WQQGNVFSCS VMHEALHNHY TQKSLSLSPG K                      461
```

| SEQ ID NO: 77 | moltype = AA length = 219 |
|---|---|
| FEATURE | Location/Qualifiers |
| source | 1..219<br>mol_type = protein<br>note = L<br>organism = synthetic construct |

SEQUENCE: 77
```
DIVMTQSPDS LAVSLGERAT INCKSSQSVL YSSNNKNYLA WYQQKPGQPP KLLMYWASTR   60
ESGVPDRFSG SGSGAEFTLT ISSLQAEDVA IYYCQQYYST LTFGGGTKVE IKRTVAAPSV   120
FIFPPSDEQL KSGTASVVCL LNNFYPREAK VQWKVDNALQ SGNSQESVTE QDSKDSTYSL   180
SSTLTLSKAD YEKHKVYACE VTHQGLSSPV TKSFNRGEC                         219
```

| SEQ ID NO: 78 | moltype = AA length = 14 |
|---|---|
| FEATURE | Location/Qualifiers |
| source | 1..14<br>mol_type = protein<br>organism = synthetic construct |

SEQUENCE: 78
```
NNLDSKVGGN YNYL                                                    14
```

| SEQ ID NO: 79 | moltype = AA length = 16 |
|---|---|
| FEATURE | Location/Qualifiers |
| source | 1..16<br>mol_type = protein<br>organism = synthetic construct |

SEQUENCE: 79
```
EGFNCYFPLQ SYGFQP                                                  16
```

| SEQ ID NO: 80 | moltype = AA length = 19 |
|---|---|
| FEATURE | Location/Qualifiers |
| source | 1..19<br>mol_type = protein |

```
                        organism = synthetic construct
SEQUENCE: 80
RGDEVRQIAP GQTGKIADY                                                       19

SEQ ID NO: 81           moltype = AA  length = 7
FEATURE                 Location/Qualifiers
source                  1..7
                        mol_type = protein
                        organism = synthetic construct
SEQUENCE: 81
YRLFRKS                                                                     7

SEQ ID NO: 82           moltype = AA  length = 17
FEATURE                 Location/Qualifiers
source                  1..17
                        mol_type = protein
                        organism = synthetic construct
SEQUENCE: 82
YQAGSTPCNG VEGFNCY                                                         17
```